(12) United States Patent
Lenzarini

(10) Patent No.: US 7,620,015 B2
(45) Date of Patent: Nov. 17, 2009

(54) METHOD AND SYSTEM FOR SEAMLESS HANDOVER OF MOBILE DEVICES IN HETEROGENEOUS NETWORKS

(75) Inventor: Davide Lenzarini, Manno (CH)

(73) Assignee: Forward Information Technologies SA (CH)

( * ) Notice: Subject to any disclaimer, the term of this patent is extended or adjusted under 35 U.S.C. 154(b) by 318 days.

(21) Appl. No.: 10/597,889

(22) PCT Filed: Feb. 10, 2005

(86) PCT No.: PCT/EP2005/050599

§ 371 (c)(1),
(2), (4) Date: Aug. 10, 2006

(87) PCT Pub. No.: WO2005/076651

PCT Pub. Date: Aug. 18, 2005

(65) Prior Publication Data
US 2007/0165572 A1   Jul. 19, 2007

(30) Foreign Application Priority Data
Feb. 10, 2004   (WO) ............... PCT/EP2004/050111

(51) Int. Cl.
G06F 15/173 (2006.01)
H04W 4/00 (2009.01)
H04W 36/00 (2009.01)
H04J 3/00 (2006.01)
H04J 3/24 (2006.01)
H04M 3/00 (2006.01)

(52) U.S. Cl. .................. 370/331; 370/349; 370/338; 455/436; 455/418

(58) Field of Classification Search .................. 709/203, 709/223, 224, 219, 220, 10, 228, 225, 204, 709/200, 206, 1, 201, 245, 238, 202, 230, 709/250, 222; 707/10, 100, 1, 8, 103 R, 707/3, E17.121; 370/401, 338, 352, 468, 370/254, 389, 218, 235, 331, 469; 455/422.1, 455/418, 419, 414.2, 404.2, 436
See application file for complete search history.

(56) References Cited

U.S. PATENT DOCUMENTS 6,304,553 B1 * 10/2001 Gehman et al. ............. 370/235

(Continued)

FOREIGN PATENT DOCUMENTS

EP      0998094 A      5/2000

(Continued)

*Primary Examiner*—Lester Kincaid
*Assistant Examiner*—Kuo Woo
(74) *Attorney, Agent, or Firm*—Ackerman Senterfitt

(57) ABSTRACT

The invention relates to a method for seamless handover of mobile devices in heterogeneous networks. A mobile device (10) is moved between different topological network locations (30/31/32/33) and transmits and/or receives data by means of different network access technologies without the data transfer between a Client IP application (11), running on the mobile device (10), and a Server IP application (21) being interrupted, wherein the Client IP application (11) of the mobile device (10) makes a request with first data units to a client-service module (12), wherein the client service module (12) creates second data units based on the received first data units and makes a request to a server-service module (22) with the second data units, wherein the server-service module (22) creates third data units based on the received second data units and makes a request to the Server IP application (21) with the third data units to handle the data exchange between the Client IP application (11) and the Server IP application (21).

18 Claims, 33 Drawing Sheets

U.S. PATENT DOCUMENTS

| | | |
|---|---|---|
| 6,594,279 B1 * | 7/2003 | Nguyen et al. ............... 370/468 |
| 7,299,282 B2 * | 11/2007 | Sarkissian et al. ........... 709/224 |
| 7,302,256 B1 * | 11/2007 | O'Hara et al. .............. 455/418 |
| 2002/0147832 A1 | 10/2002 | Saint-Hilaire |
| 2005/0013280 A1 * | 1/2005 | Buddhikot et al. .......... 370/349 |
| 2005/0176429 A1 * | 8/2005 | Lee et al. .................... 455/436 |

FOREIGN PATENT DOCUMENTS

| | | |
|---|---|---|
| EP | 1089495 A | 9/2000 |
| EP | 1322089 A | 6/2003 |
| WO | 02/43348 A | 5/2002 |
| WO | 02/103978 A | 12/2002 |
| WO | 03/065654 A | 8/2003 |
| WO | 03/065682 A | 8/2003 |

* cited by examiner

METHOD AND SYSTEM FOR SEAMLESS HANDOVER OF MOBILE DEVICES IN HETEROGENEOUS NETWORKS

This invention relates to communication network access technologies and, more particularly, to a method and system for providing a seamless handover between heterogeneous networks, i.e. a transparent and automatic/semi-automatic switching between different network access technologies without interrupting active network applications or sessions.

BACKGROUND OF THE INVENTION

In the last few years, the number of Internet users and the information offered has increased exponentially, together with the number of critical business and private activities relying on the network availability and the reliability of the connection. Even more people are used to access Internet frequently to make transactions (e.g. to buy goods and services, to book flights, to make banking transactions or trading), to access remote information (e.g. to read e-mails, to download files), to communicate (e.g. to chat, to make audio-video communications). That number is bound to continue to increase in the near future, since the growing range of IP (Internet Protocol)-capable mobile devices (e.g. PDAs (Personal Digital Assistant), smart-phones and laptops) and the growing availability of broadband wireless infrastructure (e.g. Wi-Fi [Wireless Fidelity for 802.11 network], GPRS (General Packet Radio Service), UMTS (Universal Mobile Telecommunications System), EDGE (Enhanced Data-Rates for GSM Evolution), 1XRTT (Radio Transmission Technology), CDMA2000 (Code Division Multiple Access), Bluetooth, etc.) are beginning to change our concept of Internet access from "static" or "nomadic" to "mobile": nowadays the possibility of connecting to the Internet is no longer limited to a few network access points (e.g. at home, office, school or university) since it is possible to have network availability wherever the user is.

Ubiquitous access availability is important but the underlying concept is to provide reliable and continuous Internet access during the mobility of people nowadays, i.e. a seamless handover between different network access technologies. This is important since not all network technologies are suited to cover similar need as range, access speed, etc. Therefore, network technologies as e.g. GPRS based on GSM (Global System for Mobile Communications), UMTS, WLAN (Wireless Local Area Network) or Bluetooth differ greatly in their characteristics and availability. However, co-existence of different network access technologies under the Internet Protocol (IP) brings problems when the user switches between access technologies and/or access providers: since IP addresses are assigned to a fixed location in the network, when we refer to mobile devices a new IP network address must be assigned with each change of network location (access technology and/or provider). This makes impossible a transparent, mobile access, leading to the IP applications to be restarted (therefore losing the current session), data packets to be lost and transmission rate to be slowed down.

Think about a busy manager who is working with his laptop in his office, connected via Ethernet or Wi-Fi to the company network. Suppose that he has a meeting in another city and he must leave the office to reach the local airport by taxi. Suppose he is using a Client/Server application requiring an always-on connection to complete a business-critical transaction. This manager has a problem. When he leaves the office to catch the taxi, the Wi-Fi/Ethernet connection will be lost and the application and the session that he is using will crash with possible loss of sensitive information. In order to complete his work, he will have to establish a GPRS/EDGE/UMTS/etc connection and to reload the Client application, repeating all the necessary authentication steps. At this point, he is able to continue his work, but only with the limited bandwidth offered by GPRS, EDGE or UMTS. When he reaches the airport, where a public hot spot is available, he could work with the larger and cheaper bandwidth of Wi-Fi; but in order to use the Wi-Fi technology, he has to switch from his current network connection to the Wi-Fi connection. This obviously involves all the above-mentioned problems, including the application crash and the new authentication. It is clear that a system should be capable of managing an automatic and transparent handover between different network access technologies and/or access providers without interrupting active network applications or sessions. This need is well known in the IT (Information Technologies) and Telecommunication worlds, which is also shown in the prior art by several patent publications e.g. by Nokia Mobile Phones LTD (EP 0 998 094 A2), Nortel Networks Limited (EP 1 089 495 A2), Swisscom Mobile AG (WO 02/103978 A2), KONINKLIJKE PHILIPS ELECTRONICS N.V. (WO 03/065682 A1 and WO 03/065654 A1), Columbitech AB (WO 02/43348 A1), and documents e.g. "Supporting CORBA Applications in a Mobile Environment" MOBICOM '99 by HAAHR M et al., "IP mobility support"—IETF RFC 2002—1996 by C. Perkins. Another important need is that such a system should be completely flexible in order to be easily and quickly adapted to the variation of wireless network standards (e.g. in the Wi-Fi environment, the introduction of IEEE 802.11g or IEEE 802.11i (IEEE: Institute of Electrical and Electronics Engineers)), in order to be easily and quickly adapted to new network access technologies (e.g. based on the LEO [Low Earth Orbit] satellites), in order to be easily adapted to different OS (Operating System) (Windows, Linux, Symbian, PalmOS etc.) and to the future releases of such OS, and in order to be easily adapted to various mobile devices with different memories, computational capability and so on. Currently there are no standards providing a roaming service between the various kinds of wired/wireless networks. This lack of standards makes wired/wireless roaming a big issue if this problem is tackled at the lowest levels of the OSI-7 Layers Protocol Stack (Open System Interconnection). The prior art mentioned above satisfies the need and manages the seamless handover proposing a mechanism that modifies one of the layers of the OSI protocol stack (Data Link Layer, Network Layer or Session Layer) or that introduces one or more sub-layers (see FIGS. 35 and 36). But a modification of the OSI protocol stack requires a lot of low-level work that is platform dependent, i.e. that must be done every time a new OS has to be supported, and this has a negative impact on the flexibility and portability of the solution. Furthermore, if one or more sub-layers are introduced, one or more encapsulations have also to be introduced and this increments the amount of data to be exchanged and the likelihood of the IP packet fragmentation.

Virtually all networks in use today are based in some fashion on the Open Systems Interconnection (OSI) reference model of the ISO (International Organization for Standardization) standards. The core of this standard is the OSI Reference Model, a set of seven layers that define the different stages that data must go through to travel from one device to another over a network. Referring to FIG. 1, an overall scheme for the standard OSI-7 Layers Protocol Stack is shown. The OSI standard is the only internationally accepted framework of standards for communication between different systems made by different vendors. The OSI layers are:

Physical Layer (L1), which corresponds to the physical network interface, deals with the physical means of transmitting data over communication lines (referring in a network environment to various Network Interface Cards). On L1 each node of a network, for example, with a packet-switched interface has an unambiguous network address, these network addresses being called a Data Link Control (DLC) address or a Media Access Control (MAC) address. In the case of networks which conform to the IEEE 802 standard (such as Ethernet, for example), the DLC addresses are usually called MAC addresses. To be called a DLC address, an address must fulfill at least the OSI reference model. In other words, a DLC address, or respectively a MAC address, is a hardware address that identifies the node or respectively the physical network interface unambiguously in the network. Some protocols, such as Ethernet or Token Ring, for example, use the DLC/MAC address exclusively, i.e. they cannot communicate with the respective node without this address. A circuit-switched interface, on the other hand, has no such DLC or MAC address, i.e. thus also no corresponding identification DLCI (DLC Identifier). Examples of protocols using circuit-switched interfaces are inter alia PPP (Point to Point Protocol), SLIP (Serial Line Internet Protocol) or GPRS (Generalized Packet Radio Service). Basic data units of L1 are "Bits". Data link Layer (L2), which is concerned with procedures and protocols for operating the communication lines. Basic data units of L2 are "Frames". Network Layer (L3), which provides switching and routing technologies, creating logical paths for transmitting data from node to node. This information may include network or Internet protocol addresses for communication nodes. L3does not ensure reliability and its basic data units are "Packets". Transport Layer (L4), which defines the rules for information exchange, e.g. information about various network protocols. L4 ensures that the data is transmitted reliably between the communicating systems, it disassembles and re-assembles data into smaller units for the Network layer. Basic data units of L4 are "Segments". Session Layer (L5), which negotiates communication settings, establishes, maintains and ends communications between the two communicating systems. It synchronizes operations and coordinates rules for communicating. Presentation Layer (L6), which takes the data provided by L7 and converts it into a standard format that the other layers can understand. Basic data units are of L6 are "Messages". Application Layer (L7), which supports application and end-user processes. This is the layer that actually interacts with the operating system or applications whenever the user chooses to transfer files, read messages or perform other network-related activities. Within the OSI Reference Model, the protocols are what describe the rules that control horizontal communication, that is, conversations between processes that run at corresponding layers. At every layer (except layer one) these communications ultimately take the form of some sort of message that is sent between corresponding software elements on two or more devices. Since these messages are the mechanism for communicating information between protocols, they are most generally called protocol data units (PDUs). Each PDU has a specific format that implements the features and requirements of the protocol. The communication between layers higher than layer one is logical; the only hardware connection is at the physical layer. Thus, in order for a protocol to communicate, it must pass down its PDU to the next lower layer for transmission. In the OSI terminology, lower layers are said to provide services to the layers immediately above them. One of the services that each layer provides is this function: to handle and to manage the data received from the layer above. At any particular layer N, a PDU is a complete message that implements the protocol at that layer. However, when this "layer N PDU" is passed down to layer N−1, it becomes the data that the layer N−1 protocol has to service. Thus, the layer N protocol data unit (PDU) is called the layer N−1 service data unit (SDU). The job of layer N−1 is to transport this SDU, which it does in turn by placing the layer N SDU into its own PDU format, preceding the SDU with its own headers and appending footers as necessary. This process is called data encapsulation, because the entire contents of the higher-layer message are encapsulated as the data payload of the message at the lower layer. What does layer N−1 do with its PDU? It passes it down to the next lower layer, where it is treated as a layer N−2 SDU. Layer N−2 creates a layer N−2 PDU containing the layer N−1 SDU and layer N−2's headers and footers. And so the process continues, all the way down to the physical layer. In the theoretical model, what you end up with is a message at layer 1 that consists of application-layer data that is encapsulated with headers and/or footers from each of layers 7 through 2 in turn.

As mentioned, in the prior art we can find the following six patent applications, which can be regarded as representing the prior art for the issue of avoiding the client application shut-down during the wireless network connection switches. These are WO 02/103978 A2 (Swisscom Mobile AG), EP 1 089 495 A2 (Nortel Networks Limited), EP 0 998 094 A2 (Nokia Mobile Phones LTD), WO 03/065682 A1 and WO 03/065654 A1 (KONINKLIJKE PHILIPS ELECTRONICS N.V.) and WO 02/43348 A1 (Columbitech AB). All these patent applications, except WO 02/43348 A1, make use of the concept of Mobile IP as described in IP Mobility Support—IETF RFC 2002 (C. Perkins—IBM IP Mobility Support—IETF RFC 2002—October 1996). Internet makes use of the IP (Internet Protocol) to route data packets (datagrams) from the source to the destination. The source and the destination must have an IP address unique in Internet in order to be reached, something like the telephone number in the telephony world. When the destination address of the data packets is a mobile node this means that a new IP network address must be assigned with each change of network location, which makes transparent mobile accesses impossible. These mobility problems were solved by the Mobile IP standard of the IETF. Mobile IP allows the mobile node to use two IP addresses. One of these addresses is the normal, static IP address (home address), which indicates the location of the home network, whereas the second is a dynamic IP care-of address, which provides information about its current point of attachment to the Internet. The assignment of the two addresses allows the IP data packets to be rerouted to the correct, momentary address of the mobile node. The Mobile IP provides for registering the care-of address with a Home Agent. The Home Agent is normally a fixed network node, which administers the two addresses of the mobile node (home address and care-of address) and reroutes or routes the corresponding data packets: it sends datagrams destined for the mobile node through an IP tunnel to the care-of address. After arriving at the end of the tunnel, each datagram is then delivered to the mobile node.

Unfortunately, the Mobile IP of the IETF does not solve all the mobility problems: if, for instance, a user would like to switch between two different network interfaces while an IP application is running, the IP connection is interrupted at the moment when he leaves the old network link. This connection is interrupted at least until the new location, i.e. the new care-of address, is known and it has been registered at the so-called Home Agent. If the interruption time for the change exceeds the time-out delays specified e.g. in the TCP (Transfer Control Protocol), the IP connection is of course interrupted anyway. Even when the interruption time lies within the time-out delays specified e.g. in the TCP, however, the IP applications are not able to maintain the connection if a physical network interface is not permanently available. Thereby IP applications normally have to be restarted after a network connection switch in order to access a new IP data tunnel. WO 02/103978 A2 provides a method and a system to avoid the interruption of service in case of network connection switch with a mechanism operating at layer 3 (Network layer) of the OSI-7 Layers Protocol Stack. In FIG. 2 the reference numeral 10 refers to the mobile device, 11 is the application layer of the IP applications and 12 refers to the TCP layer. The solution of WO 02/103978 A2 is based on the three main layers or respectively main modules 131 to 134 which are designated jointly as mobile module by the reference numeral 13. The first layer consists of a mobile IP module 131 and/or an IPSec module 132. The second layer is the virtual network interface 133 of the solution and the third layer is an interface administration module 134 to handle the physical network interfaces 14-17. Finally, reference numerals 21 to 24 accordingly stand for the various heterogeneous networks and 30 designates the usual, worldwide IP backbone network. The Virtual IP Network Interface (133 in FIG. 2) and the Interface Administration Module (134 in FIG. 2) make transparent to the Client applications (11-12 in FIG. 2) the care-of IP address changing. The main drawback of WO 02/103978 A2 is that, operating at layer 3, the implementation requires a great deal of low-level work for each supported operating system. This vast amount of work reduces the flexibility of this solution in case of variation in wireless networks standards or in case of introduction of new wireless networks. WO 02/103978 A2 is based on the concepts of Mobile IP, and it solves its problem of IP applications restart in case of a network connection switch. Consequently all the coordination issues between the mobile node and the home agent have to be considered and implemented by this patent. Furthermore WO 02/103978 A2 requires that the Virtual IP Network Interface be under a custom Mobile IP and/or IPSec module (131-132 in FIG. 2) that provides Mobile IP and security features (authenticity of the interlocutors, confidentiality of the data exchanged and hashing systems to check whether the data exchanged have been modified during the transport by an unauthorized third party). Using a custom IPSec module all the above-mentioned security features have to be implemented, thus the widespread security commercial products operating at transport (L4) or network (L3) or lower level (L2, L1) can't be used. This patent does not take care of how the network connection is made and, operating at layer 3, an automatic or semi-automatic/assisted way to make the connection is difficult to be achieved. The solution of WO 02/103978 A2 is limited in its architectural features by Mobile IP concepts, on which it's based.

The mentioned document EP 1 089 495 A2 of Nortel shows a method and a system to make a change of the physical interfaces without the active IP applications being interrupted or having to be restarted because their link to the original interface has been lost (see FIG. 3). As FIG. 3 shows, the solution is based on a typical OSI-7 Layer Protocol Stack where reference numeral 16 designates the Network Layer (L3). Reference numeral 60 stands for an NAA (Network Access Arbitrator), 62 are the network adapters (NICs), 64 are the adapter drivers and 36 is a specific computer hardware platform. Nortel proposes an NAA (Network Access Arbitrator) 60 to reroute, via a single fixed MAC (Media Access Control) address of the so-called primary NIC (Network Interface Card) 62, the various MAC addresses of the individual configurable physical network interfaces available. The NAA 60 connects the layer 2 (Data Link layer) of the available NICs 62, and it reroutes the data packets from the primary NIC 62 to the corresponding MAC address of a further network interface (secondary NIC) 62. The NAA 60 provides a virtual adapter driver, and it requires that at least one physical interface with a MAC address must be permanently available. The major drawback of the Nortel invention is that it is sensitive to the definition of the network interface hardware-related address. If the address does not correspond to the IEEE 802 standard (MAC addresses) and if the new address standard has not been explicitly defined beforehand in the NM, the NM does not function with these interfaces since it can no longer reroute the MAC addresses. Another disadvantage arises from the explicit use of the MAC addresses: circuit-switched interfaces (GPRS, PPP (Point-to-Point Protocol), SLIP (Serial Line Internet Protocol)) do not have any corresponding MAC or network addresses. Since the NM is able to register only devices with MAC addresses in order to reroute the data packets, circuit-switched interfaces are not available to the NAA even though their connection to the IP layer should also be possible. A further disadvantage of EP 1 089 495 A2 has its origin in being based on the concepts of Mobile IP. In fact, EP 1 089 495 A2 solves the problem of IP applications restart in case of network connection switch, but consequently, all the coordination issues between the mobile node and the home agent have to be considered and implemented by this solution. Additionally, this solution does not take care of how the network connection is made which can be problematic for many applications. Like the solution of WO 02/103978 A2, the solution of EP 1 089 495 A2 is limited in its architectural features by Mobile IP concepts, on which it's based.

The mentioned document EP0 998 094 A2 of Nokia provides another method and system to avoid the interruption of service in case of network connection switch. The mechanism of the solution operates between layer 2 (Data link layer) and layer 3 (Network layer) (see FIG. 4). In FIG. 4 is PD designates a Protocol Driver, NT refers to the Windows NT standards of Microsoft and NISD is a Network Interface Selection Driver. The main drawback of this solution is that, operating between layer 2 and 3, the implementation requires a great deal of low-level work for each supported operating system. This vast amount of work reduces the flexibility of this solution in case of variation in wireless networks standards or in case of introduction of new wireless networks. Again, EP0 998 094 A2 is based on the concepts of Mobile IP to solve the problem of IP applications restart in case of network connection switch. Consequently all the coordination issues between the mobile node and the home agent have to be considered and implemented by this solution. Like the solution of WO 02/103978 A2 and EP 1 089 495 A2, additionally, the solution of EP 0 998 094 A2 is limited in its architectural features by Mobile IP concepts, on which it's based.

The mentioned document WO 03/065682 A1 provides the seamless handover working at the lowest three OSI layers (Physical, Data Link and Network). The routing, including detection of available networks, address configuration and handover is performed by a Routing Manager object (RM). The Routing Manager object communicates with the bearer objects handling the wireless network interfaces. WO 03/065682 A1 makes use of an IP-IP tunnel to provide the routing mechanism, so it makes use of the packet encapsulation. Like Mobile IP (RFC2002), it makes use of an IP address (called IP_CLIENT, the home address in the Mobile IP terminology) that remains the same during a handover from a first communications standard to a second communications standard (the changing mobile device IP address assigned by the wireless connectivity bearer is called IP_BEARER, the care-of address in the Mobile IP terminology). Finally, it has to grant the security of the communication: the mobile devices have to be identified and authorized in order to communicate with the servers. The main drawback of this solution is that, operating at layers 2 and 3, the implementation requires a great deal of low-level work for each supported operating system. This vast amount of work reduces the flexibility of this solution in case of variation in wireless networks standards or in case of introduction of new wireless networks. Like the other solutions mentioned, this solution is limited in its architectural features by Mobile IP concepts, from which it has been derived.

The mentioned document WO 03/065654 A1 is very similar to the WO 03/065682 A1 and share with it the above described features and drawbacks. It also introduces the possibility that an application, modifying its source code, could access, in a cross-layering way, some low level information. For this reason the MWAL (Multi-Standard Wireless Adaptation Layer) provides an Application Programmers' Interface. The communication between the application and the MWAL daemon is made by using a couple of local socket (one for the commands generated by the application and one for the events detected by the MWAL daemon).

The mentioned document WO 02/43348 A1 provides the seamless handover by using an adapted Session Layer with a security sub-layer (Session Mobility). This adapted Session Layer has to intercept and to manage all the TCP/UDP traffic produced by the client and server applications in order to grant the seamless handover (see FIG. 35). Furthermore, in order to work properly, it has to be implemented in a platform specific way and this hinder and reduce the platform portability. Finally, the adapted Session Layers, interacting via a common session protocol, must be available on the same devices that are running the client or the server application and not on different devices. This Session Mobility gives the possibility to handle the security at Session Layer, making possible to provide VPN solutions to enforce strong end-to-end security on an application-to-application level but its major drawback is that it lacks in architectural flexibility, requiring the adapted Session Layer to be installed in any devices involved in the communication.

Finally the mentioned document "Supporting CORBA Applications in a Mobile Environment" MOBICOM '99 by HAAHR M et al. is only one of the numerous solutions providing the seamless handover by offering to the client and server application developers a software framework with a set of API to be used. The major drawback of this kind of solutions is the backward compatibility. The seamless handover can be granted only if the client and server applications have been developed using the provided software framework. All the already developed and largely used client and server applications can't enjoy the seamless mobility.

SUMMARY OF THE INVENTION

It is an object of this invention to propose a new method and system for seamless handover of mobile devices in heterogeneous networks. In particular the switching from one network connection to another should be carried out without interruption of the IP applications and makes possible an uninterrupted continuation of the program course also with real-time applications, if applicable, without being dependent upon specific protocols or network technologies or operating systems. Therefore, it is an object of this invention to provide a method and a system capable of managing, without being dependent upon different protocols or network technologies or operating systems, an automatic/semi-automatic and transparent handover between different network access technologies and/or access providers without interrupting active network applications or sessions.

This object is attained according to the present invention through the elements of the independent claims. Further preferred embodiments follow, moreover, from the dependent claims and from the description.

In particular, this object is achieved through the invention in that a mobile device (10) is moved between different topological network locations (30/31/32/33) and transmits and/or receives data by means of different network access technologies without the data transfer between a Client IP application (11), running on the mobile device (10), and a Server IP application (21) being interrupted, in that the Client IP application (11) of the mobile device (10) makes a request with first data units to a client-service module (12), in that the client-service module (12) creates second data units based on the received first data units and makes a request to a server-service module (22) with the second data units, in that the server-service module (22) creates third data units based on the received second data units and makes a request to the Server IP application (21) with the third data units to handle the data exchange between the Client IP application (11) and the Server IP application (21).

In another embodiment, the Client IP application (11) of the mobile device (10) makes the request with first data units to the client-service module (12) by means of a first socket. In another embodiment, the client-service module (12) makes the request to the server-service module (22) with the second data units by means of a second socket. In another embodiment, the server-service module (22) makes the request to the Server IP application (21) with the third data units by means of a third socket.

It another embodiment, the socket used is connection-oriented or connectionless.

The Server IP application (21) makes a reply with fourth data units to the server-service module (22). The server-service module (22) creates fifth data units based on the received fourth data units and makes a reply to the client-service module (12) with the fifth data units. The client-service module (12) creates sixth data units based on the received fifth data units and makes a reply to the Client IP application (11) with the fifth data units.

In yet another embodiment, when a Server IP application (21) wants to use a service provided by a Client IP application (11), the following steps are performed: the Server IP application (21) makes a request with seventh data units to the server-service module (22), the server-service module (22) creates eighth data units based on the received seventh data units and makes a request to the client-service module (12) with the eighth data units, the client-service module (12) creates ninth data units based on the received eighth data units and makes a request to the Client IP application (11) with the ninth data units.

In another embodiment, the Server IP application (21) makes the request with seventh data units to the server-service module (22) by means of a fourth socket. In another embodiment, the server-service module (22) makes the request to the client-service module (12) with the eighth data units by means of a fifth socket. In another embodiment, the client-service module (12) makes the request to the Client IP application (11) with the ninth data units by means of a sixth socket.

The Client IP application (11) of the mobile device (10) makes a reply with tenth data units to the client-service module (12). The client-service module (12) creates eleventh data units based on the received tenth data units and makes a reply to the server-service module (22) with the eleventh data units. The server-service module (22) creates twelfth data units based on the received eleventh data units and makes a reply to the Server IP application (21) with the twelfth data units.

In still another embodiment, if the client-service module (12) is installed on the same mobile device (10) running the Client IP application (11), it provides at least a server application emulation interface comprising sockets and server sockets used to exchange data with the Client IP application (11) and bound to the loopback address used to communicate with the Client IP application (11), and a client application emulation interface comprising sockets and server sockets used to exchange data with the server-service module (22) and bound to the IP address provided by the physical interface currently selected by the client-service module (12).

In another embodiment, if the client-service module (12) is installed on any additional mobile device on the same local area network as the Client IP application mobile device (10), it provides at least a server application emulation interface comprising sockets and server sockets used to exchange data with the Client IP application (11) and bound to the IP address provided by a first physical interface used to communicate with the Client IP application (11), and a client application emulation interface comprising sockets and server sockets used to exchange data with the server-service module (22) and bound to the IP address provided by a second physical interface currently selected by the client-service module (12).

In addition, the server-service module (22) provides at least a server application emulation interface comprising sockets and server sockets used to exchange data with the client-service module (12) and a client application emulation interface comprising sockets and server sockets used to exchange data with the Server IP application (21).

In another embodiment, the server-service module (22) is installed on the same device (20) running the Server IP application (21) or on a different device of the same network as the device (20) running the Server IP application (21) or on any Internet node.

In yet another embodiment, a plurality of Server IP applications (21) resident on one or more devices is handled by the same server-service module (22).

In another embodiment, a plurality of Client IP applications (11) resident on one or more mobile devices is handled by the same client-service module (12).

In another embodiment, the client-service module (12) is connected simultaneously to a plurality of server-service modules (22).

In yet another embodiment, a plurality of client-service modules (12) is connected simultaneously to a single server-service module (22).

Moreover, the Server IP application (21) provides a set of server service server sockets listening on ports known by the Client IP application (11) and by the client-service module (12) and by the server-service module (22). The client-service module (12) provides a set of server service emulator server sockets listening on the same ports as the Server IP application (21) services and creates, for each service request received from the Client IP application (11), a client request emulation socket with the server-service module (22). The server-service module (22) provides a set of server service emulator server sockets listening on a set of ports known by the client-service module (12) and creates, for each service request received from the client-service module (12), a client request emulation socket with the Server IP application (21), on the port of the service that the Client IP application (11) wants to use.

In another embodiment, the Client IP application (11) provides a set of client service server sockets listening on ports known by the Server IP application (21) and by the client-service module (12) and by the server-service module (22), the server-service module (22) provides a set of client service emulator server sockets listening on the same ports as the Client IP application (11) services and creates, for each service request received from the Server IP application (21), a server request emulation socket with the client-service module (12) and the client-service module (12) provides a set of client service emulator server sockets listening on a set of ports known by the server-service module (22) and creates, for each service request received from the server-service module (22), a server request emulation socket with the Client IP application (11), on the port of the service that the Server IP application (21) wants to use.

In another embodiment, a plurality of client-service modules (12) of two or more mobile devices, providing client service emulator server sockets on the same ports, is connected to the same server-service module (22) and the, client application emulation interface sockets of the server-service module (22) are bound to different Virtual IP addresses created and/or allocated by it.

In addition, the server-service module (22) provides at least one control server socket listening on a port known by the client-service module (12). The client-service module (12), to exchange data with the server-service module (22), creates at least one control socket with the server-service module (22).

Moreover, the client-service module (12) periodically checks the mobile device, in which it is installed, for available and configurable physical network interfaces and creates a lookup table with the available and configurable ones. With a sudden or planned change or update of a physical network interface that causes a modification of the IP address currently used by the client-service module (12) to access the server-service module (22), the data transfer between the Client IP application (11) and the Server IP application (21) is suspended but, in order to provide the seamless handover, kept up until the client-service module (12) has obtained a new IP address using the lookup table and has established a new network connection with the server-service module (22). The data transfer between the Client IP application (11) and the Server IP application (21) is resumed after that the client-service module (12) and the server-service module (22) have completed the handshaking for the switching procedure from the old IP address to the new one and, in case of a sudden IP transition, after that the client-service module (12) and the server-service module (22) have resent the data not received by the other end.

In another embodiment, the client-service module (12) automatically changes and updates the physical network interface currently used to access the server-service module (22) on the basis of information retrieved from the lookup table.

In another embodiment, the criteria for the automatic change and/or update of the physical network interface currently used by the client-service module (12) to access the server-service module (22) are defined by the user.

In another embodiment, a change or an update of the physical network interface currently used by the client-service module (12) to access the server-service module (22) is initiated by the user.

In yet another embodiment, the client-service module (12) and/or the server-service module (22) are OSI Layer 7 applications and are created as platform independent applications.

In still another embodiment, the client-service module (12) and/or the server-service module (22) are at least in part composed by Java modules.

Finally, the data transfer is realized by means of IEEE 802.11 and/or IEEE 802.16 and/or GPRS and/or EDGE and/or UMTS and/or CDMA2000 and/or Bluetooth and/or ZigBee and/or PSTN and/or ADSL and/or Ethernet and/or Token Ring and/or FDDI.

In particular, the movement between different topological network locations while transmitting and/or receiving data by means of different network access technologies can, for instance, comprise a change of the physical network interface and/or a change among different networks technologies, such as e.g. Ethernet, Bluetooth, mobile radio networks (GSM, EDGE, GPRS, CDMA200, UMTS, etc.) or WLAN (Wireless Local Area Network), or also a topological location change within the same network technology, for example a device linked to an Ethernet network that migrates to another Ethernet network or a device linked to a Wi-Fi HotSpot that migrates to another Wi-Fi HotSpot.

It should be stated here that, besides the method according to the invention, the present invention also relates to a system and a computer program product for carrying out the method.

DISTINCTIVE CHARACTERISTICS OF THE INVENTION

This invention provides the seamless handover using a completely different approach compared with the solutions of the prior art mentioned above. It does not modify any OSI protocol stack layer and it does not introduce any sub-layer (see FIGS. 33, 34, 35, 36). The seamless handover is obtained by a pair of applications (OSI Layer 7), which deceive the Client and the Server applications letting them believe that they are running on the same device, or on different devices belonging to the same network. The Client and the Server applications do not realize that they are communicating via the Internet. This invention solves the problem of the IP address switch by introducing two applications collectively acting as a middleware: the CNAPT (Client Network Address and Port Translator) and the SNAPT (Server Network Address and Port Translator). These two components interface the communication between the Client and the Server hiding the mobility to them. The CNAPT is an application that can be installed on the same device as the Client application or in a different device in the same mobile network (e.g. a team of consultants, maintenance workers, auditors that require mobility while working together; in this case the CNAPT can be installed in only one of the mobile devices of the mobile network and all the team can share the seamless handover provided by it). The SNAPT is an application that can be installed in the same device as the Server application or in a different device of the same network or in any Internet server (on a corporate front-end server, on the home PC or in any Internet node or router). This feature is particularly important because provides a way to eliminate the scalability problem that affects each of the solutions mentioned in the prior art. With this invention it is possible, but not necessary, to have big servers with large bandwidth managed by telecom companies or ISP or individual companies to handle the mobility of multiple users. This invention provides, in fact also, the possibility to each user to manage its mobility by itself by installing the SNAPT on any Internet node (e.g. on the home PC if directly connected to the Internet). This is a completely new approach: the mobility handling can be distributed and not only centralized as in the prior art.

This invention provides a seamless handover solution using a pair of applications which re-route data without any modification of the OSI protocol stack and without any modification of the Client and Server applications source code. The Client application must only be set to consider the CNAPT as its Server application (e.g. its TCP/UDP segments have to be addressed to the CNAPT IP address and not to the Server application IP address); this can be done statically by modifying its configuration file (if present) or dynamically at run time through its GUI (if provided). The Client application data (payload) arrives to the CNAPT, e.g. inside a TCP/UDP segment, and then the CNAPT forwards only the payload e.g. inside a new TCP/UDP segment to the SNAPT making an address and port translation, without any encapsulation (in the sense that no one byte is added to the original payload). The SNAPT forwards the payload received by the CNAPT, e.g. in a new TCP/UDP segment, to the Server application making an address and port translation (see FIG. 33). The Server application receives the TCP/UDP segment sent by the SNAPT considering it as coming from the Client application. The data sent by the Server application follow a mirror path of the Client application data. The address and port translations only require the modification of the transport header (TH) and the network header (NH). This invention requires two additional sockets for each Client/Server socket. The Client/Server socket is replaced at application layer by a Client application/CNAPT socket, a CNAPT/SNAPT socket and a SNAPT/Server application socket (see FIG. 33).

If the mobile device running the CNAPT application changes its IP address and if the time requested by the IP transition phase is smaller than the Client/Server application timeout, the Client and the Server applications interaction only suffers a temporary reduction of the quantity of data transmitted per unit of time (throughput) and a delay in the replies proportional to the length of the IP transition phase. No one byte is lost or corrupted during the IP transition phase.

All operations of the CNAPT application and the SNAPT application are performed according to the invention at application level (OSI Layer 7). Operating at the highest level of abstraction, i.e. at the highest layer, this invention has the advantage that all activities can be easily and quickly adapted to the evolution of wireless networks standards, to new network access technologies, to the different Operating Systems (Windows 98/2000/2003/XP, Windows CE/PocketPC, Symbian, PalmOS, Linux and so on) and to future releases of such Operating Systems. A high degree of platform independency can be achieved by implementing the CNAPT and the SNAPT applications in Java. Moreover, operating at layer 7, this invention has many further advantages compared to the methods and systems of prior art: (1) It does not have to take care of Mobile IP concepts and implementation; i.e. it works in a transparent way over Mobile IP (v4 or v6) exactly as it works over IPv4 or IPv6. (2) It can use all the widespread commercial products operating at session (L5), transport (L4) or network (L3) or lower level (L1, L2) to manage the security and to provide all the security features. Particularly, it does not require the implementation of any custom security feature: it can work in a transparent way over IPSec (IP Security by IETF (Internet Engineering Task Force)), L2TP (Layer Two Tunneling Protocol) or other VPN (Virtual Private Network) protocols. (3) It does not care what kind of network connection is used, and the invention thereby works indifferently in circuit-switched and packet-switched networks. (4) It provides an automatic and/or a semi-automatic/assisted way to make network connections. The comparison of this invention with the prior art highlights its innovative idea and its advantages. Operating at layer 7, this invention provides an extreme flexible and simple way to solve the problem of the interruption of service in case of network connection switch.

SHORT DESCRIPTION OF THE DRAWINGS

Various embodiments of the present invention will be described in the following with reference to examples. The examples of the embodiments are illustrated by some of the following attached figures.

DESCRIPTION OF THE INVENTION

In this document what is meant by the terms "computer" or "device" are, inter alia, all possible so-called Customer Premise Equipment (CPE): PC, routers, laptop, PDA, smartphones etc.

In this document what is meant by the term "socket" is an Internet socket, i.e. one end of a bi-directional communication link between two programs defined as the combination of an IP address and a port number.

Figure 1:
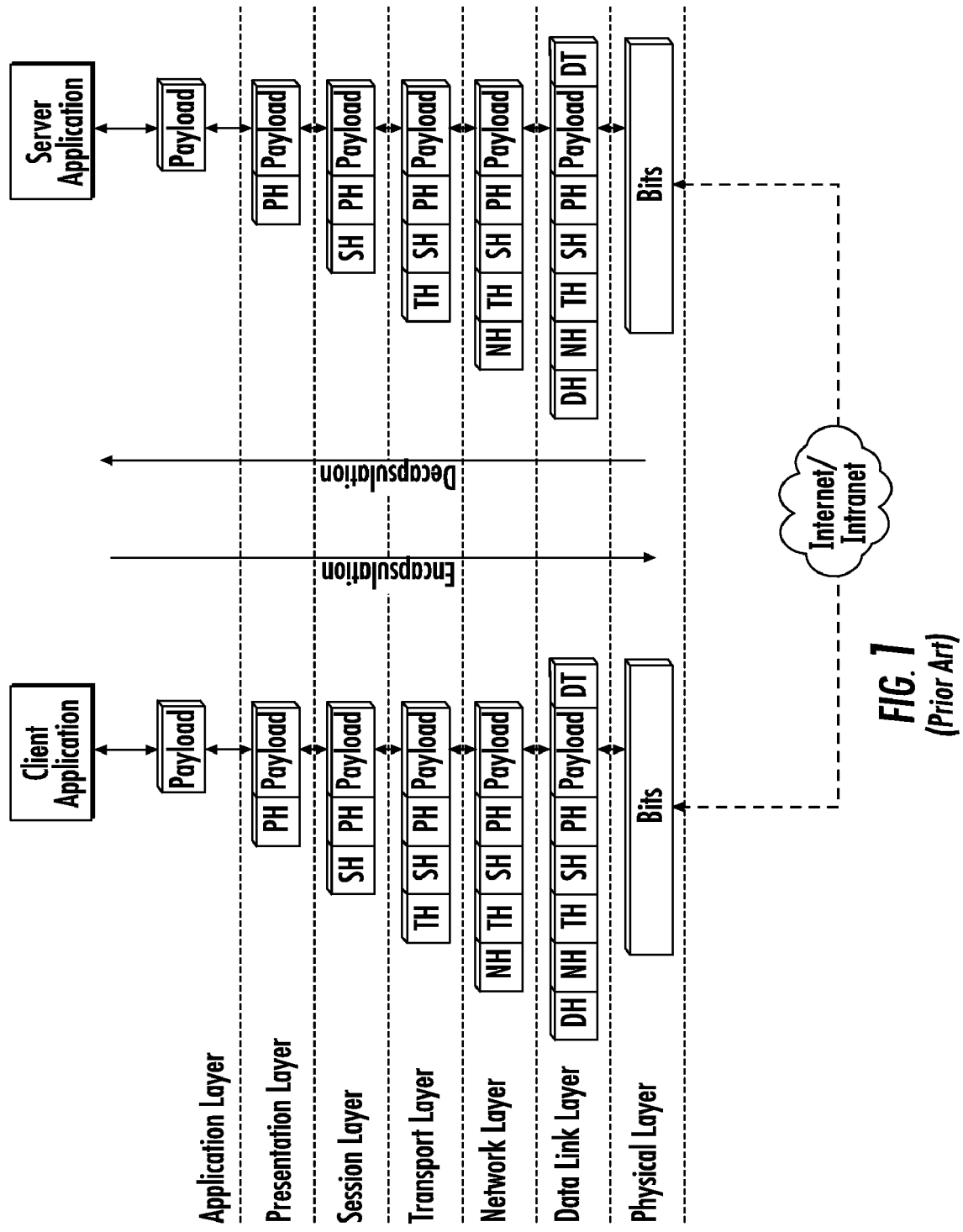
FIG. 1 shows a block diagram illustrating schematically the OSI-7 Layers Protocol Stack as defined in the prior art.
Figure 2:
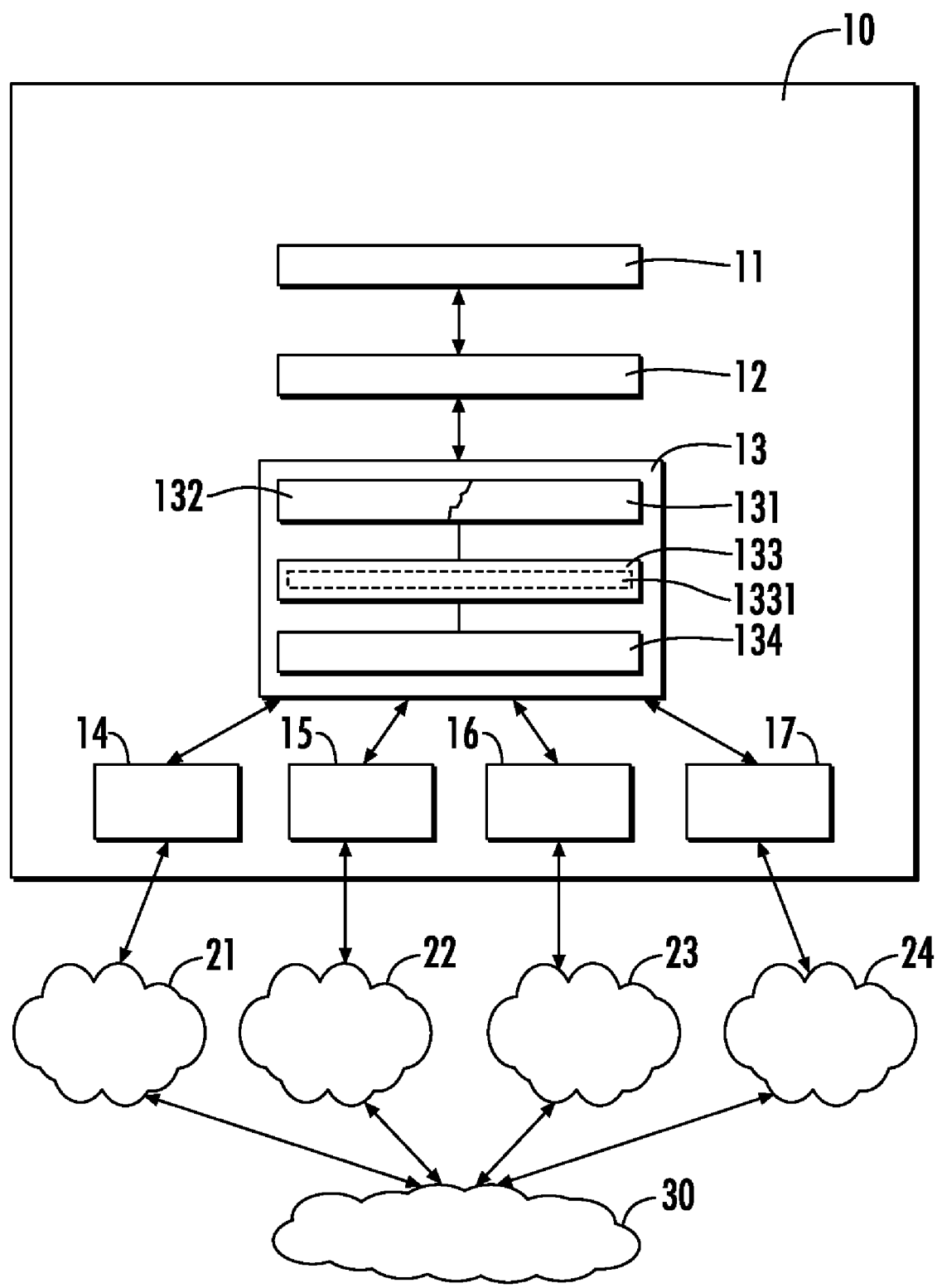
FIG. 2 shows a block diagram illustrating schematically the architecture of WO 02/103978 A2 of the prior art.
Figure 3:
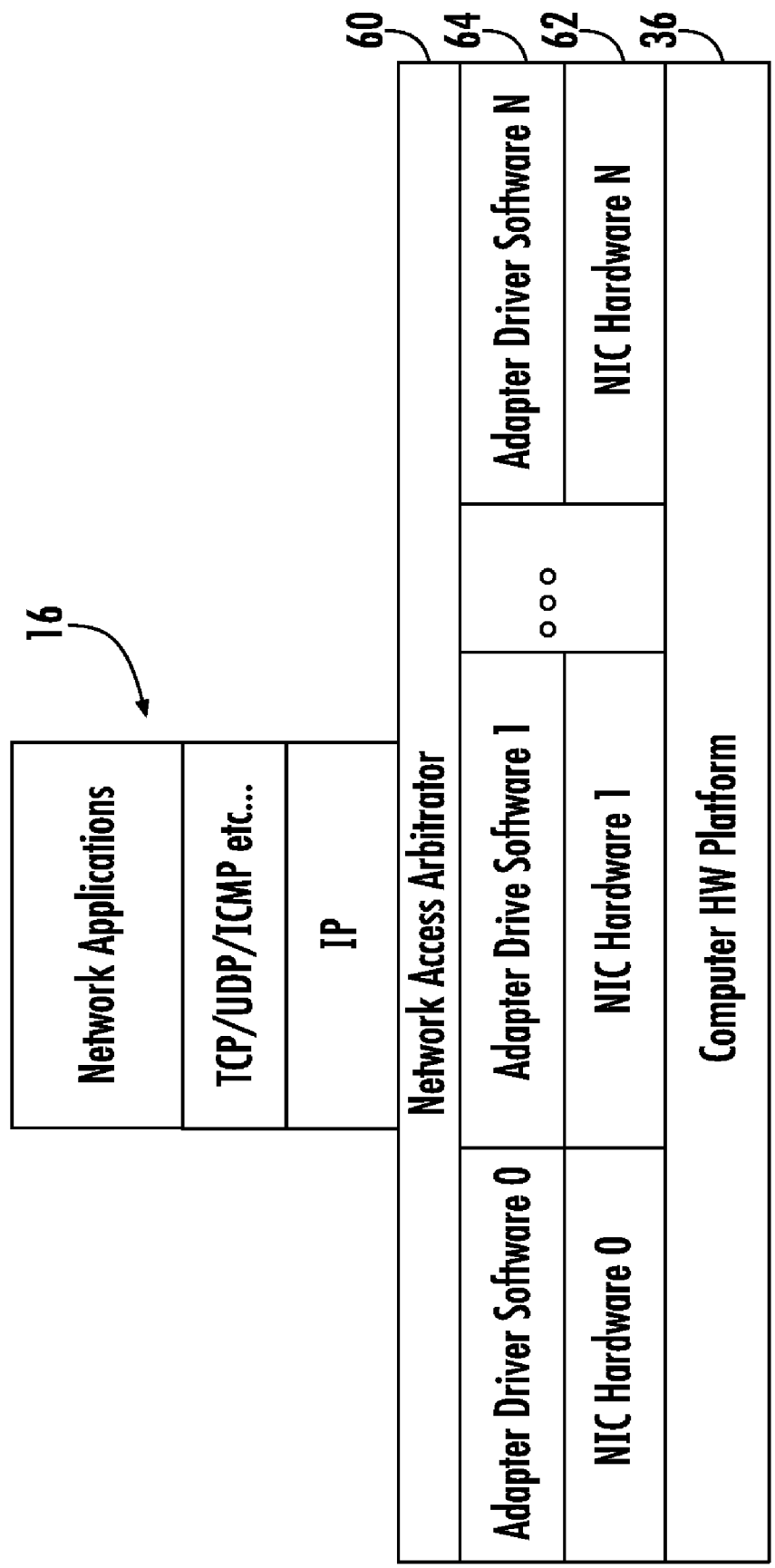
FIG. 3 shows a block diagram illustrating schematically the architecture of EP 1089495 A2 of the prior art.
Figure 4:
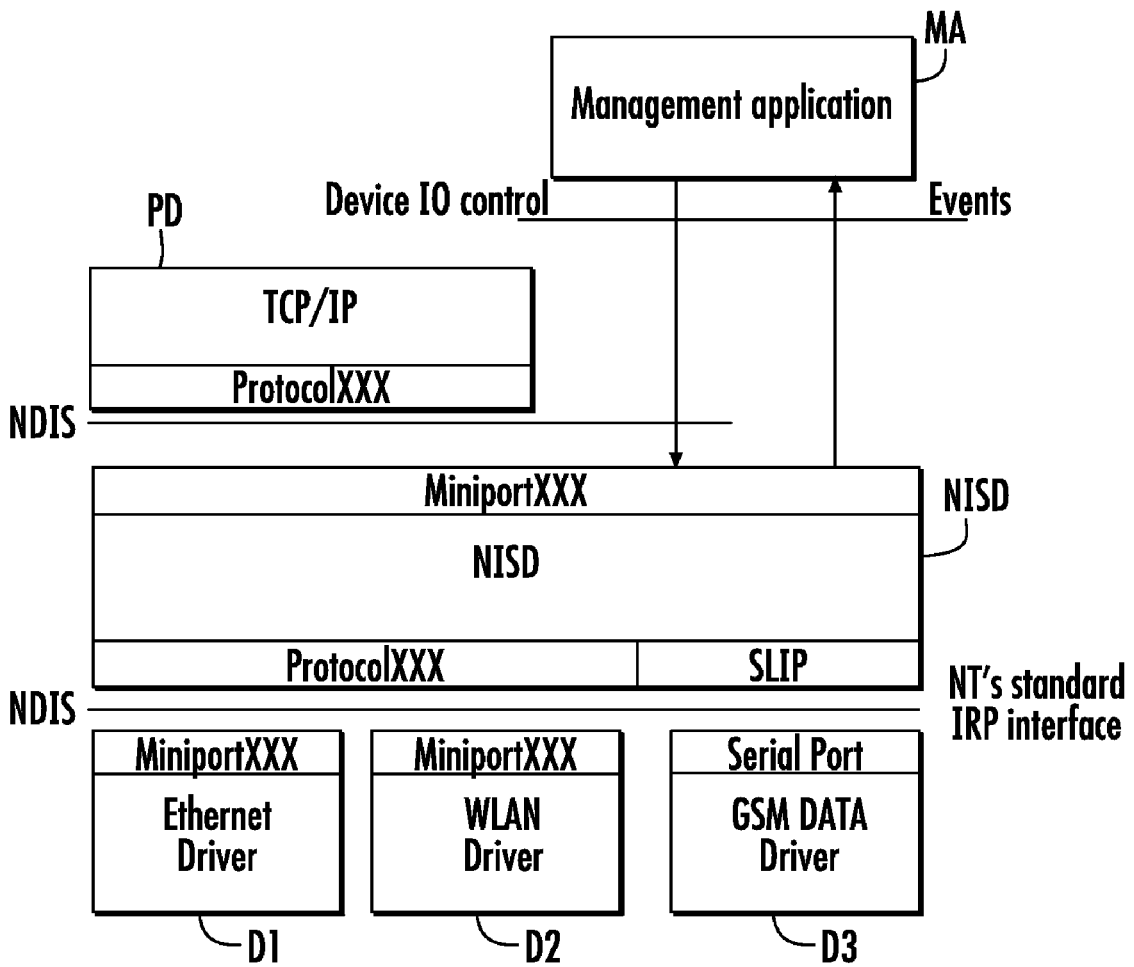
FIG. 4 shows a block diagram illustrating schematically the architecture of EP 0998094 A2 of the prior art.
Figure 5:
FIG. 5 shows a block diagram illustrating schematically a Client/Server application using Internet to exchange data.
Figure 6:
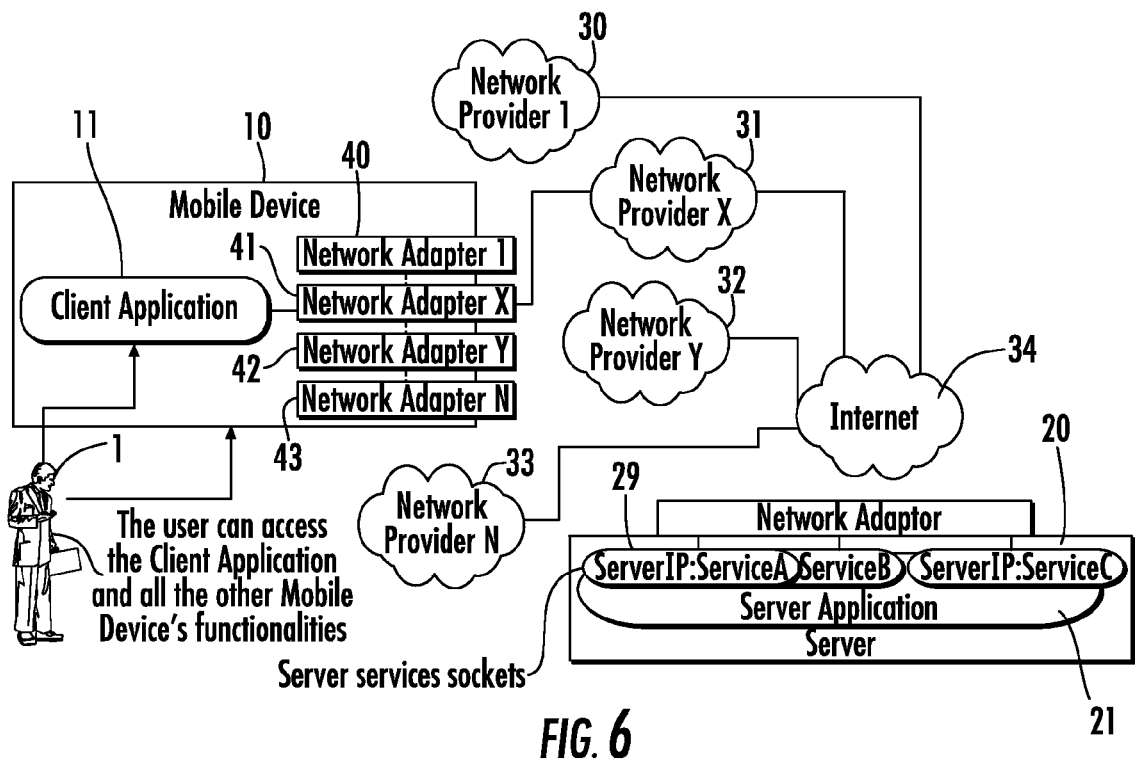
FIG. 6 shows a block diagram illustrating schematically the Client application using a local network connection and the Internet to reach its Server application.

FIG. 5 to 11 illustrate an architecture that can be used to achieve the invention. The invention can be used by any Client application that is connected through an IP network (e.g. Internet or any wired/wireless Intranet) to its Server application (FIG. 5). The method and system according to the invention comprise one or more Client applications II, running on a mobile device 10, that are connected via a local network provider 30/31/32/33 and through an IP network 34, e.g. the worldwide backbone network called Internet or any wired/wireless Intranet, to a Server application 21 (FIG. 6). The networks implemented by providers 30/31/32/33 can comprise Ethernet or another wired LAN (Local Area Network), Bluetooth, GSM (Global System for Mobile Communication), GPRS (Generalized Packet Radio Service), EDGE (Enhanced Data-Rates for OSM Evolution), 1XRTT (Radio Transmission Technology), CDMA2000 (Code Division Multiple Access), UMTS (Universal Mobile Telecommunications System) and/or WLAN (Wireless Local Area Network), etc. The term "mobile device" 10, encompasses, inter alia, all possible devices (laptops, PDAs, smart-phones etc) and in general all so-called Customer Premise Equipment (CPE) equipped with one or more different physical network interfaces 40 to 43, which can also support the different network standards of the various network providers 30 to 33. The physical network interfaces 40 to 43 of the mobile device 10 can comprise e.g. interfaces for the mentioned networks as e.g. Ethernet or another wired LAN, Bluetooth, OSM, GPRS, EDGE, CDMA2000UMTS and/or WLAN, etc. The interfaces can be not only packet-switched interfaces, as used directly by network protocols such as e.g. Ethernet or Token Ring, but also circuit-switched interfaces which can be used by means of protocols such as e.g. PPP (Point-to-Point Protocol), SLIP (Serial Line Internet Protocol) or GPRS (Generalized Packet Radio Service). i.e. whose interfaces do not have, for example, any network addresses such as a MAC or a DLC address. The invention provides any Client application with the best local network connection to the IP network 34 in term of bandwidth, reliability and cost effectiveness among all the wired/wireless network access technologies and/or access providers available at a certain time and location 30/31/32/33, managing the switch (when needed or convenient) in a transparent automatic and/or semi-automatic way without interrupting active network applications or sessions. In particular, the switch between the networks can comprise a change of a physical network interface among different networks technologies, such as e.g. Ethernet, Bluetooth, mobile radio networks (GSM, GPRS, EDGE, CDMA2000, UMTS, etc.) or WLAN, or also a topological location change within the same network technology, for example a device linked to an Ethernet network that migrate to another Ethernet network or a device linked to a Wi-Fi HotSpot that migrate to another Wi-Fi HotSpot. In particular the invention is suited for client network applications running on a mobile device 10 which is able to hold simultaneously at least two different kind of network connection (GSM, GPRS, EDGE, CDMA2000, UMTS, Satellite Links, Wi-Fi, LAN, PSTN [Public Switched Telephone Network], xDSL as ADSL [asymmetric digital subscriber line] or SDSL [symmetric digital subscriber line] etc): for instances mobile devices with a GPRS modem and an independent Wi-Fi adapter or mobile devices with a Wi-Fi adapter and an independent UMTS modems or so on. However, it is important to note that the invention also works with mobile devices able to hold only one network connection at a time (e.g. a laptop that possesses only one slot for insertion of a PCMCIA network card (PCMCIA: Personal Computer Memory Card International Association). According to the invention the client application and its server exchange data via an IP network, such as e.g. the Internet, using exactly one network connection at a time.

Figure 7:
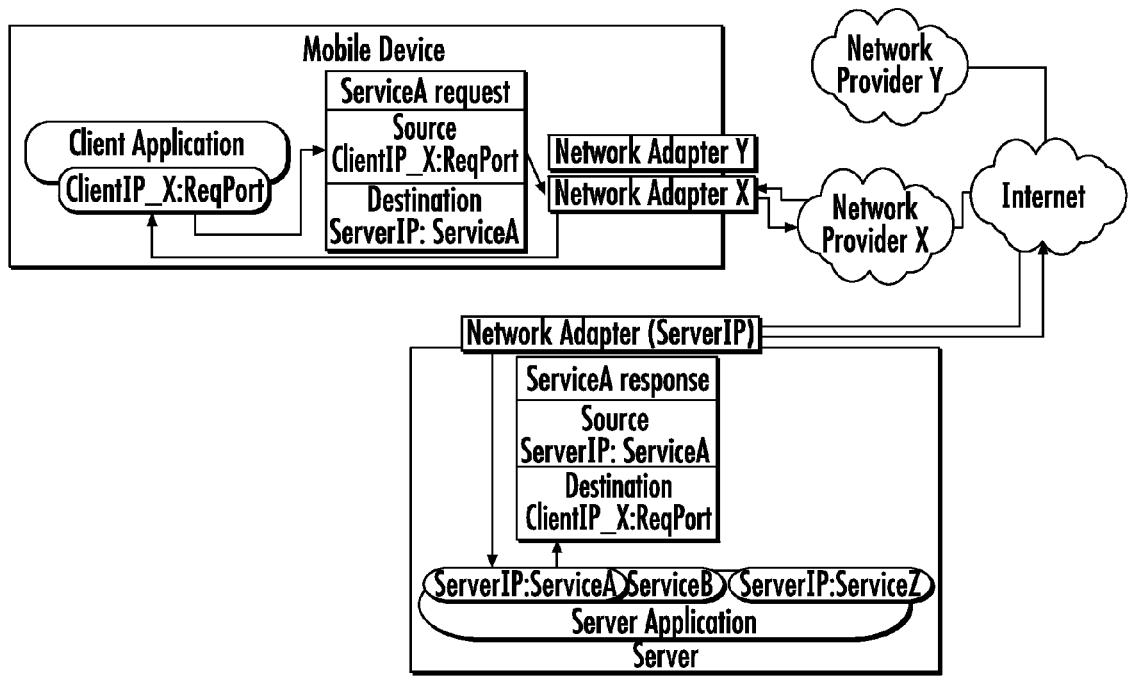
FIG. 7 shows a block diagram illustrating schematically the Client application sending a request of service A to its appropriate Server application.

Suppose that the mobile device using the client application is able to provide N different network connections through N network adapters (with N≧1) (40-43). The server application may provide one or more services and for each of them a server socket 29 listens for client application requests (FIG. 6). Suppose further that the mobile device is e.g. connected to Internet via the network provider X [31] and has the IP address "ClientIP_X". Besides, suppose that a second network provider, provider Y [32], is available at the same time. The client application now uses a socket to send its server a service request. The server replies with packets having "ClientIP_X" as destination IP address (FIG. 7). If Provider X becomes unavailable (slowly, e.g. the Provider X is a Wireless provider and the mobile device is slowly leaving its coverage area, or suddenly, e.g. the LAN/Ethernet cable is suddenly unplugged), while the other Provider Y remains still available, a new network connection through the Provider Y must be established, in order to maintain active the client application and the current session. When established, the old network connection, if already up, should be closed because it will no longer be available. The problem is that with the new network connection, the mobile device will be assigned a new IP address (therefore changing its IP address from "ClientIP_X" to "ClientIP_Y"): due to such a change, the service response can no longer reach the client application, resulting in the application/session crash and interruption of the service.

Figure 10:
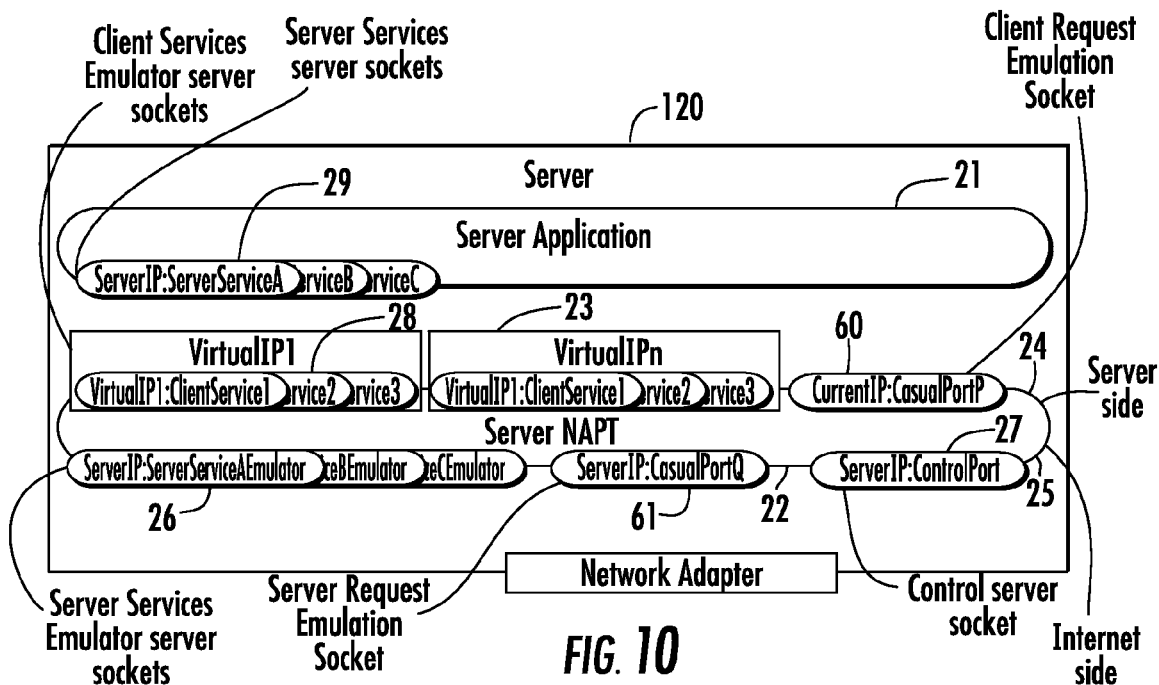
FIG. 10 shows a block diagram illustrating schematically the SNAPT module according to the invention.

The invention avoids any interruption of service without any modification of the providers' infrastructure. One of the purposes of the invention is to make the IP address change of the mobile device totally transparent to the client and server applications. The invention acts as middleware, making the client application believe that it is running either on the same device as the server application or in a device directly connected to the server (depending on the configuration adopted). This is achieved through the client-service module 12, further called CNAPT (Client Network Address and Port Translator) (FIG. 8), and a server-service module 22, further called SNAPT (Server Network Address and Port Translator) (FIG. 10). By means of the CNAPT module and the SNAPT module, if the provider X becomes unavailable (slowly or suddenly) while the network provider Y remains still available, and if there is enough time for the IP transition phase (that is to say the client and the server applications do not go into timeout), the switch between "ClientIP_X" and "ClientIP_Y" is totally transparent to the client and server applications that continue their execution without any session crash and/or interruption of service. Note that the IP transition phase can be generated also by a temporary interruption of the Internet connection provided by the network provider X, that however remains still available; in fact that temporary interruption may cause a modification on the assigned IP address, e.g. from "ClientIP_X" to "ClientIP_X1". During the IP transition phase: (1) The CNAPT stops forwarding all the outgoing IP packets generated by the Client application. They are buffered by the CNAPT and they will be forwarded at the end of the IP transition phase. (2) The SNAPT stops forwarding all the outgoing IP packets generated by the Server application and directed to the switching CNAPT. They are buffered by the SNAPT and they will be forwarded to the switching CNAPT at the end of the IP transition phase.

Comprising the CNAPT module and the SNAPT module the invention is able to act as a layer 7 relay system with a high level of flexibility. The CNAPT module processes the client requests and relays them to the SNAPT module. The SNAPT module processes the client requests and, at its turn, relays them to the server application. The server response path is the mirror image of the client request. The CNAPT module and the SNAPT module comprise the necessary infrastructure, including hardware and software components and/or units, to achieve a described method and/or system according to the invention.

Figure 8:
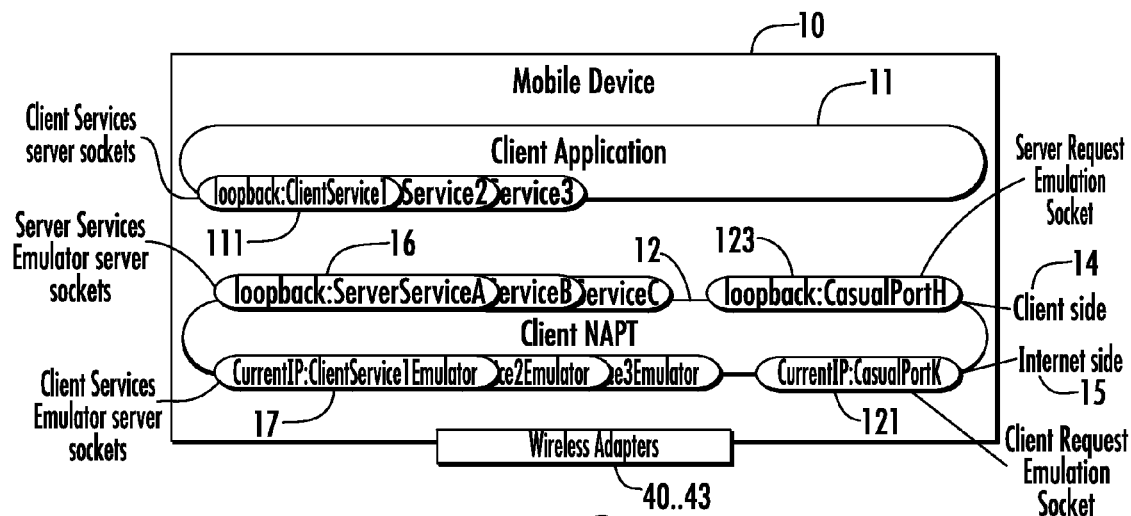
FIG. 8 shows a block diagram illustrating schematically the CNAPT module according to the invention.

According to the invention, the Server IP address is modifiable in the client application (i.e. the Server IP address is not hard coded). The SNAPT module comprises in an appropriate memory unit at least the server IP address (or, in turn, the servers' IP addresses in case of multiple server applications, running on different devices, managed by the same SNAPT module), the server services' ports and the server services' type (connection-oriented, like services based on TCP (Transmission Control Protocol), or connectionless, like services based on UDP (User Datagram Protocol)) of its managed server application. The SNAPT module comprises means to emulate server services 29 providing a set of emulation services 26 operating on emulation ports different from the real services port in order to avoid bind errors (FIG. 10). Each CNAPT module comprises a unique ID (IDentification Number) that differentiates it from the other CNAPT modules. The CNAPT module further comprises in a memory unit at least the SNAPT IP address (or, in turn, the SNAPTs' IP addresses in case of a CNAPT module simultaneously connected to more than one SNAPT module), the server services' ports and type (connection-oriented or connectionless) of the server application managed by the SNAPT and the SNAPT module services' emulator ports. The CNAPT module also comprises in a memory unit the client IP address (or, in turn, the clients' IP addresses in case of multiple client applications, running on different devices, managed by the same CNAPT module), the eventual client services' ports and the client services' type (connection-oriented or connectionless) of its managed client application. Finally the CNAPT module comprises means to emulate the eventual client services 111 providing a set of emulation services 17 operating on emulation ports different from the real services ports in order to avoid bind errors (FIG. 8). The SNAPT module comprises, for each CNAPT module that provides client services, the client services' ports, the CNAPT services' emulator ports and the client services' type (connection-oriented or connectionless). These data are grouped by CNAPT module ID. If the client services are used, the SNAPT module must comprise also a set of virtual IP addresses 23 (FIG. 10) belonging to the same network to which it belongs (i.e. if the SNAPT module has the IP 192.168.102.150 and belongs to the network 192.168.102/24, it must have a set of virtual IP addresses belonging to 192.168.102/24 like 192.168.102.151, 192.168.102.152 and so on). Those addresses are used to accept simultaneous connections of different CNAPT modules managing client applications providing their client services on the same port, in order to avoid bind errors on that port. This is the case e.g. of n identical CNAPT modules managing a client application providing a client service on the port X, connected to a single SNAPT module. A different virtual IP address is used for each of those identical CNAPT modules. Obviously the number of virtual IP addresses must be equal to the number of those identical CNAPT modules that can access the SNAPT module simultaneously. During normal activity the SNAPT module knows the CNAPT module ID and the current IP of all the connected CNAPT modules.

As explained before, the invention comprises the possibility that the client application could also provide a set of services (connectionless or connection-oriented), the client services, that can be used by the server application for "PUSH" or "Publish/Subscribe" paradigms. For instance, the client application contacts the server application to register for some information updates, so when new information becomes available the server application may "push" them to the subscribed client applications on their services' ports. From now on, to simplify the explanation and the drawings, only the services provided by the server application are considered: it is easy to understand that client services are managed by the invention in a mirror-like manner to the server services.

Figure 9:
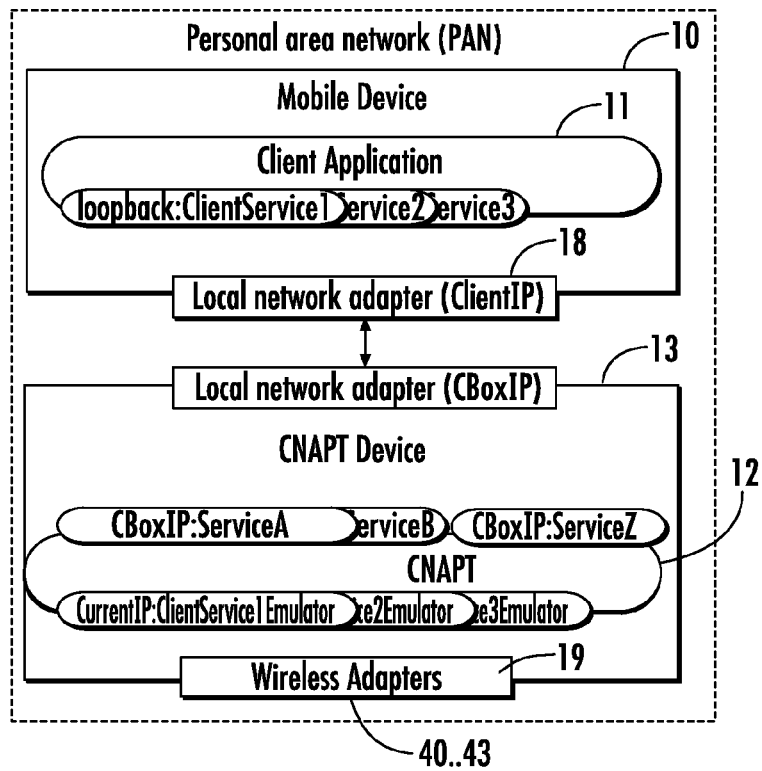
FIG. 9 shows a block diagram illustrating schematically the CNAPT and the Client application installed on different devices directly linked to form a PAN (Personal Area Network).

It is important to note that the invention does not require any modification of the client applications source code if: (a) The server IP address is not hard coded (that is to say the server IP address is not set directly in the source code). It must be possible to set the server IP address in a configuration file or at run time, with user 1 interaction (FIG. 6), in some client application input mask. (b) The source IP address of the eventual client services provided is not hard coded. It must be possible to set the source IP address of these client services to "loopback" address (the special address "127.0.0.1" for IPv4 and the "::1" for IPv6) in a configuration file or at run time, with user 1 interaction, in some Client application input mask. This is necessary because if the source IP address is set automatically to the mobile device IP, when this IP address changes for a switch phase the client services would be interrupted. This constraint is not necessary if the client applications 11 are running on devices 10 different from the CNAPT module device 13 (FIG. 9). In fact, in this case the source IP address is the client application device PAN IP address 18 (PAN: Personal Area Network) and it does not change during a switch phase (only the CNAPT module Internet IP address 19 changes during a switch phase). The invention does not require any modification of the Server application source code unless the client IP address, retrieved from the incoming packets, is used for critical internal activities (for instance in case of authentication based on the client IP address).

The CNAPT module according to the invention can be realized by means of appropriate software and/or hardware components. The CNAPT module comprises means to emulate server applications on the client side 14 and means to emulate client applications on the network side 15, e.g. Internet side (FIG. 8). The CNAPT module creates for each server service, a server socket 16 on the client side. This server socket listens on the real server service port (server service emulator server socket). For each server service request, provides a client request emulation socket 121 on the Internet side. This socket relays packets to the right service emulator server socket provided by SNAPT. For each client service 111, provides a server socket 17 on the network side, e.g. on the Internet side. This server socket listens on (i.e. waits for a signal on) the client service emulator port (client service emulator server socket). This port is different from the client service real port in order to avoid a bind error. For each client service request, provides a server request emulation socket 123 on the client side. This socket relays packets to the real Client server socket.

The CNAPT module not only acts as a layer 7 relay system. It also launches a "task" module in order to provide the client application with the best network connection, e.g. Internet connection, in term of bandwidth, reliability and cost effectiveness. The "task" module can be realized as a software and/or hardware module and has two main activities: (1) It continuously verifies the current network connection reliability and performance (Check Activity). (2) It continuously searches for new network providers (Search Activity). At any time, the user 1 can ask the "decision task" module to switch to another available network provider. This is useful when the current network connection is a wired connection and the user 1 wants to switch to a wireless connection so that the user can unplug for instance the Ethernet cable. Note that the "decision task" can launch the Search and the Check activities only if it is running on a mobile device that is able to hold simultaneously at least two different kind of network connection (GSM, GPRS, EDGE, UMTS, Satellite Links, Wi-Fi, LAN, PSTN, ADSL . . . etc). If that mobile device is able to hold only one network connection at a time (e.g. a laptop that possesses only one slot for insertion of a PCMCIA network card), the Search activity can't be launched and the Check activity only verifies the reliability of the current Internet connection signaling to the user 1 its eventual unavailability. In this case, the switch from one network provider to another (or also, in case of temporary interruption, to the same network provider if it is became available in the meanwhile, e.g. there was only a temporary problem) can be decided only by the user 1 with a specific request to the "decision task".

The Check Activity as a part of the "task" module verifies the reliability and the performance of the current network connection, e.g. Internet connection, every Y ms. If the reliability/performance indexes go down some specified "thresholds" (that can be set by the user 1) or if the current Internet connection has been interrupted, the "Check Activity" searches for new network providers in a similar way as the Search Activity (or trying to retrieve a new Internet connection from the same network provider if it is became available in the meanwhile, e.g. there was only a temporary problem). It can work in two ways: manual and automatic mode. In both the modes if it does not find any other network providers, it signals to the user 1 that the current network connection will be no longer available. In the manual mode, if it finds at least one alternative provider, it suggests the user 1 to switch to the better alternative. If and only if the user 1 does not authorize the switch and the current network connection indexes go down some specified "threshold" (that can be set by the user 1), the Check Activity, in order to avoid any interruption of service, switches to an alternative network provider available (preferring the provider allowing a totally automatic connection procedure) and it signals to the user 1 that the current network connection will be no longer available. In the automatic mode, if the Check Activity finds at least one alternative provider, it automatically decides on the network provider switch (preferring the alternative provider which allows a totally automatic connection procedure). It may perhaps require some user 1 interaction to establish a semi-automatic/assisted network connection. During the switch, the Check Activity avoids any interruption of service by the method described in this invention. After the switch has been made the old network connection, e.g. Internet connection, will be closed if it is still open.

Figure 19:
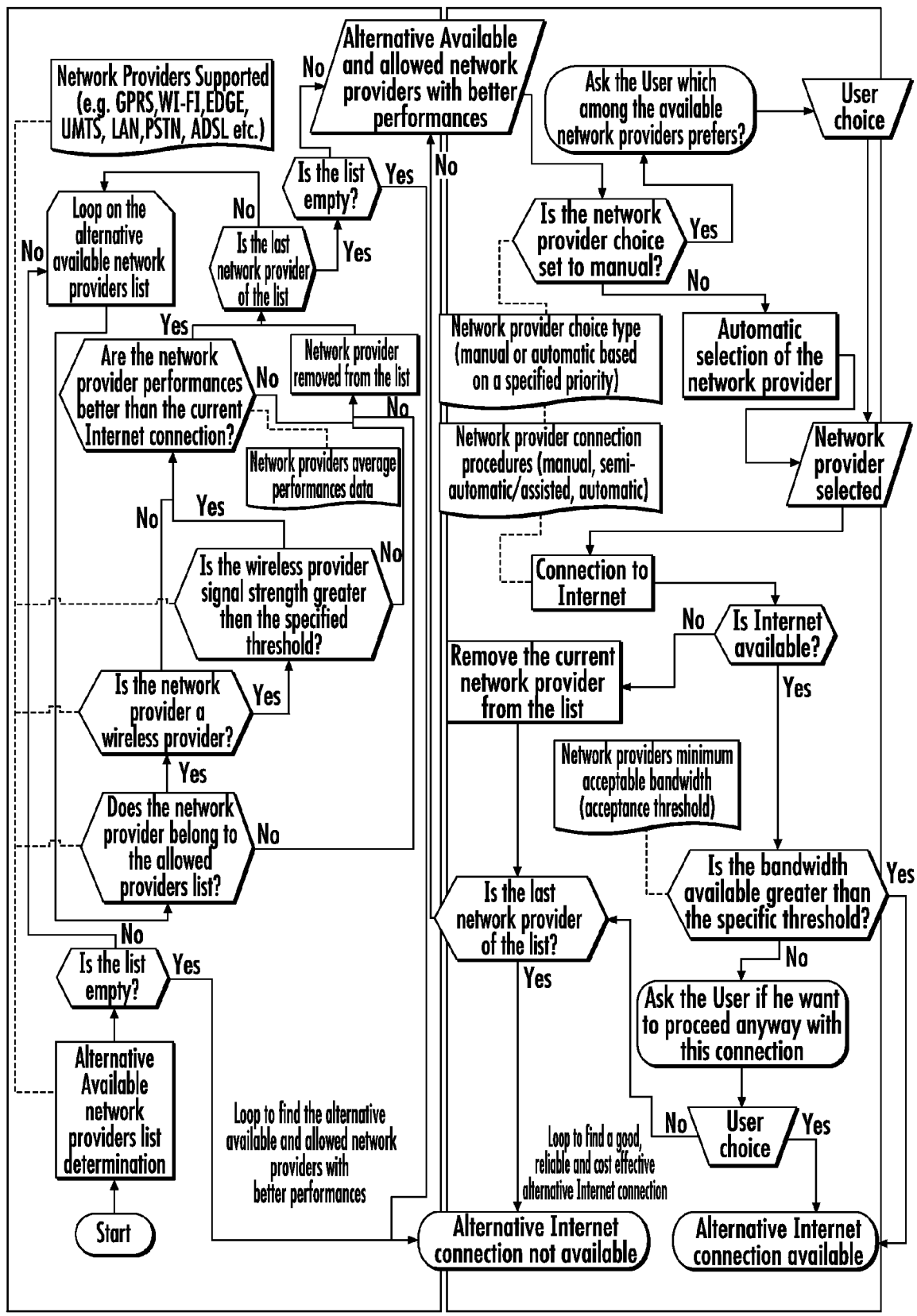
FIG. 19 shows a flowchart illustrating schematically the method used by "Search Activity" to search for alternative network providers.

The Search Activity as another part of the "decision task" module searches, without disturbing the current connection, every X ms for other available networks providers (FIG. 19). It can work in two ways: manual and automatic mode. In the manual mode the user 1 has to choose the available network provider that he prefers. When the Search Activity finds at least one network provider that could provide a network connection, e.g. Internet connection, better than the current one, it asks the user 1 if he wants to switch. In the automatic mode, the Search Activity automatically decides on the network provider switch (the decision is made using a set of parameters that can be modified by the user 1). It may eventually require some user 1 interaction to establish a semi-automatic/assisted network connection. During the switch, the Search Activity avoids any interruption of service by the method described this invention. After the switch has been made, the old network connection, e.g. Internet connection, will be closed.

The SNAPT module according to the invention can be realized by means of appropriate software and/or hardware components. The SNAPT module comprises means to emulate the client application on the server side 24 and means to emulate the server application on the network side 25, e.g. Internet side (FIG. 10). The SNAPT module creates for each server service 29, a server socket 26 on the Internet side. This server socket listens on the server service emulator port (server service emulator server socket). This port is different from the server service real port in order to avoid a bind error. For each server service request, the SNAPT module provides a client request emulation socket 60 on the server side 24. This socket relays packets to the real service server socket. For each client service the SNAPT module creates a server socket 28 on the server side 24. This server socket listens on the real client service port (client service emulator server socket). The client service emulator server sockets are grouped by CNAPT module ID. Those groups using the same ports are bound to different Virtual IP addresses 23 in order to avoid bind errors. For each client service request, the SNAPT module provides a server request emulation socket 61 on the Internet side 25. This socket relays packets to the right client service emulator server socket provided by the correspondent CNAPT ID. Further the SNAPT module comprises a control server socket 27 on the network side 25. The CNAPT module communicates with the SNAPT module over the network 30/31/32/33/34 through this "control server socket". This connection is used to exchange handshaking packets during an IP address-changing phase and it can be used to optimize the interaction between the client and the server application.

In the following will be described an embodiment according to the invention and the main embodiment variants. In each embodiment, shown here, a unique client application and a unique server application are shown in the appended figures. Nothing changes if there are n client applications 11 on the mobile device 10 that, through the local CNAPT module, are using the services provided by the m server applications 21 managed by the connected SNAPT module on the same device 20. It is possible that each SNAPT module can accept the simultaneous connection from more than one CNAPT module.

Figure 11:
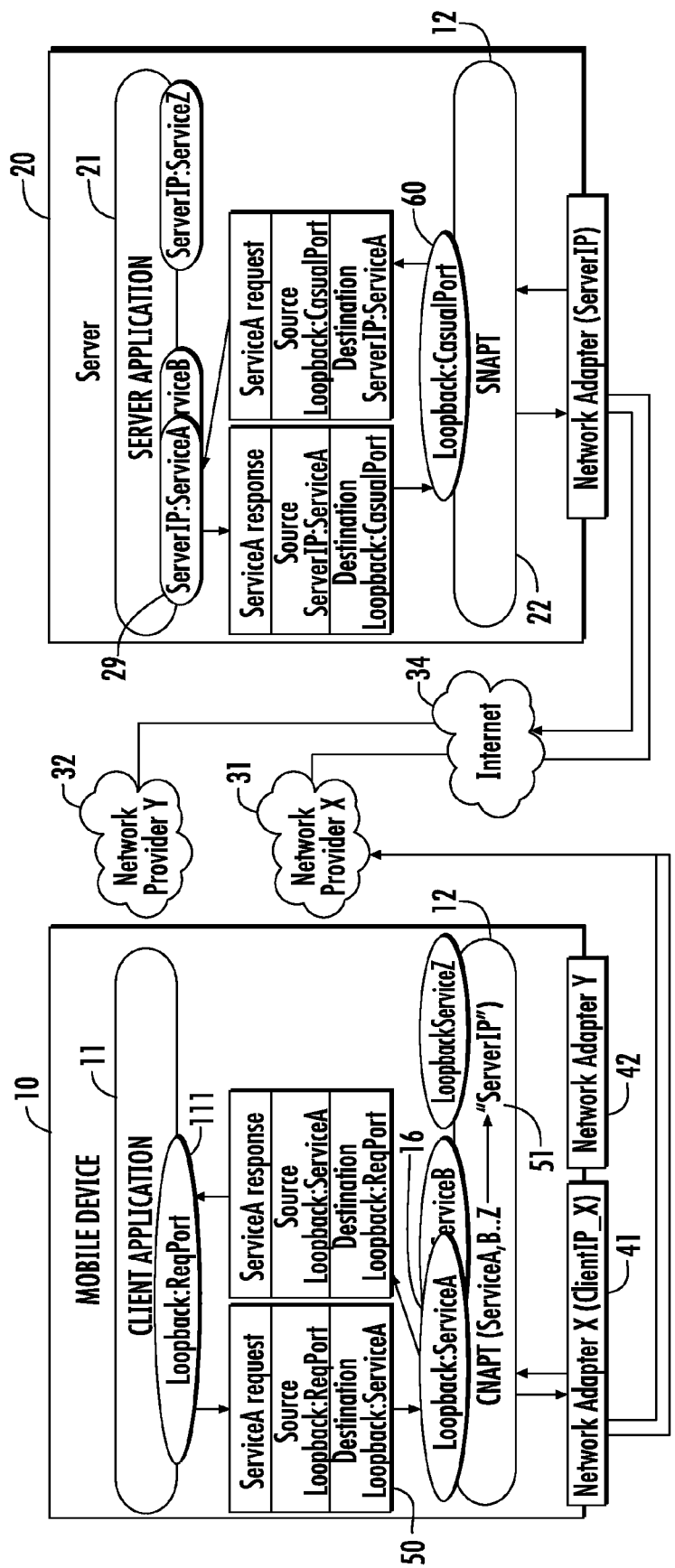
FIG. 11 shows a block diagram illustrating schematically an embodiment according to the invention, the "Basic configuration".

In a first embodiment, the "Basic configuration", is installed on the client application mobile device 10 and the SNAPT module is installed on the same device 20 as the server application 21 (FIG. 11). The server IP address is set to "loopback" (50) in the client application. The CNAPT module sets the SNAPT IP address for each server service to "ServerIP" (51). In this configuration the CNAPT module emulates the server services on the client side providing a server socket "loopback:ServiceEmulator" 16 for each of them ("loopback:ServiceA", "loopback:ServiceB" and so on). This socket can handle multiple concurrent client requests. The client application accesses the services by sending and receiving data to/from these sockets. On the server side the SNAPT module emulates the client application requests providing a socket "loopback:CasualPort" 60 for each of them. The Server application handles Client requests by sending and receiving data to/from these sockets.

Figure 12:
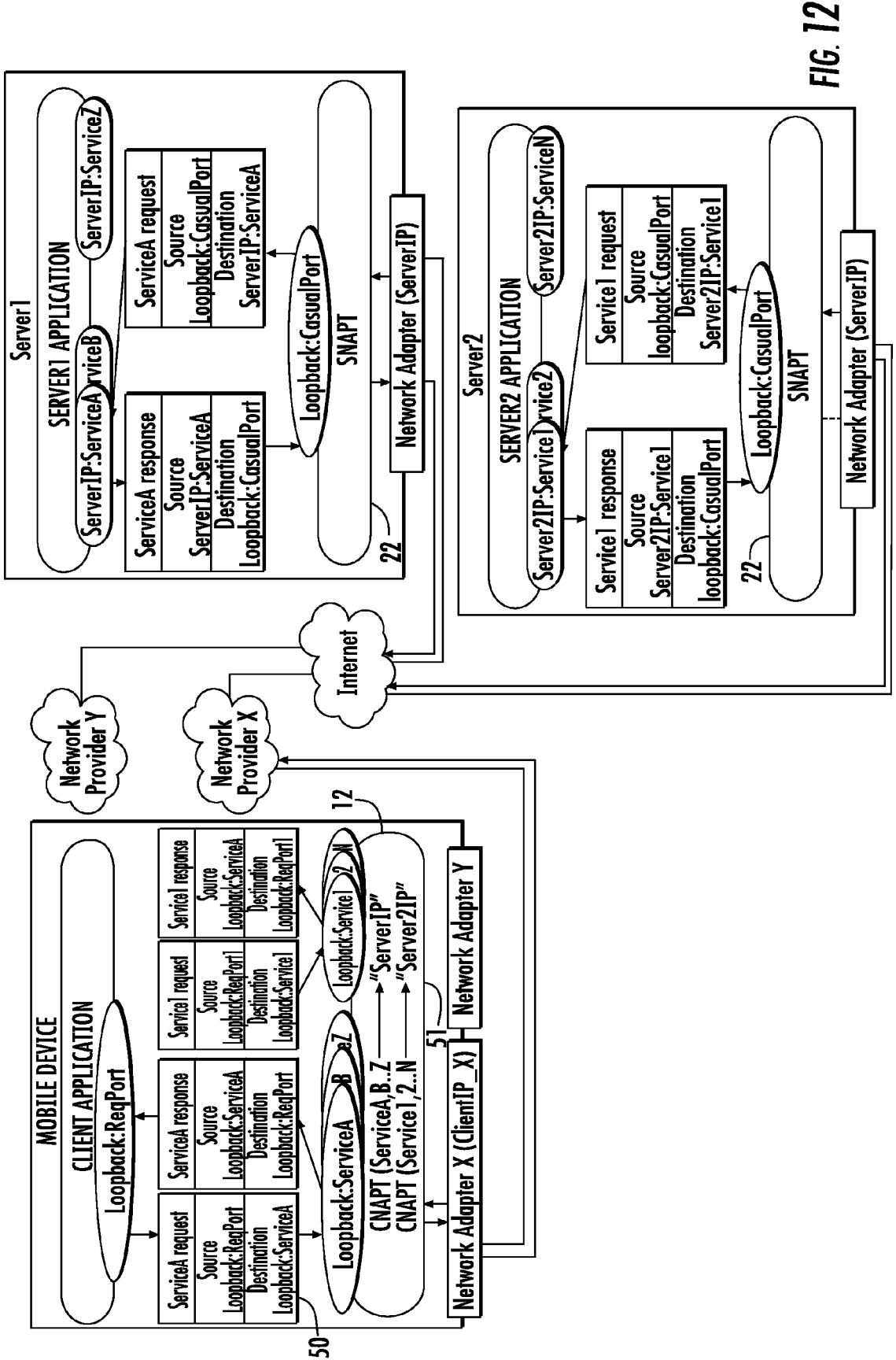
FIG. 12 shows a block diagram illustrating schematically an embodiment variant according to the invention, the "Multi-Site configuration".

In an embodiment variant, the "Multi-Site configuration", the CNAPT module is installed on the client application mobile device 10 and it is connected simultaneously to more than one SNAPT module. Each SNAPT module is installed on the same device as its server application (FIG. 12). The Servers IP addresses are set to "loopback" (50) in the client application. The CNAPT module sets the SNAPT IP address to "Server1IP" for the services A, B . . . Z and to "Server2IP" for the services 1, 2 . . . N (51). In FIG. 12 a unique client application and a unique server application are shown. Nothing changes if there are n client applications on the mobile device that, through the local CNAPT module, are simultaneously using the services provided by the m server applications managed by all the connected SNAPT modules. This embodiment variant has the advantage that the system according to the invention can grant the seamless handover for the network connection among one or more client applications and two or more server applications running on different Internet nodes. With this embodiment a user 1, without interruption of service, can move from one local network provider to another one keeping active multiple sessions with multiple different service providers.

Figure 13:
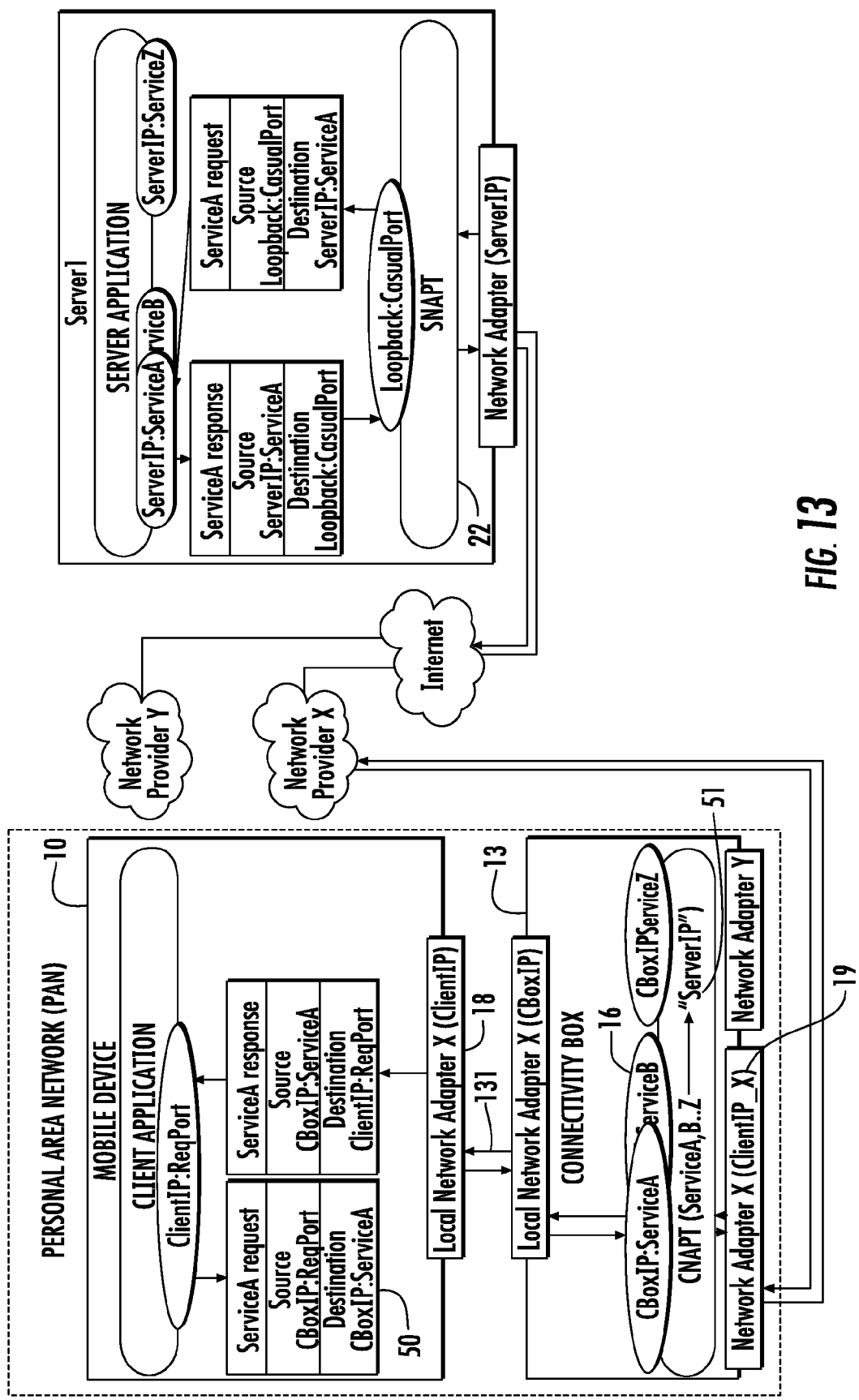
FIG. 13 shows a block diagram illustrating schematically an embodiment variant according to the invention, the "Client PAN configuration".

In an embodiment variant, the "Client PAN configuration" (PAN: Personal Area Network), the CNAPT module is installed on an additional mobile device 13, that could act as a "connectivity box" able to manage the highest possible number of network access technologies and linked to the original mobile device through a broadband IP connection 131 (FIG. 13). The client application mobile device 10 and the "connectivity box" have a fixed private IP address each, "ClientIP" and "CBoxIP": they are part of a very small local network (e.g. they are connected using an Ethernet cross cable or a Wi-Fi ad-hoc connection or a Bluetooth connection). The server IP address is set to the "connectivity box" IP address ("CBoxIP") (50) in the client application. The CNAPT module sets the SNAPT module IP address for each server service to "ServerIP" (51). The CNAPT module comprises means to emulate the server services providing, on the client side, a server socket "CBoxIP: ServiceEmulator" 16 for each of them ("CBoxIP:ServiceA", "CBoxIP:ServiceB" and so on). This socket can handle multiple concurrent client requests. The client application accesses the services by sending and receiving data to/from these sockets. On the server side the SNAPT module comprises means to emulate the client application requests providing a socket "loopback:CasualPort" 60 for each of them. The server application handles client requests by sending and receiving data to/from these sockets. This embodiment variant has the advantage that the user 1 has to interact with a mobile device 10 simpler and maybe smaller than in the previous embodiments. In the previous embodiments this mobile device should have more than one network adapter and it must run the CNAPT module and the client application. In this embodiment variant instead it must have only one network adapter and it must run only the client application, while the system according to the invention, granting the seamless handover, is provided by the "connectivity box". Another advantage of this embodiment variant is that, in order to avoid any modification of the client applications source code, it is not necessary to set the source IP address of the eventual client services to "loopback" address. In fact, in this case the source IP address is the client application device PAN IP address ("ClientIP") 18. Since it does not change during a switch phase (only the CNAPT Internet IP address 19 changes), the client services will not be interrupted.

Figure 14:
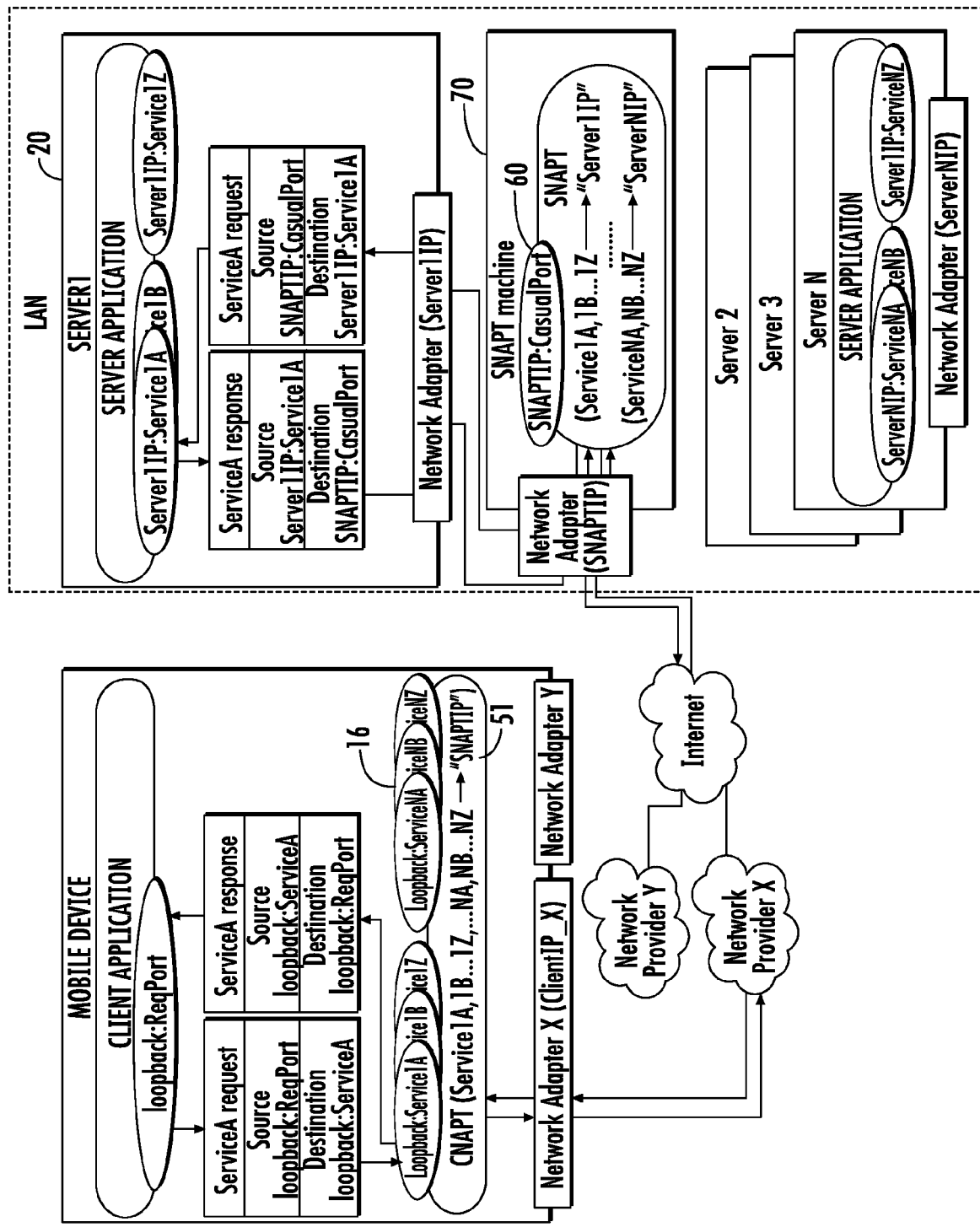
FIG. 14 shows a block diagram illustrating schematically an embodiment variant according to the invention, the "Multi-Server LAN configuration".

In an embodiment variant, the "Multi-Server LAN configuration", the CNAPT module is installed on the client application mobile device 10 and the SNAPT module is installed on an additional dedicated device 70 placed in the same network of the original server device 20 (FIG. 14); in this way a unique SNAPT module can manage more server applications on different devices at a time. The CNAPT module sets the SNAPT IP address for each server service to "SNAPTIP" (51). On the client side, the CNAPT module comprises means to emulate the servers' services providing a server socket "loopback:ServiceEmulator" 16 for each of them ("loopback:Service1A", . . . , "loopback:Service1Z", . . . , "loopback:ServiceNA", . . . , "loopback:ServiceNZ"). This socket can handle multiple concurrent client requests. The client application accesses the services by sending and receiving data to/from these sockets. The SNAPT module emulates the client application requests providing a socket "SNAPTIP: CasualPort" 60 for each of them. The server applications (1 . . . N) handle client requests by sending and receiving data to/from these sockets. This embodiment variant has the advantage that a SNAPT module can manage simultaneously more different server applications running on different devices on the same network; in this way a company that provides more and differentiated server services can offer to its customers the seamless handover feature using a unique SNAPT device.

Figure 15:
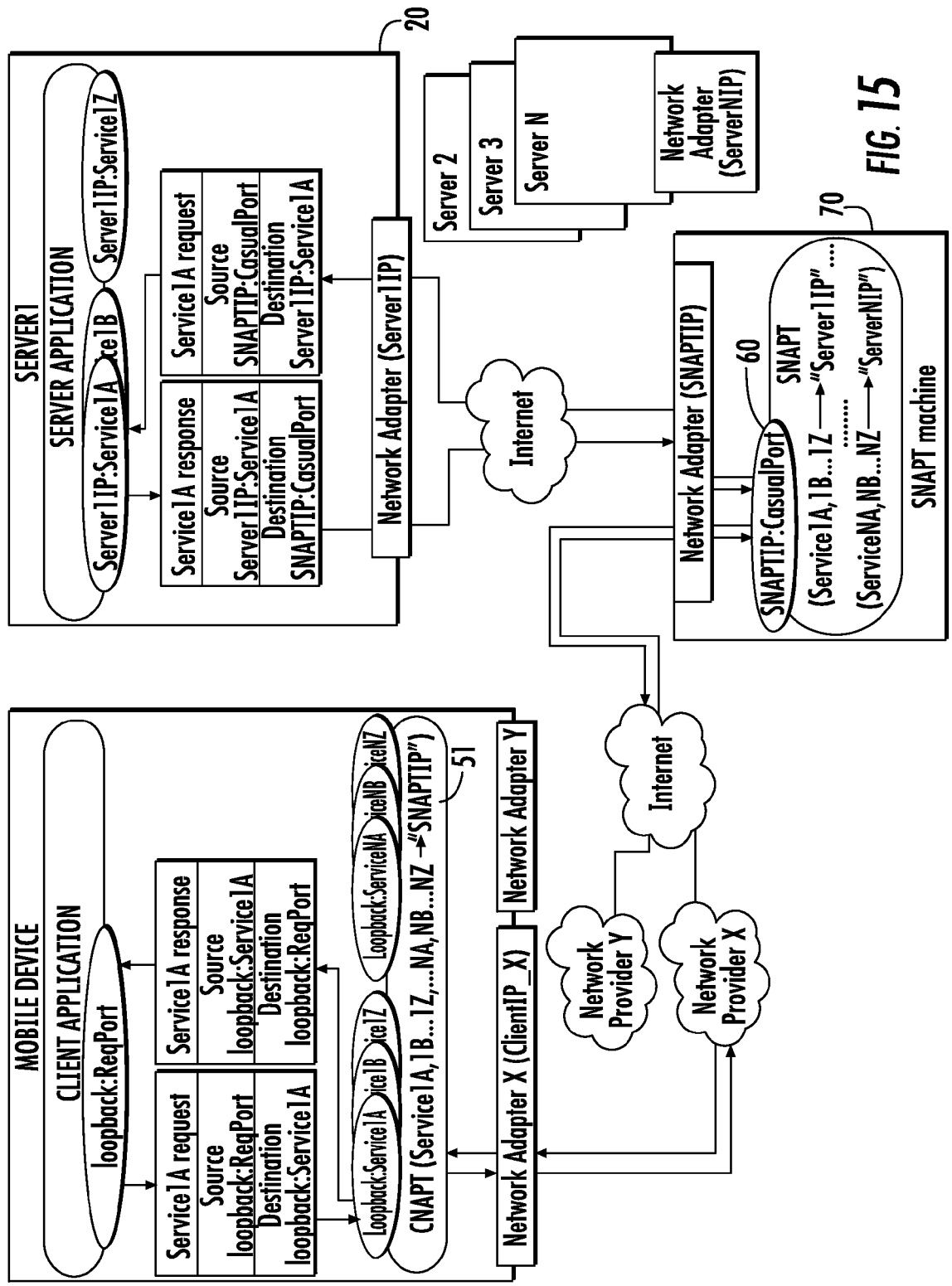
FIG. 15 shows a block diagram illustrating schematically an embodiment variant according to the invention, the "Multi-Server Internet configuration".

In an embodiment variant, the "Multi-Server Internet configuration", is installed on the client application mobile device 10 and the SNAPT module is installed on an additional dedicated Internet server 70 placed on an Internet site reachable from the CNAPT module and different from the Internet sites 20 running the server applications (FIG. 15). This way the mobile device 10 is able to benefit by the above-mentioned advantages of the invention with any server providing services on the network, e.g. the Internet, without the need to have a SNAPT module installed on every single server of interest. The CNAPT module sets the SNAPT IP address for each server service to "SNAPTIP" (51). On the client side, the CNAPT module comprises means to emulate the Servers' services, providing a server socket "loopback:ServiceEmulator" 16 for each of them ("loopback:Service1A", . . . , "loopback:Service1Z", . . . , "loopback:ServiceNA" "loopback:ServiceNZ"). This socket can handle multiple concurrent Client requests. The Client application accesses the services by sending and receiving data to/from these sockets. The SNAPT module comprises means to emulate the client application requests providing a socket "SNAPTIP:CasualPort" 60 for each of them. The servers applications (1 . . . N) handle client requests by sending and receiving data to/from these sockets. This embodiment variant has the advantage that a SNAPT module, installed on an Internet node, can manage simultaneously more different server applications running on different Internet nodes. In this way the seamless handover of the network connection among one or more client applications and one or more server applications can be provided by a company, different from the services providers, that does not require any modification or installation on the services providers sites and that only requires the installation of the CNAPT module on the final customer mobile device. With such embodiment variant, following a switch between network access technology and/or provider, a customer of the above-described company (e.g. an active trader) would be able to maintain active different trading sessions with different trading service providers.

Figure 16:
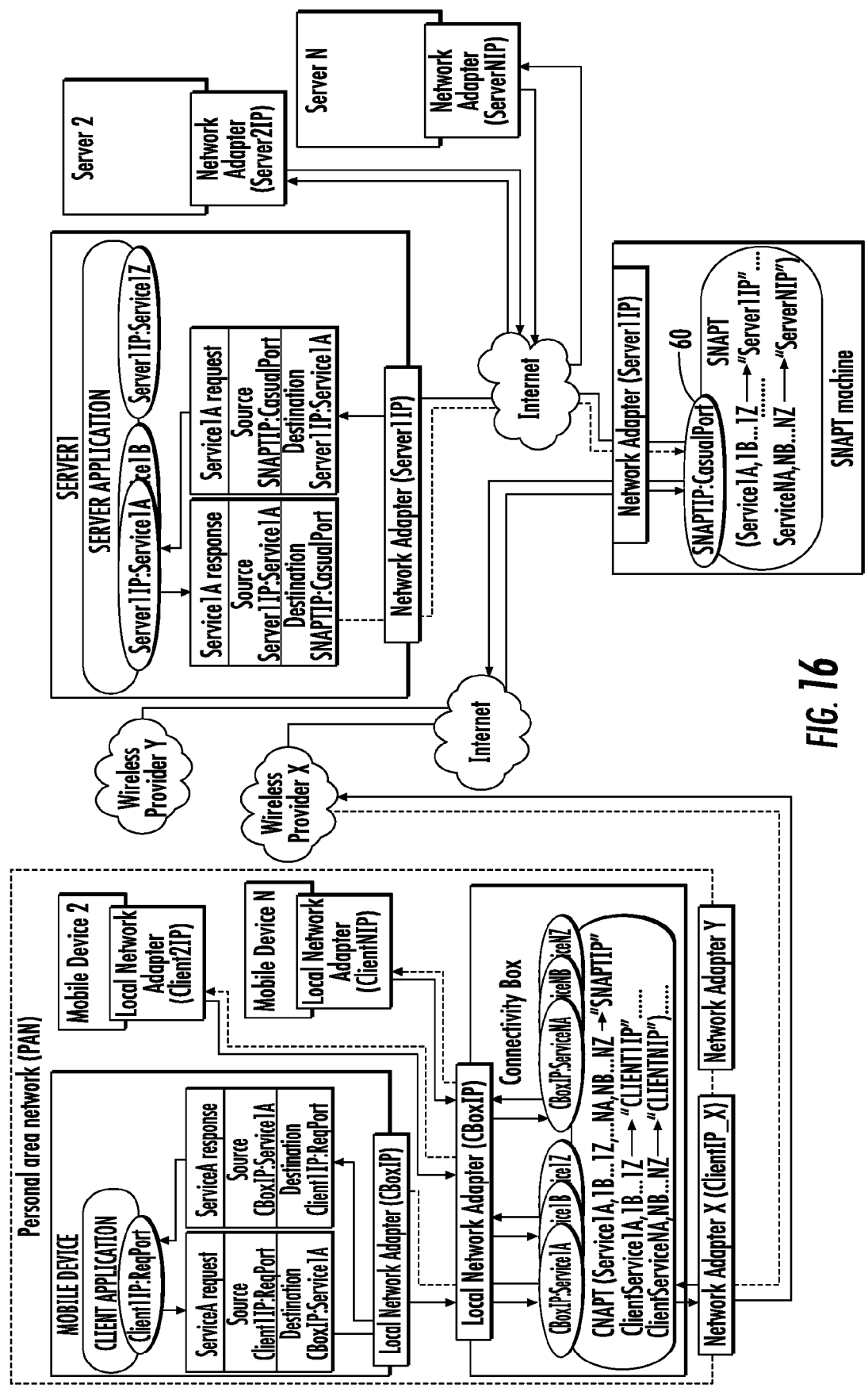
FIG. 16 shows a block diagram illustrating schematically an embodiment variant according to the invention, the "Client PAN Multi-Server Internet configuration".

In an embodiment variant, the "Client PAN Multi-Server Internet configuration", the CNAPT module is installed on an additional mobile device, that could act as a "connectivity box" able to manage the highest possible number of network access technologies and linked to a set of mobile devices through a broadband IP connection (FIG. 16). The client applications' mobile devices and the "connectivity box" have a fixed private IP address each, "Client1IP". . . "ClientNIP"

and "CBoxIP": they are part of a very small local network (e.g. they are connected using an Ethernet hub or a Wi-Fi ad-hoc connection or a Bluetooth connection). The Servers' IP addresses are set to the "connectivity box" IP address ("CBoxIP") in the client applications. The CNAPT module sets the SNAPT IP address for each server service to "SNAPTIP" and sets the client IP address for each client service to the IP address of the mobile device running the related client application ("Client1IP" for client service 1A, 1B . . . 1Z, . . . , "ClientNIP" for client service NA, NB . . . NZ). The SNAPT module is installed on an additional dedicated network server or Internet server 70 placed on an Internet site reachable from the CNAPT module and different from the Internet sites 20 running the server applications. This way the mobile devices are able to benefit by the above-mentioned advantages of the invention with any server providing services on the network and/or Internet, without the need to have a SNAPT module installed on every single server of interest. The CNAPT module comprises means to emulate the servers' services providing a server socket "CBoxIP:ServiceEmulator" for each of them. This socket can handle multiple concurrent client requests. The client applications access the services by sending and receiving data to/from these sockets. The SNAPT module comprises means to emulate the client applications' requests providing a socket "SNAPTIP:CasualPort" for each of them. The servers' applications (1 . . . N) handle client requests by sending and receiving data to/from these sockets. With such configuration, following a switch between network access technology and/or provider; for instance, an active trader would be able to maintain active multiple different sessions with multiple different service providers (e.g. a trading session with his laptop, a voice call with his Voice1P Phone and a medical monitor session with his biometric sensors). This embodiment variant combines the advantages of the "Multi-Server Internet configuration" and the "Client PAN configuration".

The set of embodiment variants described above is not intended to be exhaustive: it will be understood that further permutations of the base configurations and various changes in form and in detail may be made therein without departing from the spirit and the scope of the invention. The concept of the invention has been explained using a simplified model, but this concept is, obviously, more general: (1) the CNAPT module can emulate a great number of server and client services and can handle multiple concurrent requests to the same client or server service or to different services. (2) can handle any number of client applications resident on the same device or in different devices. (3) The SNAPT module can handle multiple concurrent client requests coming from the same CNAPT module as well as multiple concurrent client requests coming from different CNAPT modules. (4) The SNAPT module can handle multiple concurrent server requests of client services coming from the same server application as well as multiple concurrent server requests coming from different server applications. (5) The SNAPT module can handle any number of server applications resident on the same device or in different devices.

In an embodiment variant, a system according with the invention can support the dynamic update of the QoS (Quality of Service) parameters of the client and the server applications following a switch between two different network providers. In fact the switch between two different network providers could sometimes determine a relevant variation in the bandwidth available or in others connection parameters like packet delay, packet loss probability etc. This variation should entail a QoS (Quality of Service) variation whenever the client and the server applications could dynamically change it. For instance, if the client and the server applications provide a real-time videoconference system, at their start a set of QoS parameters are exchanged and defined: frame rate, picture format, compression quality, . . . etc. In case of bandwidth variation these applications should be able to adapt the QoS to the new conditions in order to provide the best possible service at all times. In such cases, and the SNAPT module can be configured to send to the client and the server applications all the information they need to update their QoS.

In another embodiment variant, the client and/or server services byte streams between the CNAPT module and the SNAPT module could be compressed in order to reduce the amount of data exchanged. The CNAPT module and the SNAPT module, of course, have to know which services byte streams have to be compressed.

DESCRIPTION OF THE PREFERRED EMBODIMENT

Figure 17:
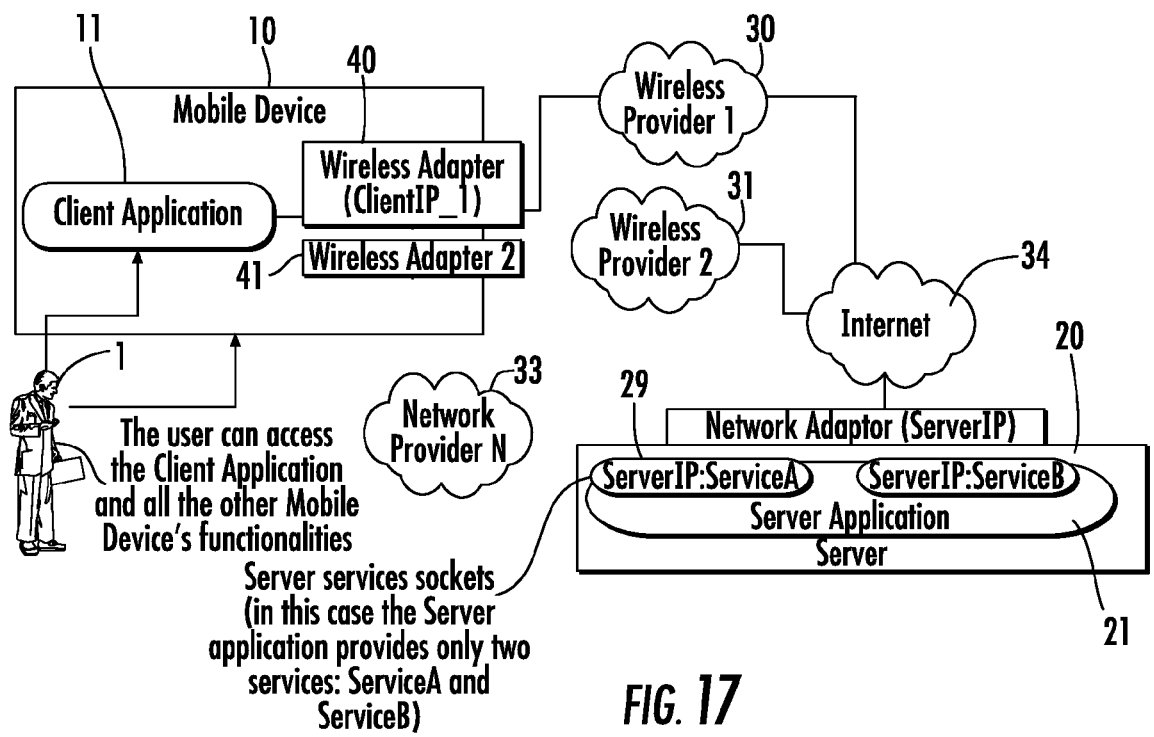
FIG. 17 shows a block diagram illustrating schematically an embodiment according to the invention based on the "Basic configuration" where the Client application uses a local network connection and the Internet to reach its server application.

In the following an embodiment of the invention based on the "Basic configuration" will be described in more detail. For this example of an embodiment, it is assumed that the mobile device 10 using the client application 11 is able to hold two different network connections simultaneously, e.g. Internet connections, through the network adapter 1 and 2 (40 and 41 in FIG. 17). The network adapter 1 and 2 are wireless adapters. In this example the server application 21 provides only two connection-oriented services (like services based on TCP): ServiceA and ServiceB (this assumption is used only to simplify the drawings; obviously the switch procedure also handles the connectionless server services). For each of them a server socket 29 listens for client application requests (FIG. 17). The server device is connected to Internet 34 and it has the IP address "ServerIP". The mobile device 10, using the wireless adapter 1 [40], is connected to Internet 34 via the wireless provider 1 [30] and it has the IP address "ClientIP_1". The client application does not provide any client services (this assumption is used only to simplify the drawings; obviously the switch procedure handles also the connection-oriented/connectionless client services). The CNAPT module and the SNAPT module will be described as middleware software application installed respectively on the mobile device 10 and on the server PC 20. In a modified embodiment, the CNAPT module and the SNAPT module run on a dedicated device. In this case the client and the server applications send/receive packets to/from the external dedicated device. The unique difference from the other implementation is that the CNAPT module and SNAPT module are not referred to by the loopback address, but by their external dedicated device IP address.

Figure 18:
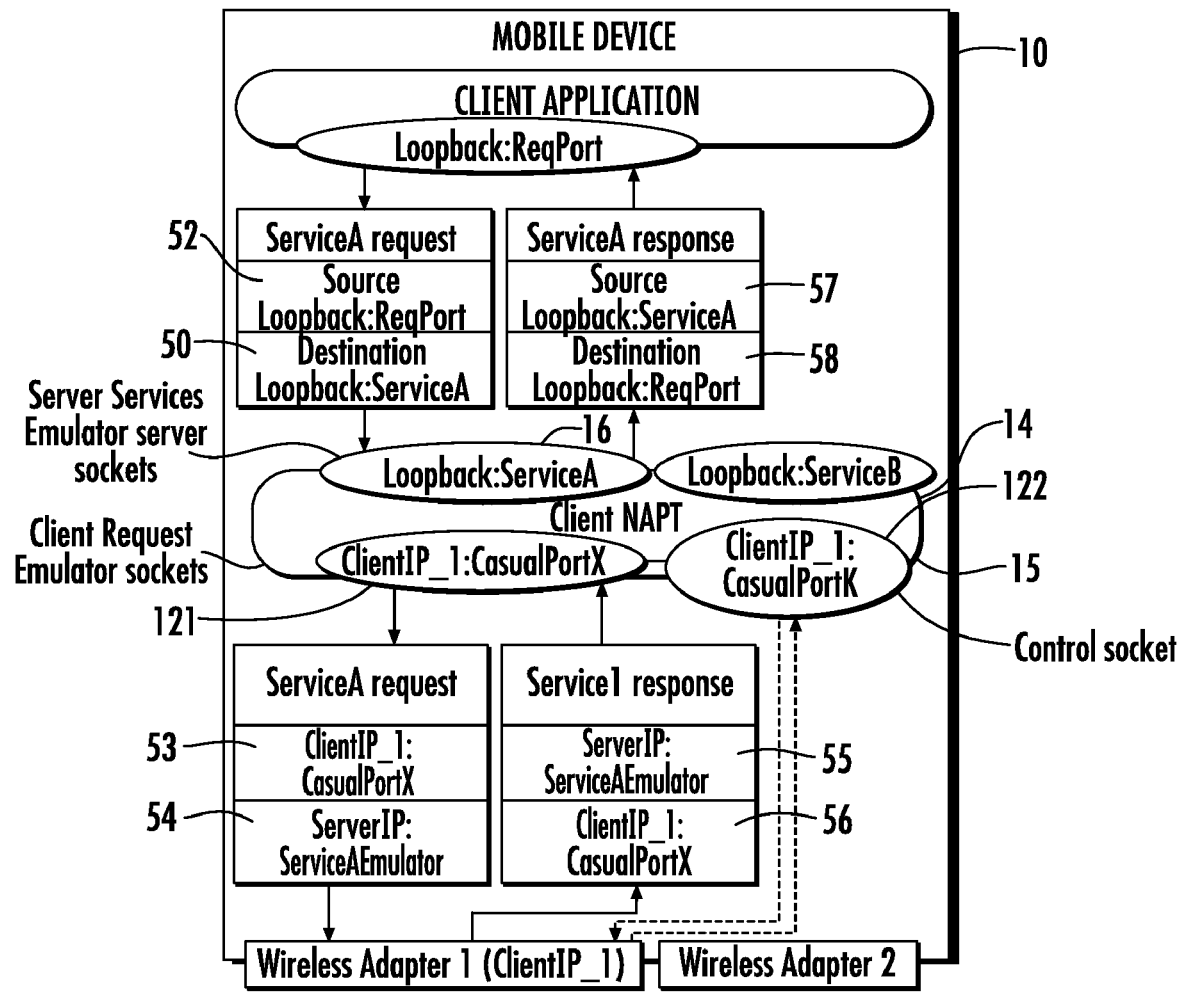
FIG. 18 shows a block diagram illustrating schematically the CNAPT/Client application interaction of an embodiment according to the invention based on the "Basic configuration".

The CNAPT module is a software module that comprises means to emulate the server application on the client side 14 and means to emulate the client application on the Internet side 15 (FIG. 18). With only the server IP, the services' real ports, the services' emulator ports and the services' type, it provides: (1) for each server service, a server socket 16 on the client side. This server socket listens on the real service port (Server Service Emulator server socket). (2) For each server service request, a Client Request Emulation Socket 121 on the Internet side. This socket relays packets to the right Service Emulator Server Socket provided by the SNAPT module. To understand the functionality of , suppose that the mobile device 10 is connected to Internet via the wireless provider 1 and has the IP address "ClientIP_1". If the server IP address has been set to "loopback" in the client application, when it requests the ServiceA, it sends a request to the "loopback:ServiceA" address 50. This request is received from the ServiceA Emulator server socket 16. The CNAPT module changes the source address from "loopback:ReqPort" 52 to "ClientIP_:CasualPortX" 53 and the destination address from "loopback:ServiceA" 50 to "ServerIP:ServiceAEmulator" 54 and it then resends this request through the Client Request Emulator socket 121. When the Client Request Emulator socket 121 receives the server response, changes the source address from "ServerIP:ServiceAEmulator" 55 to "loopback:ServiceA" 57 and the destination address from "ClientIP_1: CasualPortX" 56 to "loopback:ReqPort" 58 and it then resends this response through the Server Service Emulator server socket 16. and the SNAPT communicate through a "Control socket" 122. This connection is used to exchange handshaking packets during an IP address-changing phase and to optimize the interaction between the client and the server application. This connection is not always on; it is established when has some needs, and it is closed when the operation has been completed.

If the client application provides some client services, they can also be emulated by, but it has to know the client services' ports and type (connection-oriented or connectionless). With this information, the CNAPT module provides: (1) For each client service, a server socket 17 on the Internet side (FIG. 8). This server socket listens on the client service emulator port (Client Service Emulator server socket). This port is different from the real client service port in order to avoid a bind error. (2) For each client service request, a Server Request Emulation Socket 123 on the client side. This socket relays packets to the real client server socket 111.

It is conceivable for a CNAPT module to emulate more than one server application simultaneously and in parallel. This CNAPT module can be used by more than one client application.

Figure 20:
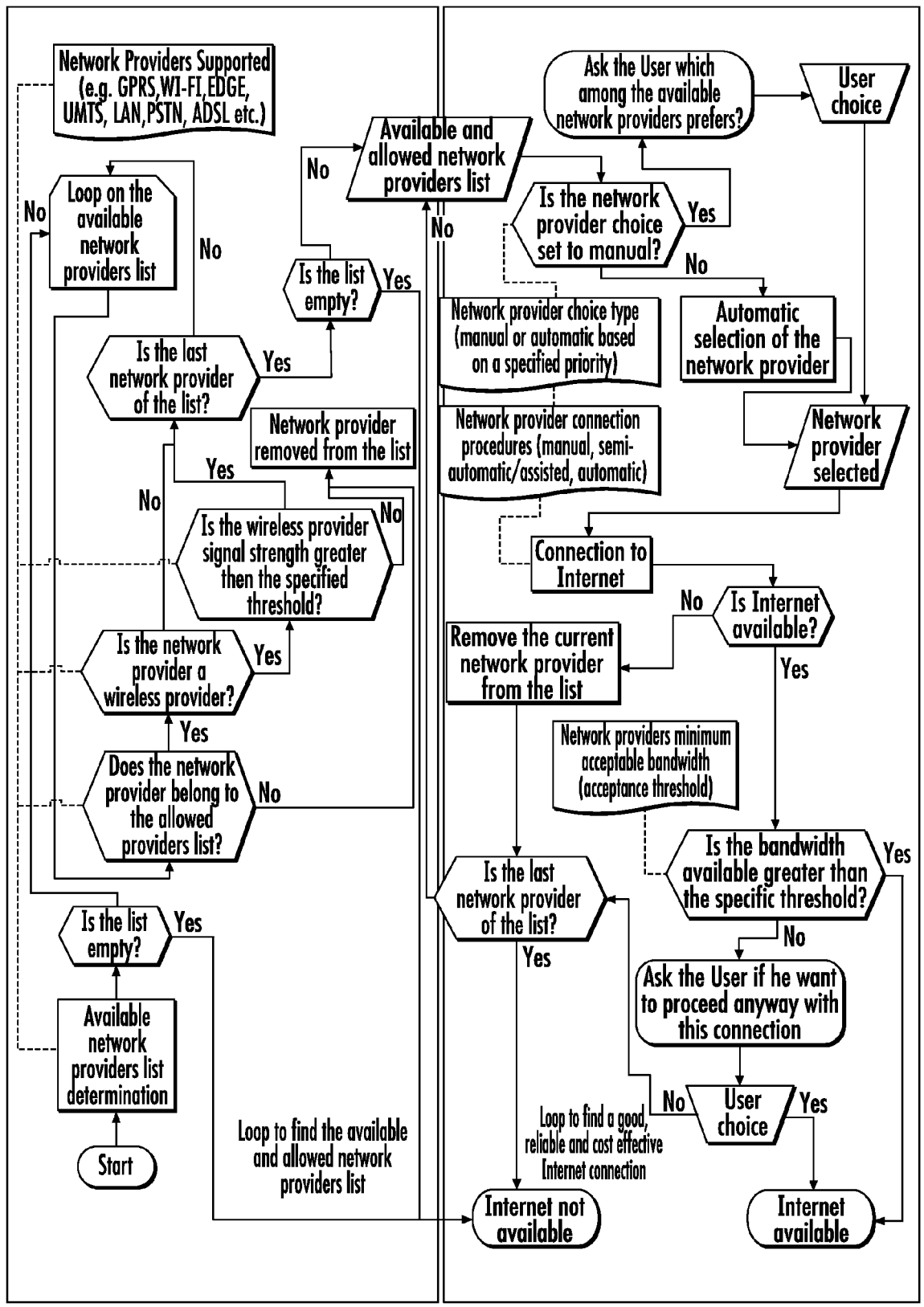
FIG. 20 shows a flowchart illustrating schematically the method used by CNAPT module to retrieve an Internet connection at its start.

The CNAPT module preferably has to be started before the client application. It has to run until the client application stops in order to provide it with a good, reliable and cost effective network connection to the server application. , at the start, does the following: (1) Obtains a network connection (FIG. 20). If this is not possible, the CNAPT module can be stopped, for instance, and the client application cannot be started. (2) Launches the "decision task" module. (3) Creates the Server Service Emulator server sockets 16 on the Client side 14. (4) Creates the Client Service Emulator server sockets 17 on the network side 15. (5) Creates a local Control socket 122 connected to the SNAPT (or, in turn, to the SNAPTs in case of "Multi-Site configuration") Control server socket 27 and uses it to send a "CONNECT" packet from which the SNAPT can retrieve the CNAPT ID, its current IP address and the connection optimization parameters. When the SNAPT module receives the initial "CONNECT" packet, it does the following: (1) Checks whether it can handle the new connection (obviously it has limited resources). (2) If it cannot accept the new connection, it replies with a "REFUSED" packet. (3) If it can accept a new connection, it stores the CNAPT ID and its current IP address. From now on, for this CNAPT ID, the SNAPT module will send all outgoing packets only to its current IP address. (3a) Allocates the internal resources for the new connection and adds the new CNAPT ID to the list of connected CNAPT modules. (3b) Creates on the Server side 24 the Client service emulator server sockets 28 related to the CNAPT ID and binds them to an available Virtual IP address 23. (3c) Sends the connect acknowledgement to . , at the end, has to create a local Control socket 122 connected to the SNAPT (or, in turn, to the SNAPTs in case of "Multi-Site configuration") Control server socket 27 and use it to send a "DISCONNECT" packet.

When the SNAPT module receives a "DISCONNECT" packet it does the following: (1) Releases the internal resources of the disconnecting CNAPT ID and removes it from the list of connected CNAPT modules. (2) Destroys the Client service emulator server sockets 28 related to the CNAPT ID and unbinds them from the allocated Virtual IP address 23. (3) Sends the disconnect acknowledgement to CNAPT. The SNAPT module associates with each connected CNAPT module a maximum inactivity time (inactivity timeout). When this inactivity time has elapsed, the CNAPT will be considered disconnected, and the previous steps (1-3) will be executed.

Figure 21:
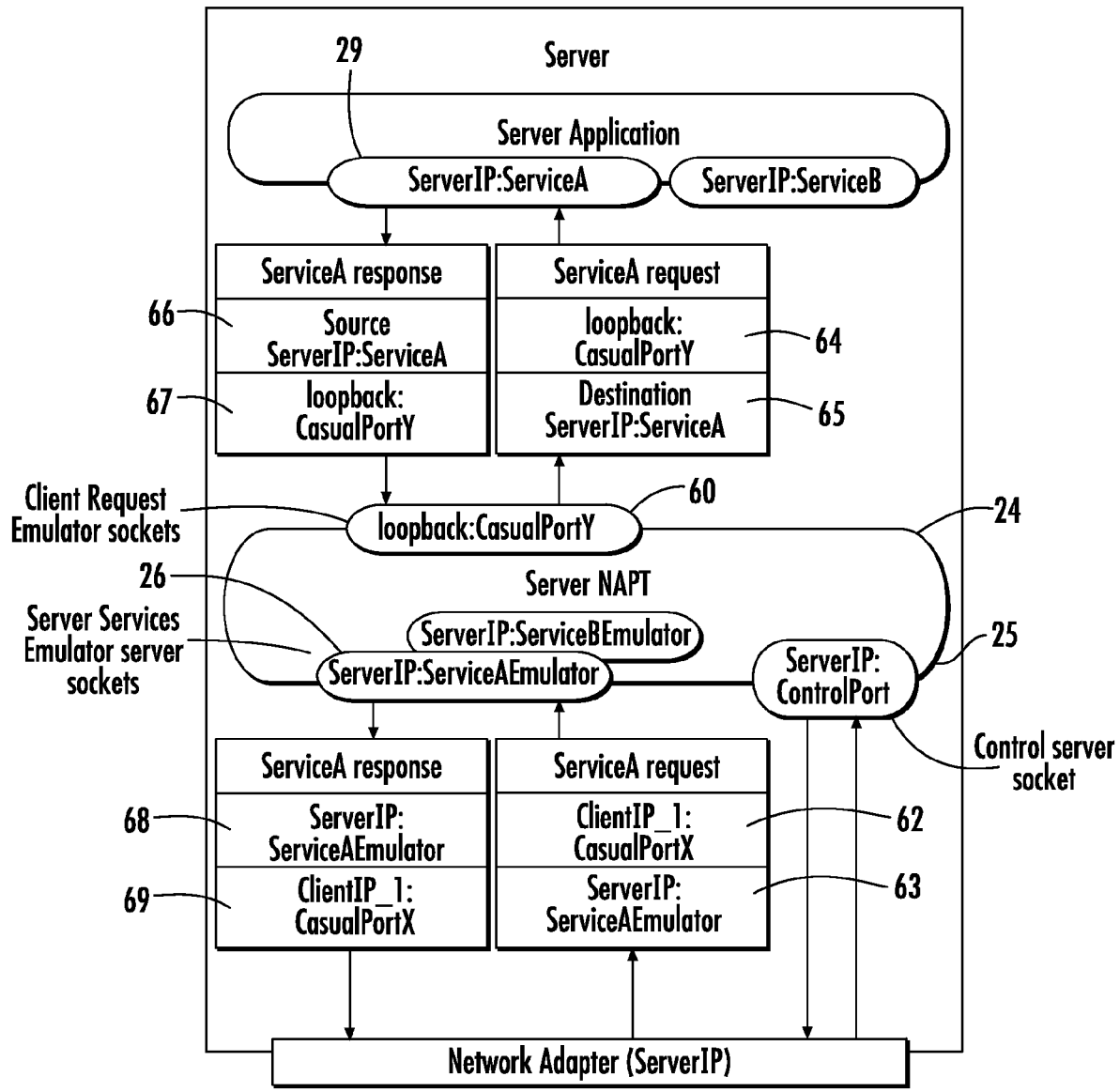
FIG. 21 shows a block diagram illustrating schematically the SNAPT/Server application interaction of an embodiment according to the invention based on the "Basic configuration".

The SNAPT module can be produced as a software module that emulates the client application on the server side 24 and the server application on the network or Internet side 25 (FIG. 21). It provides: (1) For each server service, a server socket 26 on the Internet side 25. This server socket listens on the server service emulator port (Server Service Emulator server socket). This port is different from the real server service port in order to avoid a bind error. (b) For each service request, a Client Request Emulation Socket 60 on the server side 24. This socket relays packets to the real Service server socket 29. When the SNAPT module receives a ServiceA request, it changes the source address from "ClientIP_:CasualPortX" 62 to "loopback:CasualPortY" 64 and the destination address from "ServerIP:ServiceAEmulator" 63 to "ServerIP:ServiceA" 65. It then resends this request through the Client Request Emulator socket 60. When the Client Request Emulator socket receives the server application response, the SNAPT changes the source address from "ServerIP:ServiceA" 66 to "ServerIP:ServiceAEmulator" 68 and the destination address from "loopback:CasualPortY" 67 to "ClientIP_1:CasualPortX" 69. It then resends this response through the Server Service Emulator server socket 26. If the client applications provide some client services, they can also be emulated by the SNAPT module but it has to know the client services' ports and type (connection-oriented or connectionless), the CNAPT module services' emulator ports and for each client service the corresponding CNAPT module ID. With this information, the SNAPT module provides: (1) For each Client Service, a server socket 28 on the Server side. This server socket listens on the real Client Service port (Client Service Emulator server socket). (2) For each Client Service request, a Server Request Emulation Socket 61 on the network side, e.g. Internet side. This socket relays packets to the right Client Service Emulator Server Socket provided by the correspondent CNAPT module ID.

The SNAPT module can comprise means to emulate more than one client application request simultaneously and in parallel, and the SNAPT module can be used by more than one server application.

Figure 22:
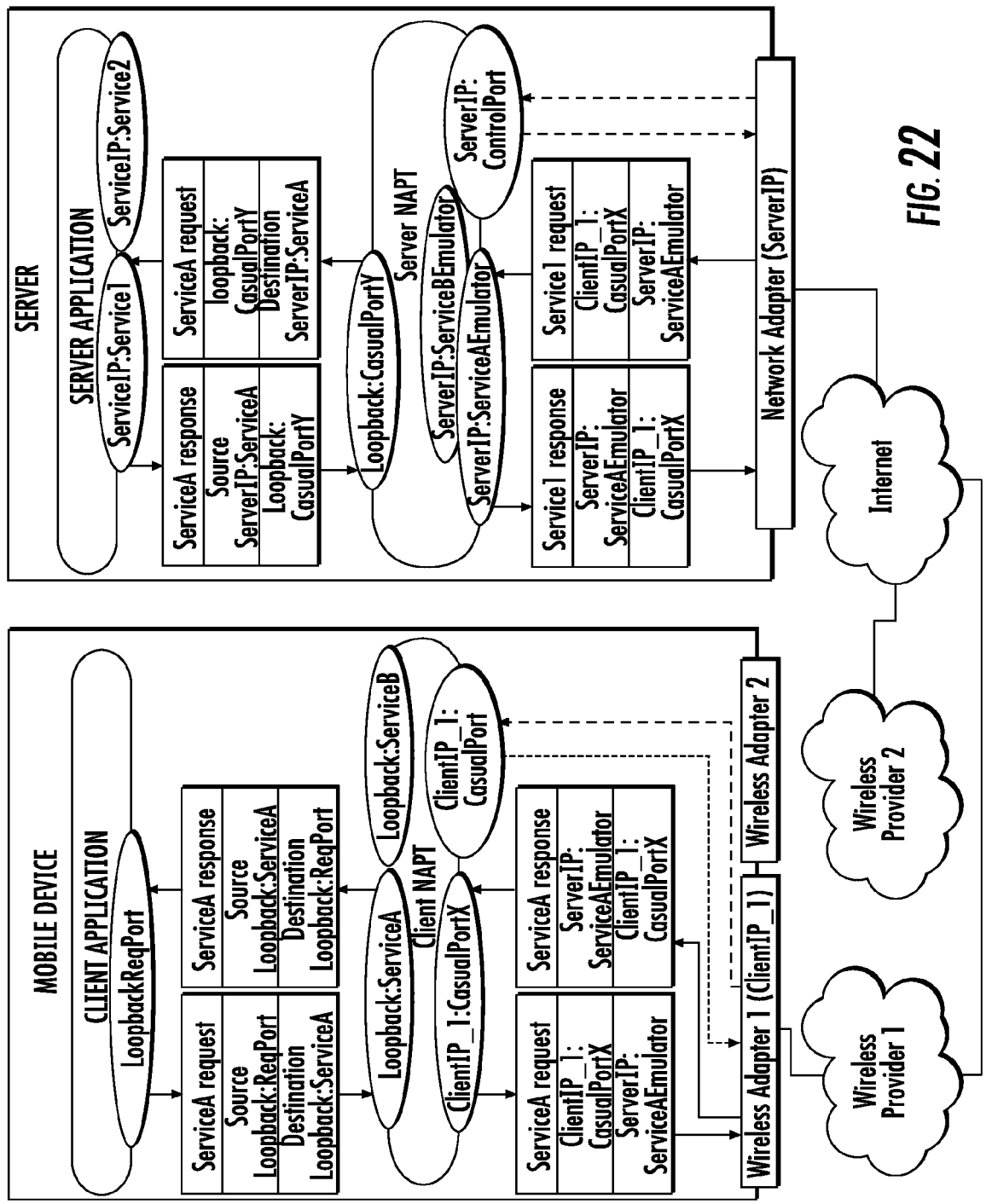
FIG. 22 shows a block diagram illustrating schematically a Client/Server interaction by a system according to the invention.

Suppose that the mobile device 10 is connected to the Internet via the Wireless Provider 1 [30], and it has the IP address "ClientIP_1". Suppose also that the client application 11 has already requested the ServiceA, and it is now exchanging data with the server application 21 (FIG. 22). In this normal condition the "Control Socket" 122 is used only to exchange data for the Client/Server connection optimization. In the following, to explain the switch procedure, two cases will be illustrated: first the Wireless Provider 1 [30] that gradually becomes unavailable (slow switch) and then the Wireless Provider 1 that suddenly becomes unavailable (unexpected switch).

Figure 23:
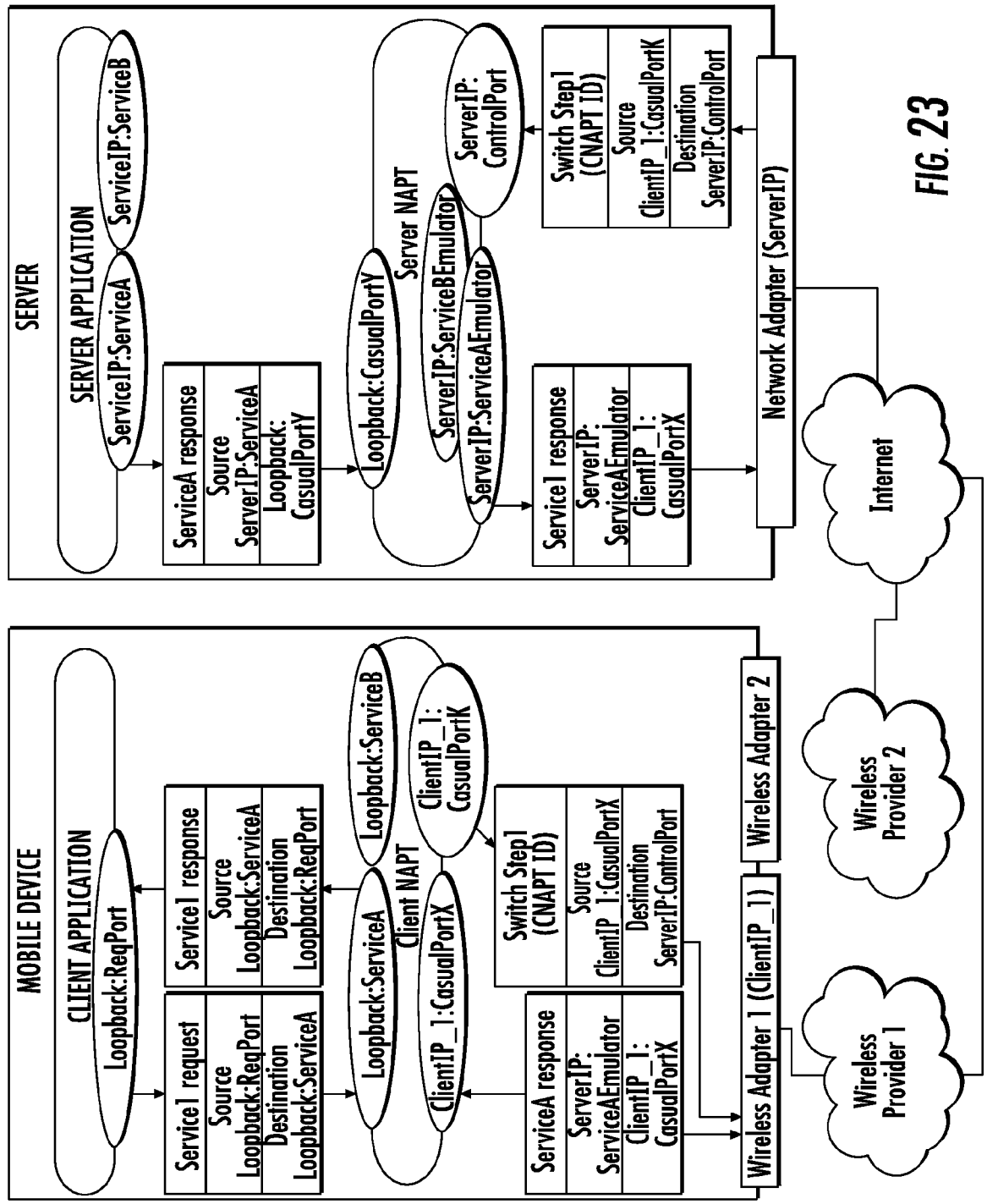
FIG. 23 shows a block diagram illustrating schematically the CNAPT module stopping forwarding service requests and sending a SWITCH_STEP1 packet.

Now suppose that the Wireless Provider 1 (30) gradually becomes unavailable (slow switch), for instance the mobile device 10 is slowly leaving its coverage area, while the Wireless Provider 2 (31) remains still available. In order to keep the client application and the session active, a new Internet connection through the Provider 2 must be established before the Provider 1 becomes totally unavailable. If there is enough time for the IP transition phase (that is to say the Client and the Server applications don't go into timeout), the switch from the Wireless Provider 1 ("ClientIP_") and the Wireless Provider 2 ("ClientIP_2") is totally transparent to the client and server applications that continue their execution without any interruption of service and/or session. To begin the IP transition phase from the Wireless Provider 1 ("ClientIP_1") to the Wireless Provider 2 ("ClientIP_2"), the CNAPT module has to (note that to begin this phase it is not necessary to have the "ClientIP_2" IP address, the unique precondition is to know the wireless provider selected to retrieve the new IP, in this case the Wireless Provider 2): (CNAPT-1) Suspend the "decision task" module activities (Search and Check activities). (CNAPT-2) Stop forwarding the connection-oriented server services request packets to the SNAPT module. (CNAPT-3) Stop forwarding the connection-oriented client services reply packets to the SNAPT module. (CNAPT-4) Stop forwarding the connectionless server services packets to the SNAPT module. (CNAPT-5) Buffer the pending server service requests and the pending client service replies. They will be forwarded at the end of the IP transition phase. (CNAPT-6) Flush all the transmission buffers. (CNAPT-7) Wait until the Search/Check activities have been suspended. (CNAPT-8) Put the input stream of the connection-oriented sockets linked to the SNAPT module in "waiting for last packet before redirection" mode. These sockets continue to receive data from the SNAPT module as before, until they receive a "LAST_MESSAGE_BEFORE_REDIRECTION" packet (note that this step can be avoided for connectionless services because they can tolerate packet losses). (CNAPT-9) Create a new Control socket 122 "ClientIP_1:CasualPortK" and connect it to the Control server socket 27 provided by SNAPT module on "ServerIP:ControlPort". (CNAPT-10) Send a "SWITCH_STEP1" packet to the SNAPT's Control server socket 27 using the Wireless Adapter 1 (FIG. 23). This packet contains the CNAPT ID. (CNAPT-11) Wait for "SWITCH_STEP1" packet reception confirmation from the SNAPT module.

Figure 24:
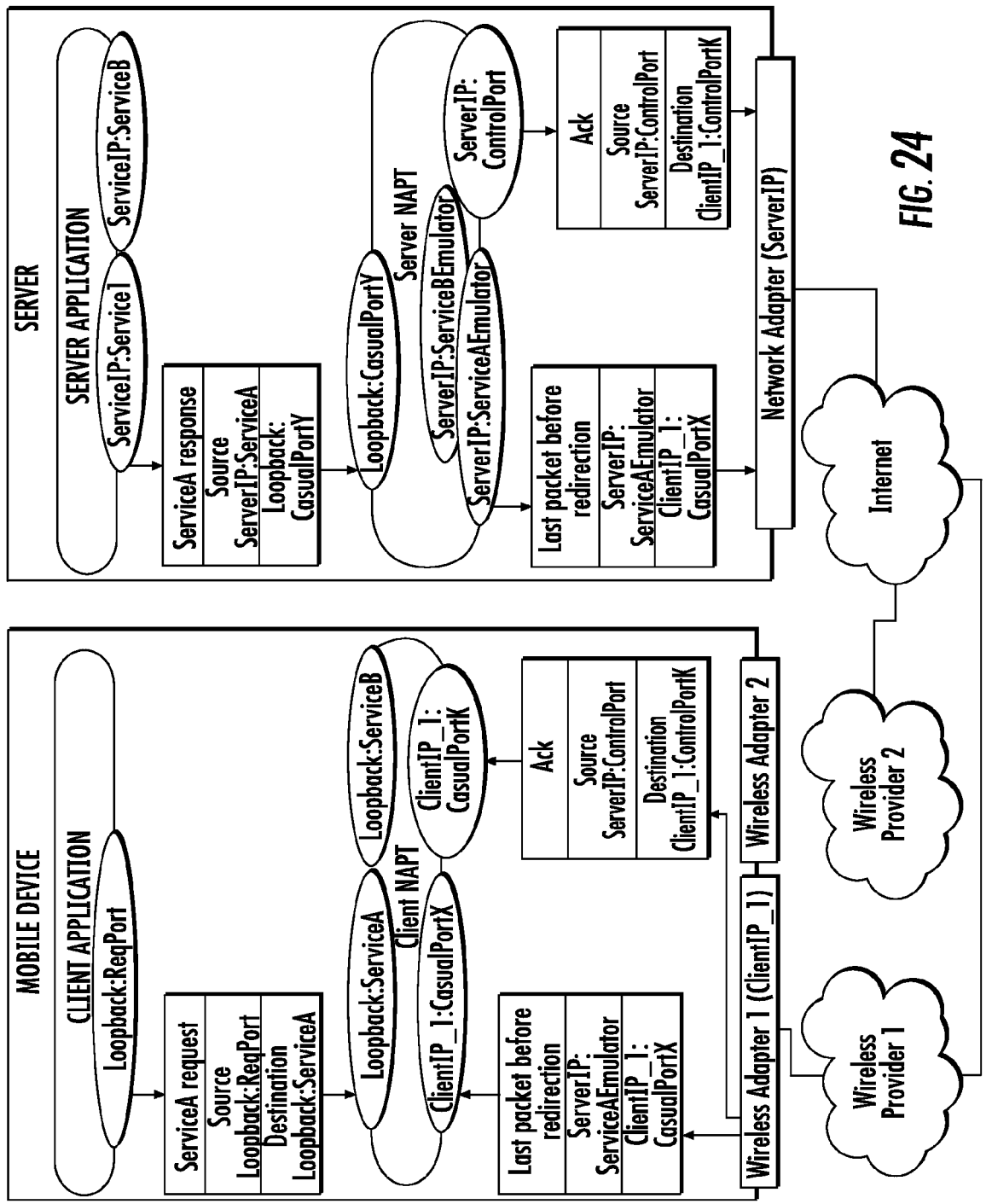
FIG. 24 shows a block diagram illustrating schematically the SNAPT module stopping forwarding data packets and sending an acknowledgement packet and the LAST_MESSAGE_BEFORE_REDIRECTION packets.

When the SNAPT module receives a "SWITCH_STEP1" packet, it has to perform the following steps (FIG. 24):
(SNAPT-1) Retrieve from this packet the ID of the sender CNAPT (from now on referred as "SWITCHING-CNAPT").
(SNAPT-2) Stop forwarding the connection-oriented server service reply packets to the "SWITCHING-CNAPT".
(SNAPT-3) Stop forwarding the connection-oriented client service request packets to the "SWITCHING-CNAPT".
(SNAPT-4) Stop forwarding the connectionless client service packets to the "SWITCHING-CNAPT".
(SNAPT-5) Buffer the pending server service replies and the pending client service requests. They will be forwarded at the end of the IP transition phase.
(SNAPT-6) Flush all the transmission buffers.
(SNAPT-7) Put the input stream of the connection-oriented sockets linked to the "SWITCHING-CNAPT" in "waiting for last packet before redirection" mode. These sockets continue to receive data from the "SWITCHING-CNAPT" as before until they receive a "LAST_MESSAGE_BEFORE_REDIRECTION" packet (note that this step can be avoided for connectionless services because they can tolerate packet losses).
(SNAPT-8) Send a "LAST_MESSAGE_BEFORE_REDIRECTION" packet in each output stream of the connection-oriented sockets linked to the "SWITCHING-CNAPT.
(SNAPT-9) Confirm to the "SWITCHING-CNAPT" control socket 122 the reception of the "SWITCH_STEP1" packet with an "ACK" packet.
(SNAPT-10) Wait until all the input streams in "waiting for last packet before redirection" mode have received the "LAST_MESSAGE_BEFORE_REDIRECTION" packet.

Figure 25:
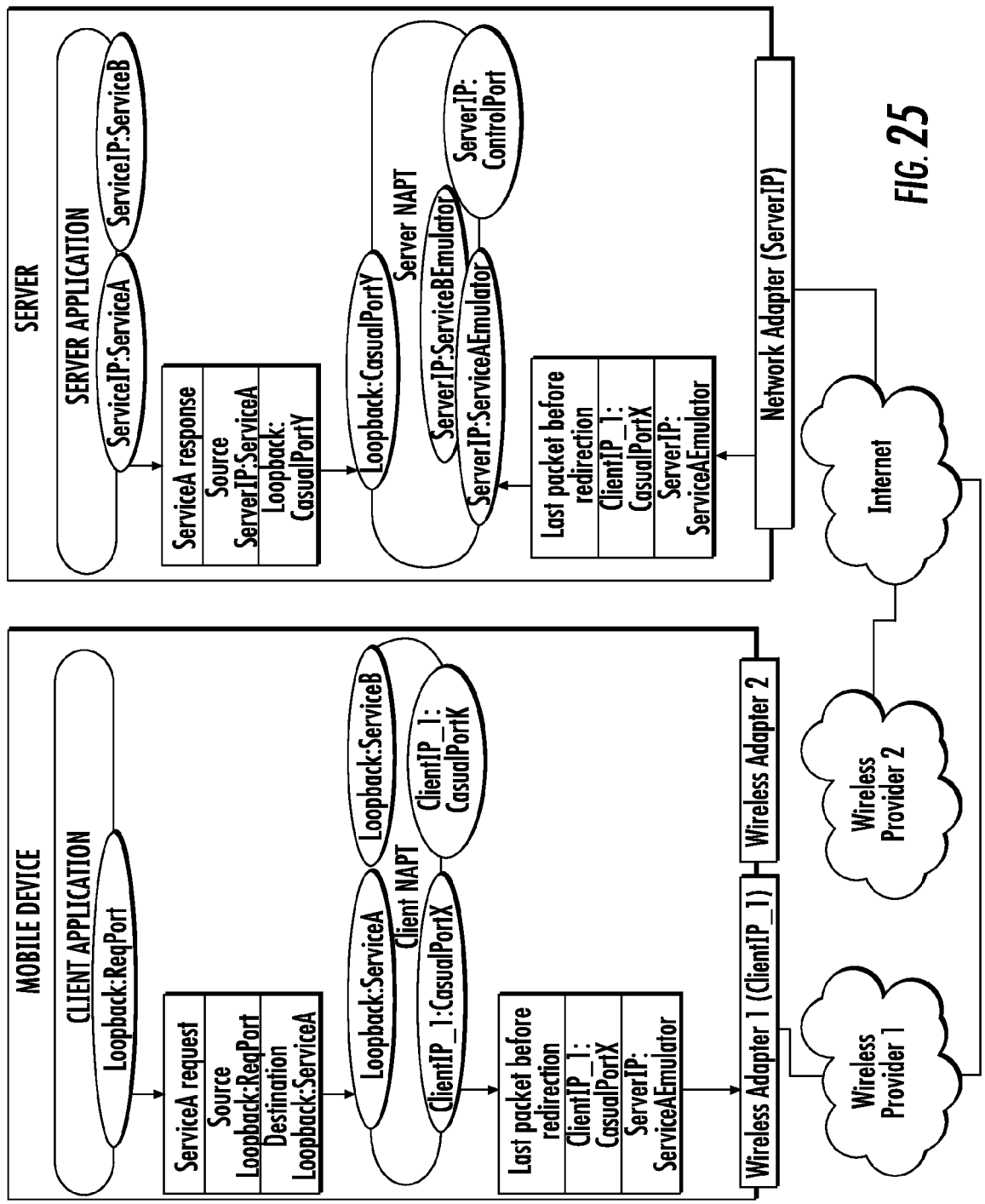
FIG. 25 shows a block diagram illustrating schematically the CNAPT module sending the LAST_MESSAGE_BEFORE_REDIRECTION packets.

When the CNAPT module receives the SNAPT module acknowledgement, it has to perform the following steps (FIG. 25):
(CNAPT-12) Send a "LAST_MESSAGE_BEFORE_REDIRECTION" packet in each output stream of the connection-oriented sockets linked to the SNAPT.
(CNAPT-13) Wait until all the input streams in "waiting for last packet before redirection" mode have received the "LAST_MESSAGE_BEFORE_REDIRECTION" packet.
(CNAPT-14) Wait for SNAPT's "OK_TO_REDIRECTION" packet.

Figure 26:
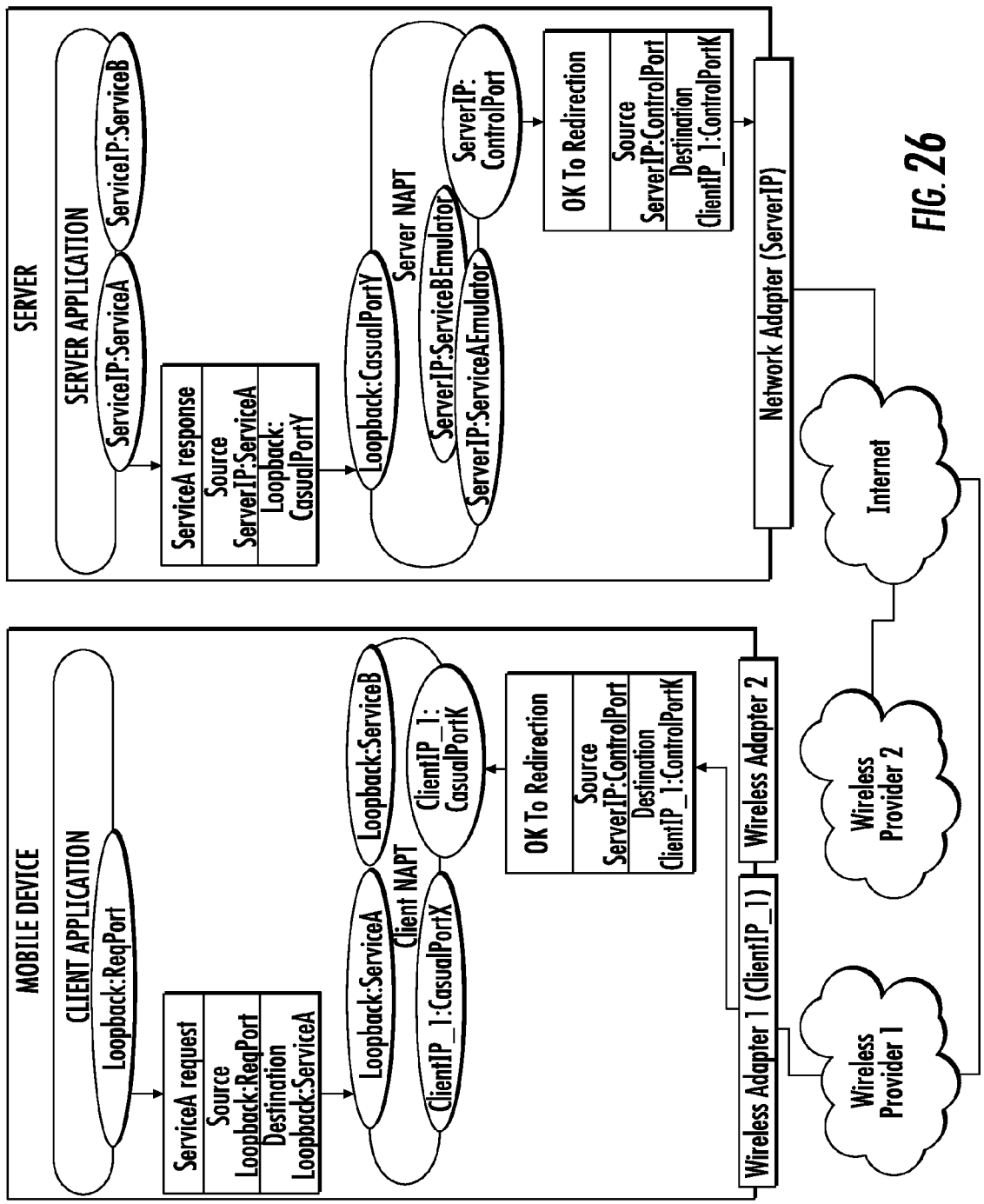
FIG. 26 shows a block diagram illustrating schematically the SNAPT module sending the OK_TO_REDIRECTION packet.

When the SNAPT module has received all the "LAST_MESSAGE_BEFORE_REDIRECTION" packets, it has to perform the following steps (FIG. 26):
(SNAPT-11) Send an "OK_TO_REDIRECTION" packet to the "SWITCHING-CNAPT" control socket 122.
(SNAPT-12) Wait for the "CLIENT_SERVICES_READY_FOR_REDIRECTION" packet coming from the "SWITCHING-CNAPT" control socket 122.

Figure 27:
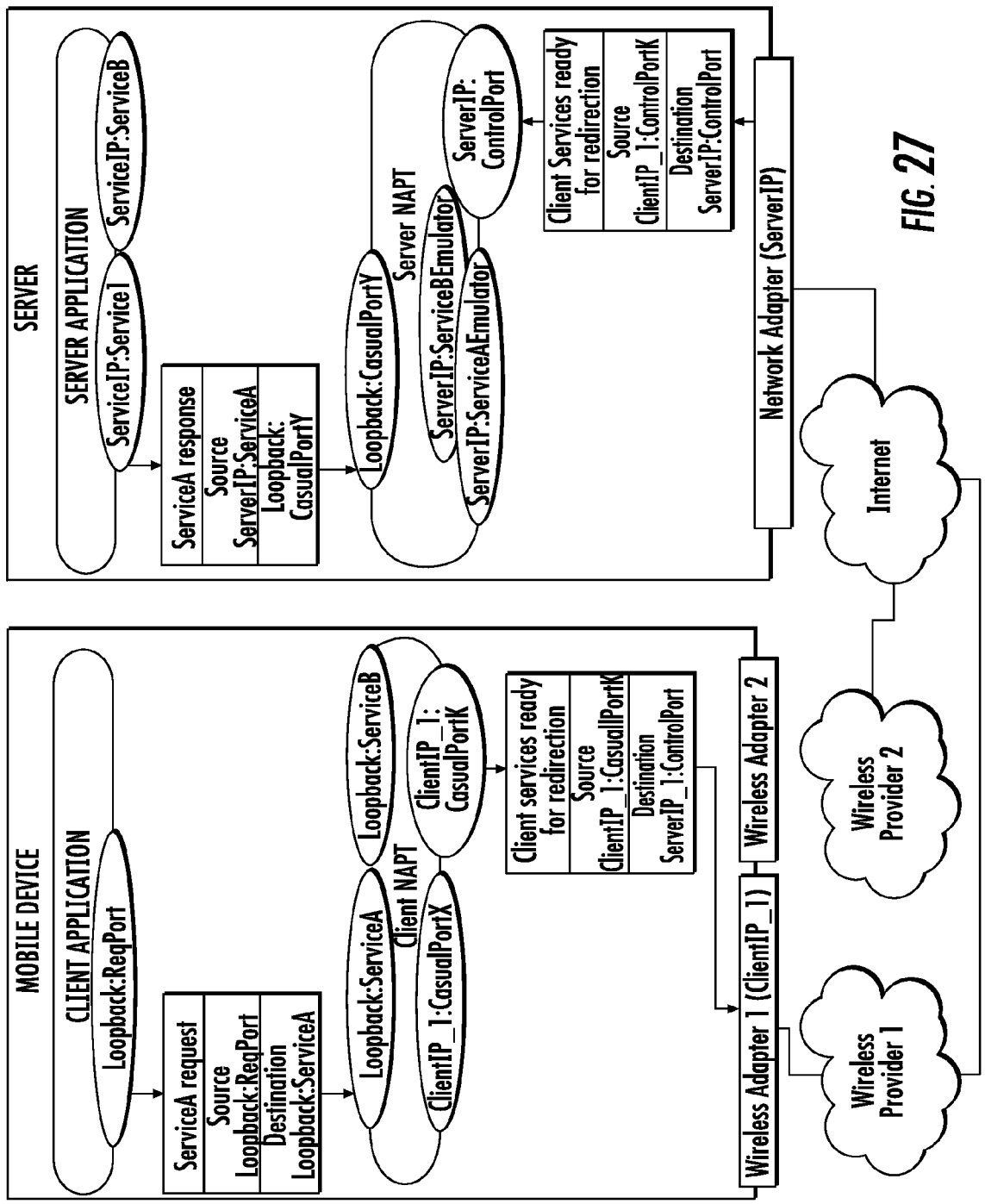
FIG. 27 shows a block diagram illustrating schematically the CNAPT module sending the CLIENT_SERVICE_READY_FOR_REDIRECTION packet.

When the CNAPT module receives the "OK_TO_REDIRECTION" packet, it has to (FIG. 27):
(CNAPT-15) Destroy the connectionless Client Services Emulator sockets 17 bound to the current CNAPT IP address and receiving data from the SNAPT.
(CNAPT-16) While preserving the Client services connections between the Client and the Server applications, destroy the Client services connection-oriented emulation sockets linked to the SNAPT and generated by the connection-oriented Client Services Emulator server sockets 17. They were bound to the current CNAPT IP address. Each of these sockets has to be renewed by the SNAPT in order to preserve the Client services connections between the Client and the Server applications.
(CNAPT-17) While preserving the Client services connections between the Client and the Server applications, destroy the connection-oriented Client Services Emulator server sockets 17 accepting requests from the SNAPT. They were bound to the current CNAPT IP address.
(CNAPT-18) Send a "CLIENT_SERVICES_READY_FOR_REDIRECTION" packet to the SNAPT's control server socket 27.
(CNAPT-19) Wait for the "SERVER_SERVICES_READY_FOR_REDIRECTION" packet coming from the SNAPT's control server socket 27.

Figure 28:
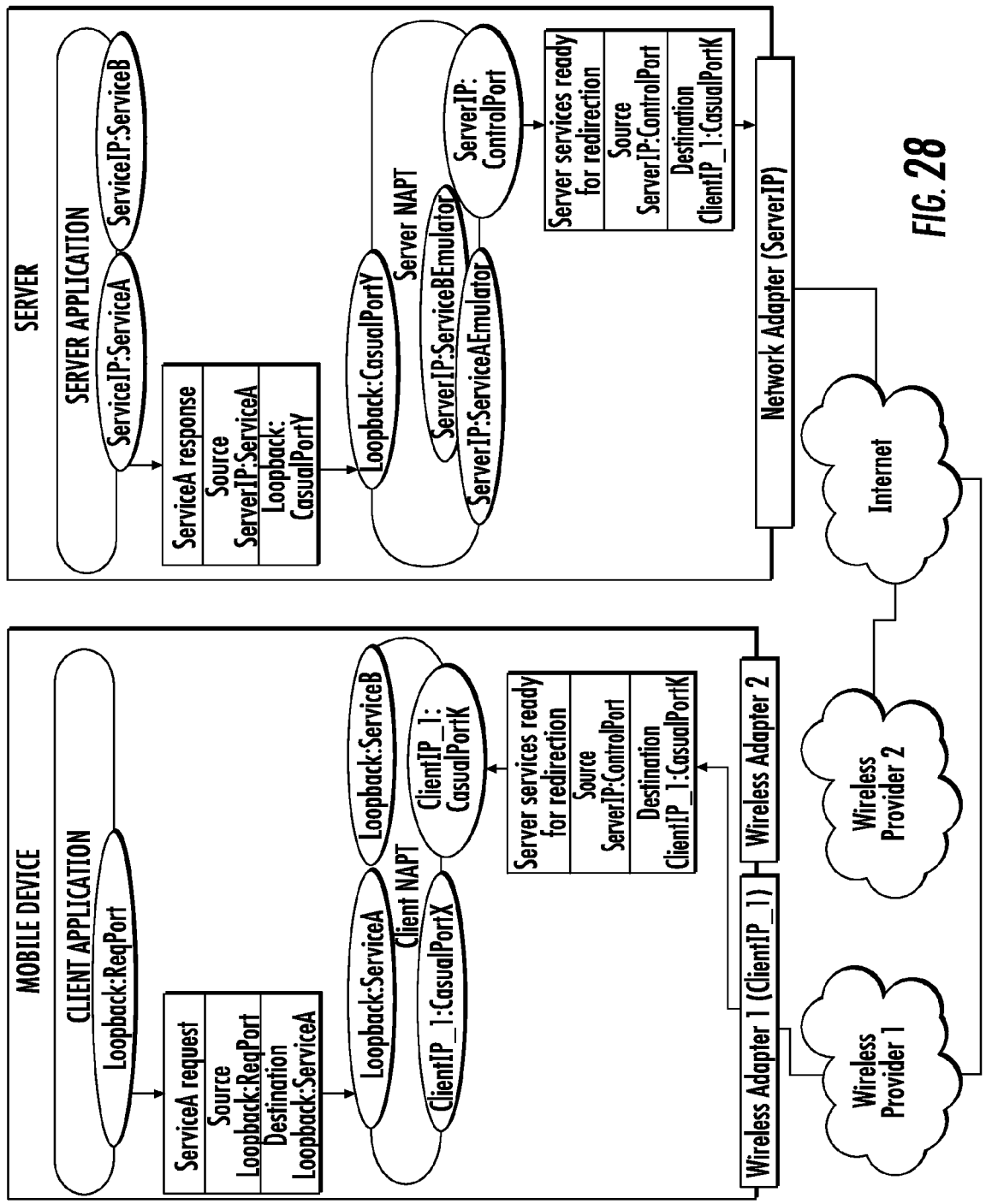
FIG. 28 shows a block diagram illustrating schematically the SNAPT module sending the SERVER_SERVICE_READY_FOR_REDIRECTION packet.

When the SNAPT module receives the "CLIENT_SERVICES_READY_FOR_REDIRECTION" packet, it has to (FIG. 28):
(SNAPT-13) While preserving the Client services connections between the Client and the Server applications, destroy the connection-oriented Client Services Server Request Emulation sockets 61 linked to the current "SWITCHING-CNAPT" IP address.
(SNAPT-14) While preserving the Server services connections between the Client and the Server applications, destroy the Server services connection-oriented emulation sockets linked to the current "SWITCHING-CNAPT" IP address and generated by the connection-oriented Server Services Emulator server sockets 26. Each of these sockets has to be renewed by the "SWITCHING-CNAPT" in order to preserve the Server services connections between the Client and the Server applications.

(SNAPT-15) Send a "SERVER_SERVICES_READY_FOR_REDIRECTION" packet to the "SWITCHING-CNAPT" control socket 122.

(SNAPT-16) Wait for the "SWITCH_STEP2" packet coming from the "SWITCHING-CNAPT" through the new control socket 122 bound to its new IP address.

Figure 29:
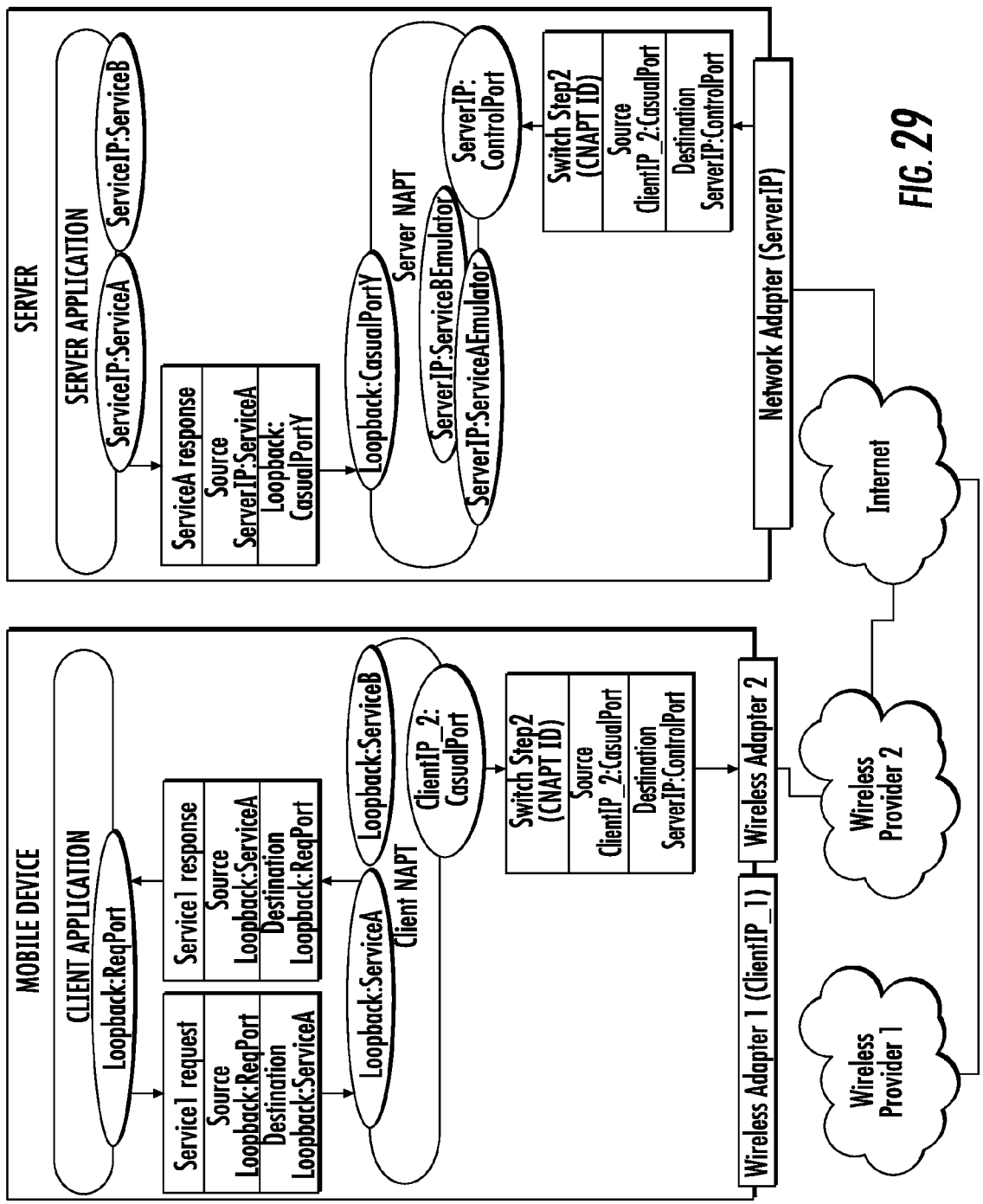
FIG. 29 shows a block diagram illustrating schematically the CNAPT module sending the SWITCH_STEP2 packet, destroying the Client request emulation sockets and replacing the control socket.

When the CNAPT module receives the "SERVER_SERVICES_READY_FOR_REDIRECTION" packet, it has to perform the following Steps (FIG. 29):

(CNAPT-20) Whilepreserving the Server services connections between the Client and the Server applications, destroy the connection-oriented Server services Client Request Emulation sockets 121 bound to the current "SWITCHING-CNAPT" IP address.

(CNAPT-21) Destroy the control socket 122 bound to the current "SWITCHING-CNAPT" IP address. (CNAPT-22) If needed, close the old Internet connection through the Wireless Provider 1 (if the client application and the server application are connected through a VPN, this step has to be preceded by the following step: Close the existing VPN connection between "ClientIP_1" and "ServerIP").

(CNAPT-23) If the "ClientIP_2" address is not yet available, open the new Internet connection through the selected wireless adapter (in this case the Wireless Adapter 2).

(CNAPT-24) Change the current IP address from the old IP address to the new one (if the client application and the server application are connected through a VPN, this step has to be followed by the following step: Open the new VPN between "ClientIP_2" and "ServerIP").

(CNAPT-25) Change to the new CNAPT IP address the binding of the server services connectionless sockets transmitting to the SNAPT module.

(CNAPT-26) Recreate the connectionless Client Services Emulator sockets 17 receiving data from the SNAPT and bind them to the new CNAPT IP address.

(CNAPT-27) Preserving the Client services connections between the Client and the Server applications, recreate the connection-oriented Client Services Emulator server sockets 17 accepting requests from the SNAPT and bind them to the new CNAPT IP address.

(CNAPT-28) Create a new control socket 122 "ClientIP_2: CasualPort" and connect it to the control server socket 27 provided by SNAPT module on "ServerIP:ControlPort".

(CNAPT-29) Send a "SWITCH_STEP2" packet to the SNAPT's control server socket 27 using the Wireless Adapter 2. This packet contains the CNAPT ID and through this packet the SNAPT module can deduce the new CNAPT IP address.

(CNAPT-30) Wait for the renewal of the connection-oriented Client services emulation sockets destroyed in [CNAPT-16]. This renewal will be done with a connection request [SNAPT-19] of the SNAPT for each connection-oriented socket generated by the Client Services Emulator server sockets 17.

When the SNAPT module receives the "SWITCH_STEP2" packet, it has to perform the following steps:

(SNAPT-17) Update the "SWITCHING-CNAPT" IP address with its new IP address as retrieved by the source field of the "SWITCH_STEP2" control packet.

(SNAPT-18) Redirect the Client services connectionless sockets transmitting to the "SWITCHING-CNAPT" from its old IP address to the new one (no redirection is needed for the connectionless server sockets receiving data from the "SWITCHING-CNAPT"; they are unaffected by the CNAPT IP address switch).

(SNAPT-19) Recreate the connection-oriented Client Services Server Request Emulation sockets 61 destroyed in [SNAPT-13] and connect them, in order to preserve the Client/Server interaction, to the Client Services Emulator server sockets 17 provided on the new "SWITCHING-CNAPT" IP address.

(SNAPT-20) Wait for the renewal of the connection-oriented Server services emulation sockets destroyed in [SNAPT-14]. This renewal will be done with a connection request [CNAPT-32] of the "SWITCHING_CNAPT" for each connection-oriented socket generated by the Server Services Emulator server sockets 26.

Figure 30:
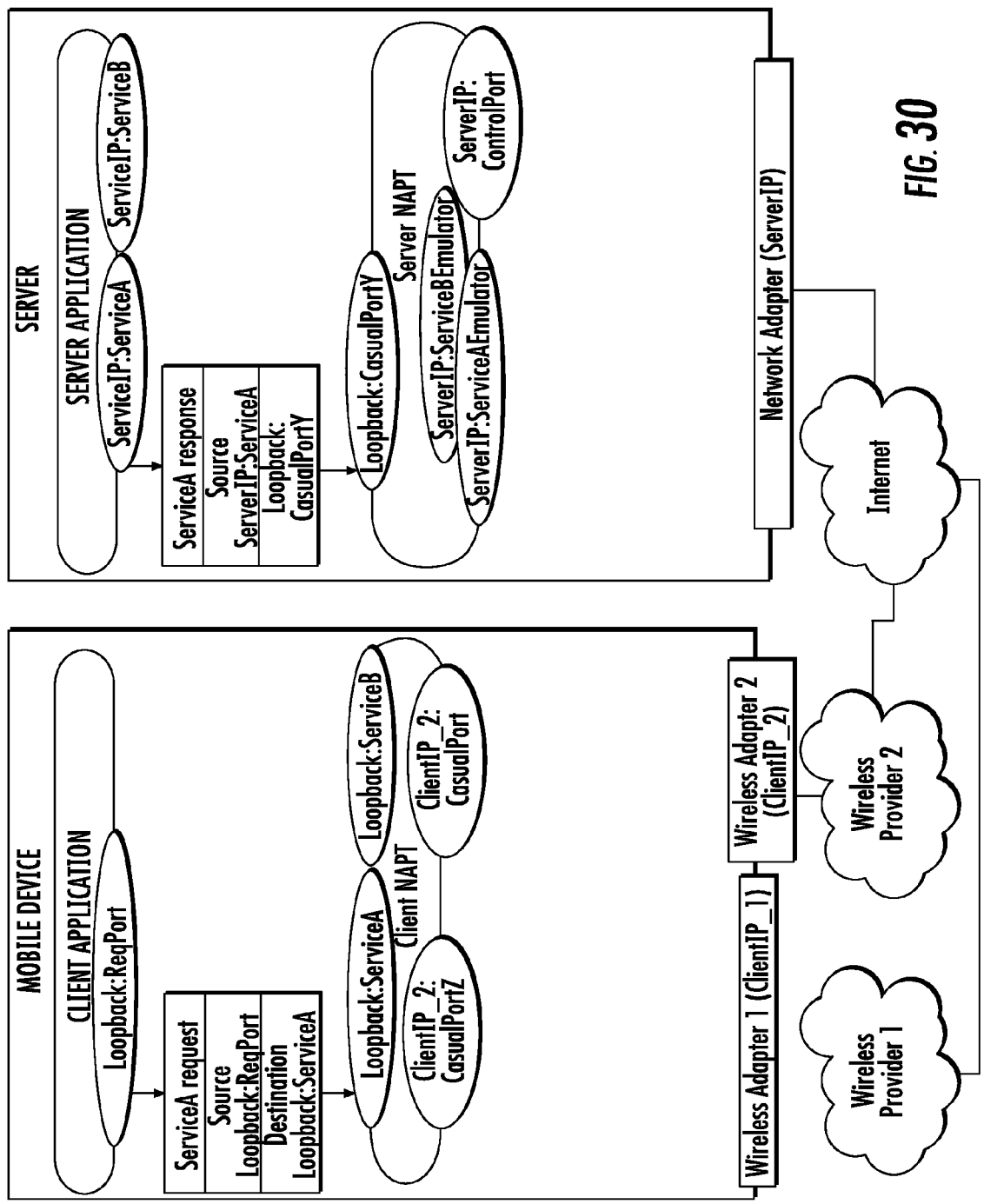
FIG. 30 shows a block diagram illustrating schematically the CNAPT module recreating the Client request emulation sockets and binding them to the new IP address.

When the CNAPT module has received the renewal of the connection-oriented Client services emulation sockets destroyed in [CNAPT-16] it has to perform the following steps (FIG. 30):

(CNAPT-31) Redirect the correspondent Client services emulation connections to the new IP address through the renewed emulation sockets in order to preserve the Client/Server interaction.

(CNAPT-32) Recreate the connection-oriented Server services Client Request Emulation sockets 121 destroyed in [CNAPT-20], bind them to the new "SWITCHING-CNAPT" IP address and connect them, in order to preserve the Client/Server interaction, to the Server Services Emulator server sockets 26 provided on the SNAPT IP address.

(CNAPT-33) Wait for the "ALL_REDIRECTED" packet coming from the SNAPT's control server socket 27.

Figure 31:
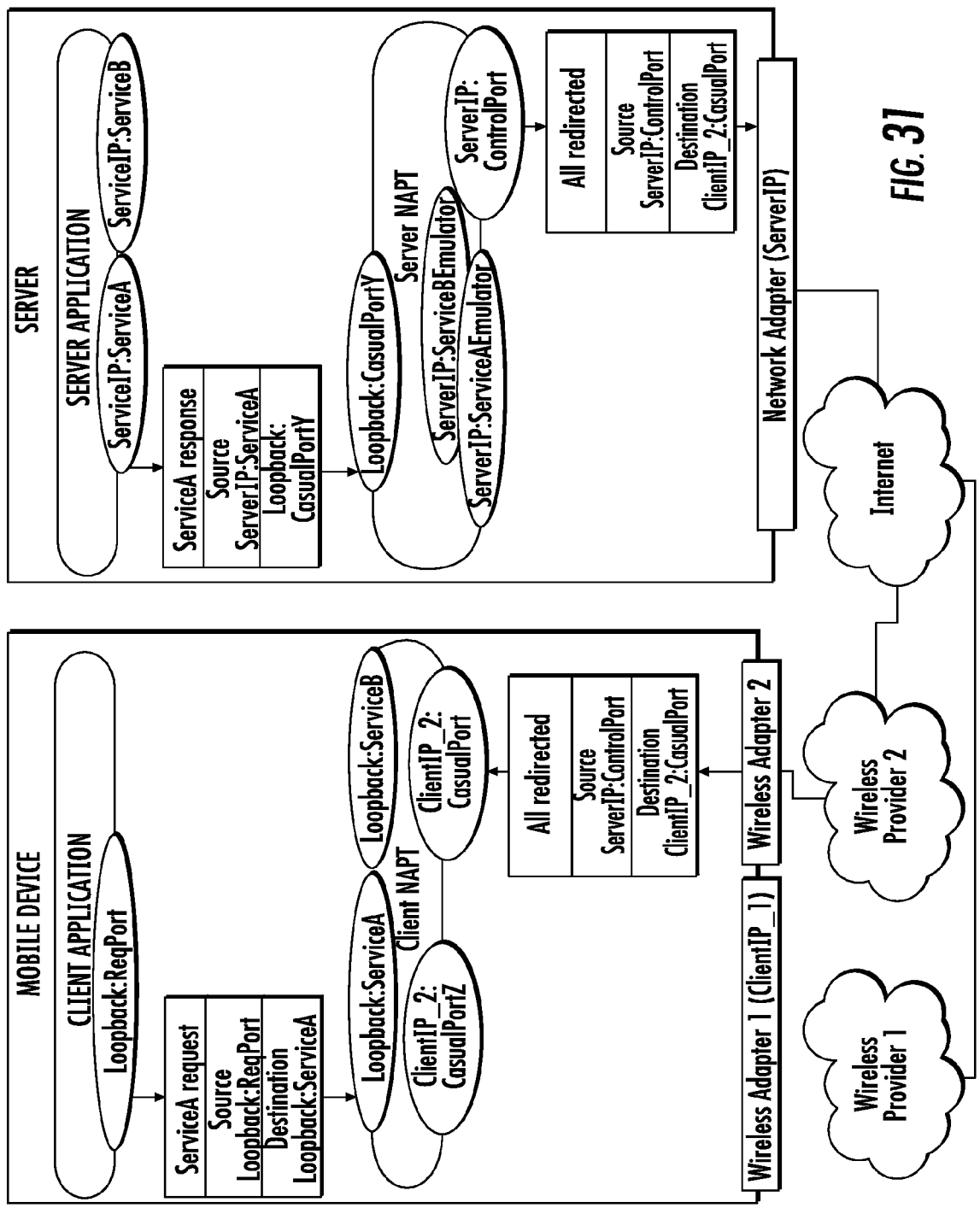
FIG. 31 shows a block diagram illustrating schematically the SNAPT module sending the ALL_REDIRECTED packet.

When the SNAPT module receives the renewal of the connection-oriented Server services emulation sockets destroyed in [SNAPT-14] it has to perform the following steps (FIG. 31):

(SNAPT-21) Redirect the correspondent Server services emulation connections to the new "SWITCHING-CNAPT" IP address through the renewed emulation sockets in order to preserve the Client/Server interaction.

(SNAPT-22) Send an "ALL_REDIRECTED" packet to the new "SWITCHING-CNAPT" control socket 122.

(SNAPT-23) Wake up all the connectionless/connection-oriented client and server services and send the packets buffered in [SNAPT-5].

Figure 32:
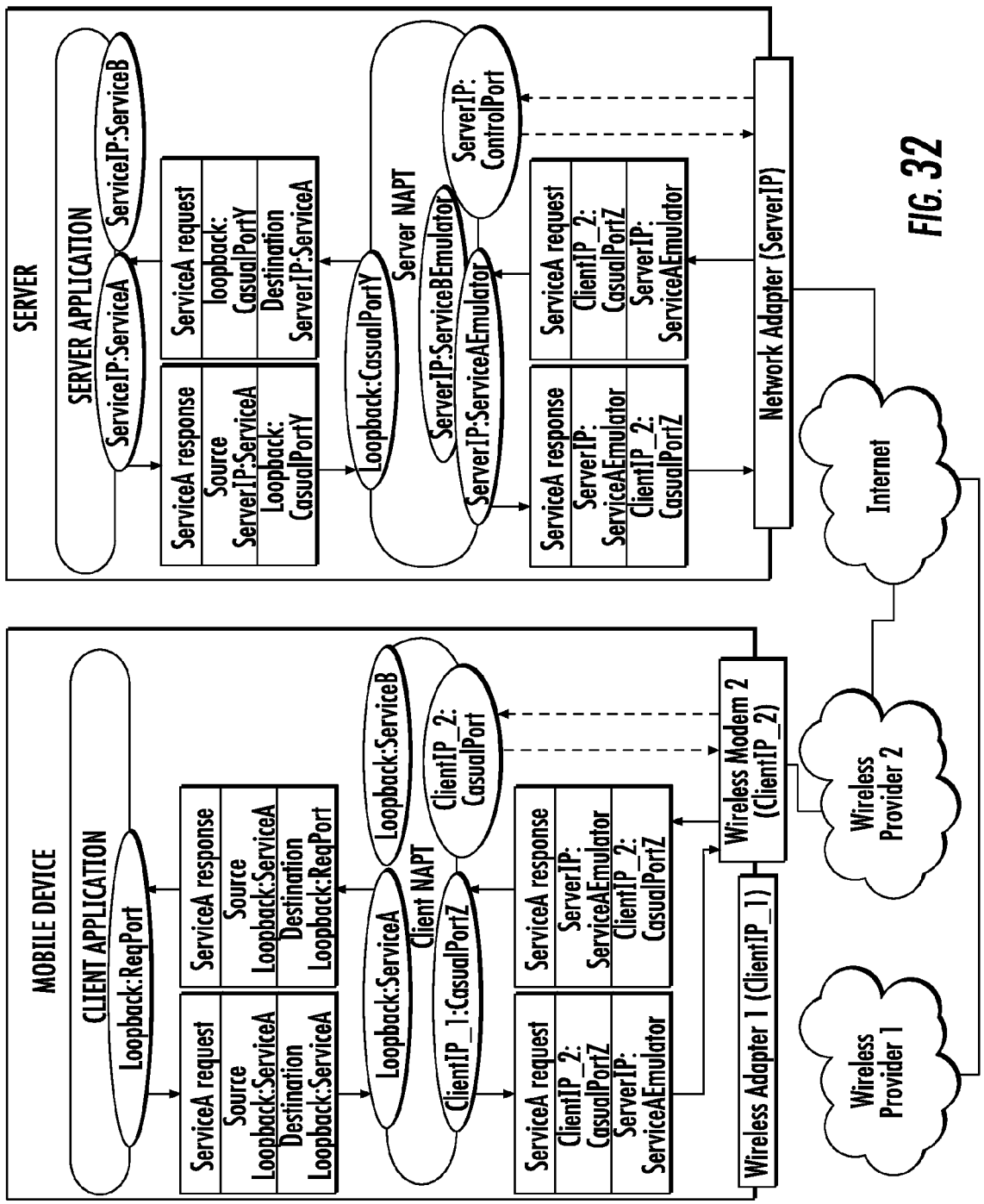
FIG. 32 shows a block diagram illustrating schematically the IP transition phase completed without any interruption of service.
Figure 33:
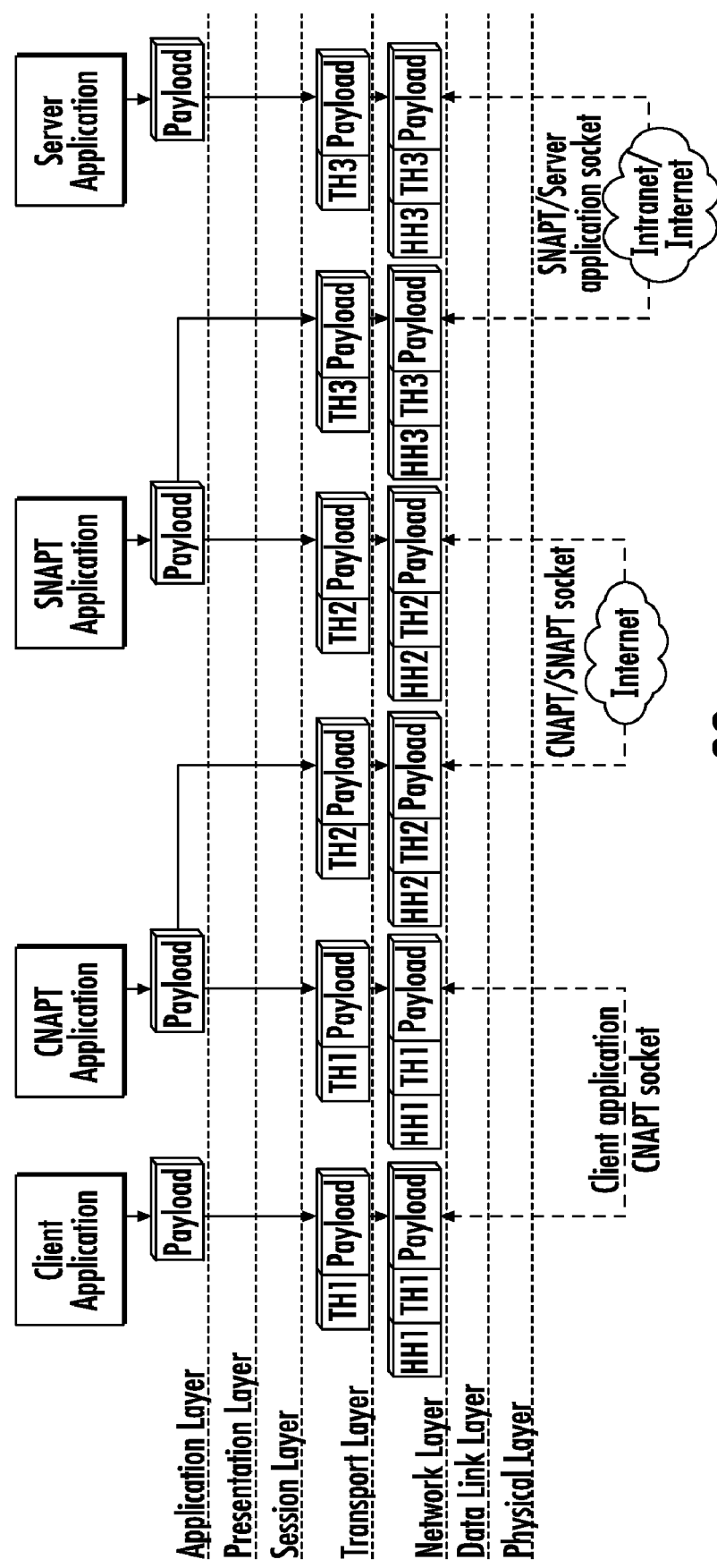
FIG. 33 shows a block diagram illustrating schematically the payload path from a Client application to a Server application while using the CNAPT and the SNAPT.
Figure 34:
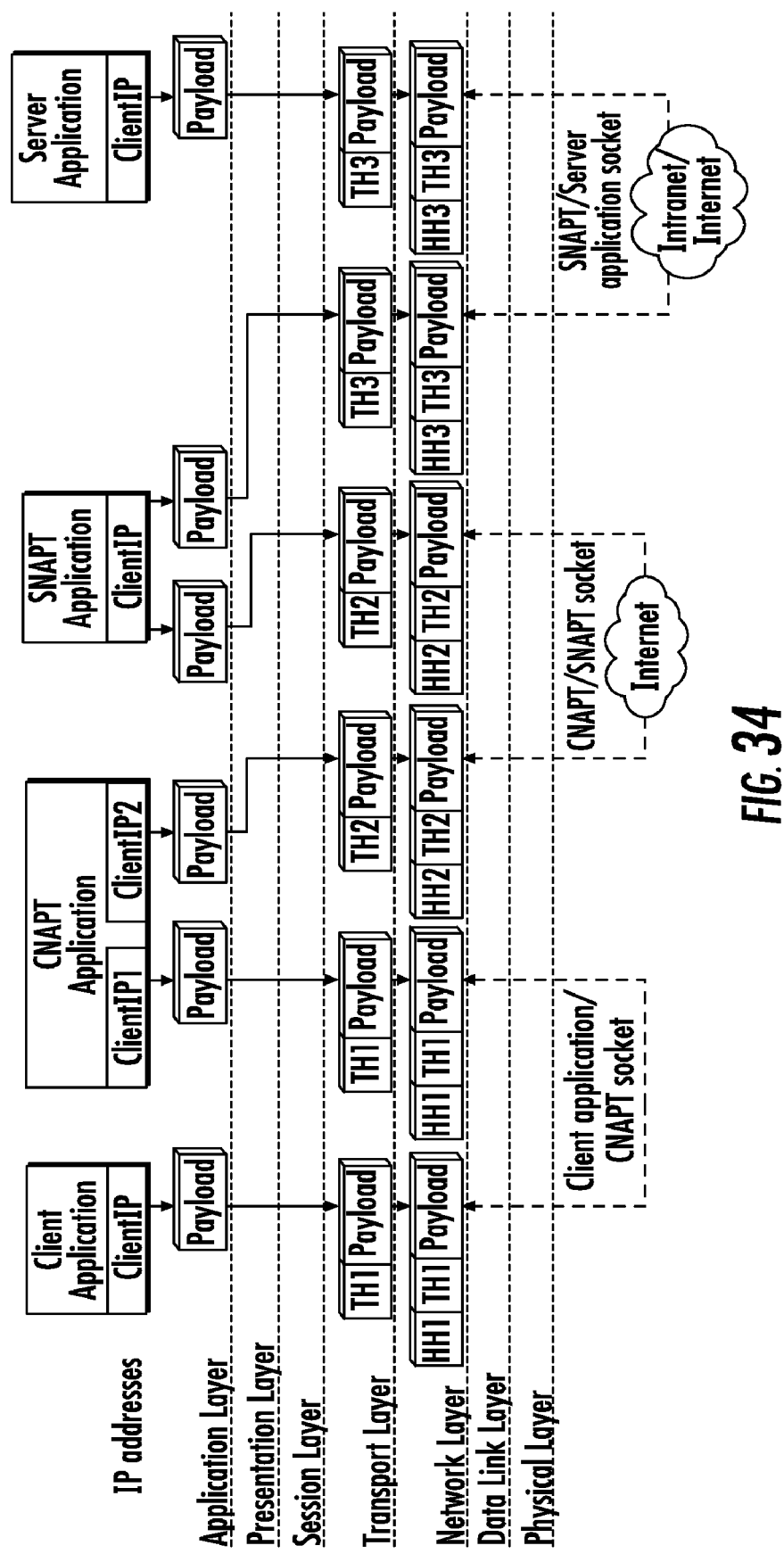
FIG. 34 shows a block diagram illustrating schematically the payload path and the network layer headers from a Client application to a Server application while using the CNAPT and the SNAPT.
Figure 35:
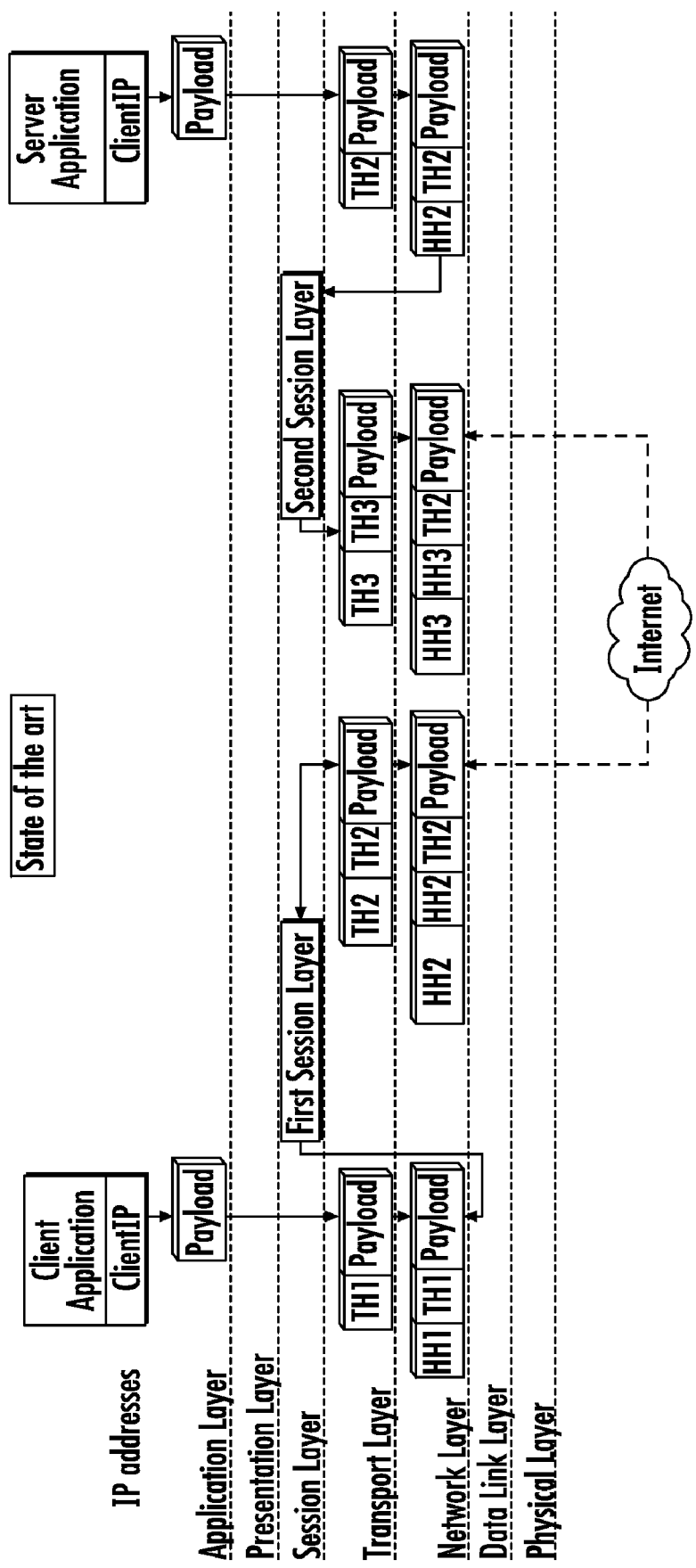
FIG. 35 shows a block diagram illustrating schematically the payload path and the network layer headers from a Client application to a Server application while using the solution WO 02/43348 A1 by Columbitech AB.
Figure 36:
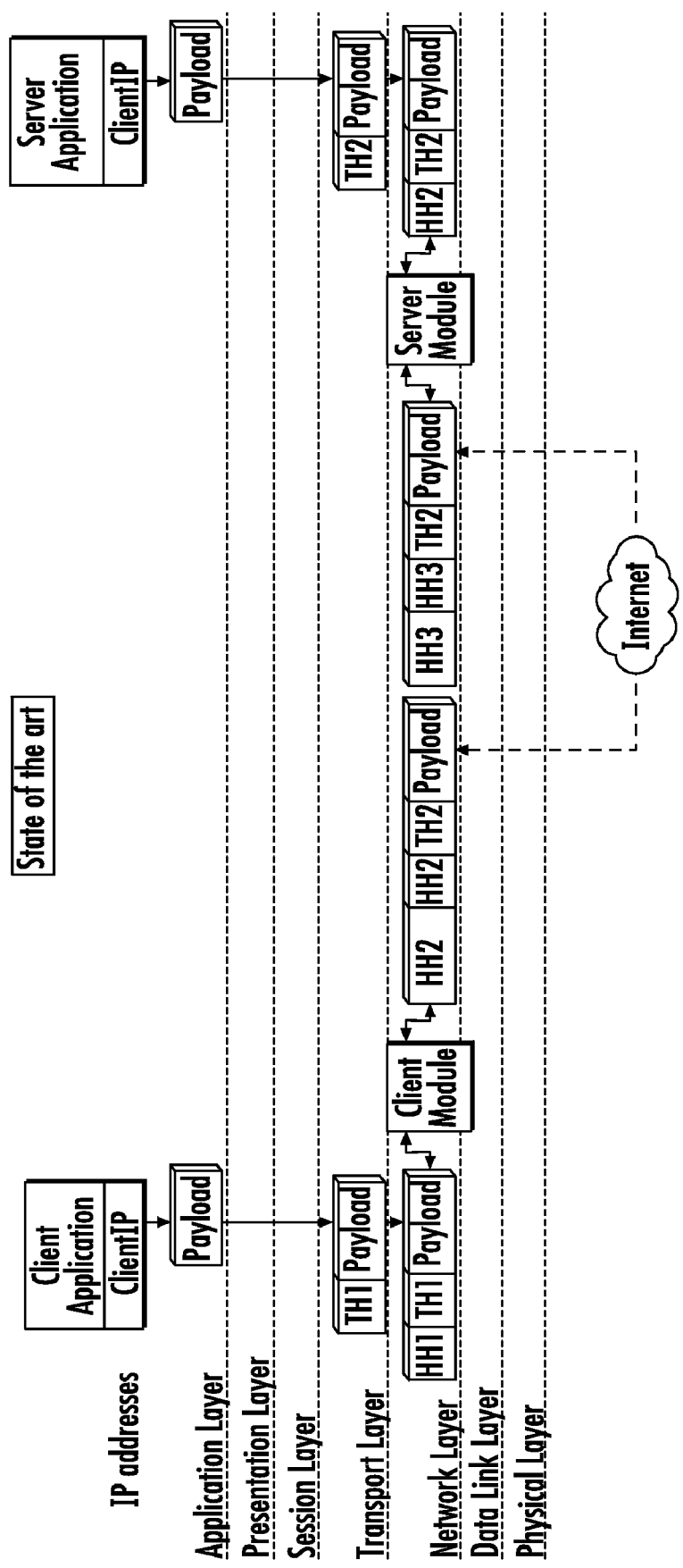
FIG. 36 shows a block diagram illustrating schematically the payload path and the network layer headers from a Client application to a Server application while using one of WO 02/103978 by Swisscom Mobile AG, EP 1089495 A2 by Nortel Networks Limited, EP 0998094 A2 by Nokia Mobile Phones LTD, WO 03/065682 A1 or WO 03/065654 A1 by KONINKLIJKE PHILIPS ELECTRONICS N.V.

When the CNAPT module receives the "ALL_REDIRECTED" packet, it has to perform the following steps (FIG. 32):

(CNAPT-34) Wake up all the connectionless/connection-oriented client and server services and the "decision task" activities (Search and Check activities) and send the packets buffered in [CNAPT-5].

In the steps [CNAPT-11], [CNAPT-13], [CNAPT-14], [CNAPT-19], [CNAPT-30] and [CNAPT-33] the CNAPT waits for at most Z seconds (switch timeout). When this time has elapsed the CNAPT and the related Client application should be stopped. In the steps [SNAPT-10], [SNAPT-12], [SNAPT-16] and [SNAPT-20] the SNAPT waits for at most Z seconds (switch timeout). When this time has elapsed the SNAPT could consider the involved CNAPT as disconnected and it should execute these steps: (1) Release the internal resources of the disconnected CNAPT ID and remove it from the list of connected CNAPT. (2) Destroy the Client service emulator server sockets related to the CNAPT ID and unbind them from the allocated Virtual IP address.

In case of "Multi-Site configuration", some groups of steps are executed separately for each connected SNAPT and there are some synchronization steps. The steps CNAPT-9 . . . 13 are executed separately for each connected SNAPT. The step CNAPT-14 is a synchronization step for all the connected SNAPTs. When the step CNAPT-18 has been completed for all the connected SNAPTs, the steps CNAPT-19 . . . 21 are executed separately for each of them. The steps CNAPT-28, 29 are executed separately for each connected SNAPT. The steps CNAPT-32,33 are executed separately for each connected SNAPT.

Suppose now that the Wireless Provider 1 becomes suddenly unavailable (unexpected switch), for instance the mobile device is rapidly leaving its coverage area, while the Wireless Provider 2 remains still available. In order to maintain active the client application and the session, a new Internet connection through the Provider 2 must be established. If there is enough time for the IP transition phase (that is to say the Client and the Server applications don't go into timeout), the switch from the Wireless Provider 1 ("ClientIP_1") and the Wireless Provider 2 ("ClientIP_2") is totally transparent to the Client and Server applications that continue their execution without any interruption of service and/or session. Note that the IP transition phase can be generated also by a temporary interruption of the Internet connection provided by the Wireless Provider 1, that however remain still available; in fact that temporary interruption may cause a modification on the assigned IP, e.g. from "ClientIP_1" to "ClientIP_1 a".

If the Wireless Provider 1 becomes suddenly unavailable the correspondent Internet connection will be suddenly interrupted. This interruption will throw on the CNAPT software some exceptions that are used to handle this particular event if and only if the CNAPT was reading or writing on the connection at the time of the interruption; otherwise the Check Activity signals the interruption and invokes the IP transition phase. The interruption will throw on the SNAPT software some exceptions that are used to handle this particular event if and only if the SNAPT was reading or writing on the connection to that CNAPT ID at the time of the interruption; otherwise the interruption is signalled by the reception of the "SWITCH_UNEXPECTED" packet from that CNAPT ID. The reception of the "SWITCH_UNEXPECTED" packet causes the invocation of the IP transition phase for that CNAPT ID.

When the CNAPT catches the connection exception or when the Check Activity signals the interruption, the CNAPT has to establish a new Internet connection through the Wireless Provider 2 (or, in turn, through the Wireless Provider 1 if it is became available in the meanwhile, e.g. there was only a temporary problem). When the new Internet connection is available, to begin the IP transition phase from the "ClientIP_1" (no more available) to the "ClientIP_2" the CNAPT has to perform the following steps:

(CNAPT-1*) Suspend the "decision task" activities (Search and Check activities).
(CNAPT-2*) Stop forwarding the connection-oriented Server services request packets to the SNAPT.
(CNAPT-3*) Stop forwarding the connection-oriented Client services reply packets to the SNAPT.
(CNAPT-4*) Stop forwarding the connectionless Server services packets to the SNAPT.
(CNAPT-5*) Buffer the pending Server service requests and the pending Client service replies. They will be forwarded at the end of the IP transition phase.
(CNAPT-6*) For each outgoing connection, store the eventual unsent packets (i.e. the packets that the outgoing connection was eventually sending when the interruption exception was caught).
(CNAPT-7*) Wait until the Search/Check activities have been suspended.
(CNAPT-8*) Destroy the connectionless Client Services Emulator sockets 17 bound to the old CNAPT IP address.
(CNAPT-9*) While preserving the Client services connections between the Client and the Server applications, destroy the Client services connection-oriented emulation sockets linked to the SNAPT and generated by the connection-oriented Client Services Emulator server sockets 17. They were bound to the old CNAPT IP address. Each of these sockets has to be renewed by the SNAPT in order to preserve the Client services connections between the Client and the Server applications.
(CNAPT-10*) While preserving the Client services connections between the Client and the Server applications, destroy the connection-oriented Client Services Emulator server sockets 17 accepting requests from the SNAPT. They were bound to the old CNAPT IP address.
(CNAPT-11*) While preserving the Server services connections between the Client and the Server applications, destroy the connection-oriented Server services Client Request Emulation sockets 121 bound to the old CNAPT IP address.
(CNAPT-12*) Change the current IP address from the old IP address to the new one (if the client application and the server application are connected through a VPN, this step has to be followed by the following step: Open the new VPN between "ClientIP_2" and "ServerIP").
(CNAPT-13*) Change to the new CNAPT IP address the binding of the Server services connectionless sockets transmitting to the SNAPT.
(CNAPT-14*) Recreate the connectionless Client Services Emulator sockets 17 receiving data from the SNAPT and bind them to the new CNAPT IP address.
(CNAPT-15*) Recreate the connection-oriented Client Services Emulator server sockets 17 accepting requests from the SNAPT and bind them to the new CNAPT IP address.
(CNAPT-16*) Create a new Control socket "ClientIP_2: CasualPortK" and connect it to the Control server socket provided by SNAPT on "ServerIP:ControlPort".
(CNAPT-17*) Send a "SWITCH_UNEXPECTED" packet to the SNAPT "Control server socket" using the new Internet connection. This packet contains the CNAPT ID and through this packet the SNAPT can deduce the new CNAPT IP address.
(CNAPT-18*) Wait for the renewal of the connection-oriented Client services emulation sockets destroyed in [CNAPT-9*]. This renewal will be done with a connection request [SNAPT-11*] of the SNAPT for each connection-oriented socket generated by the Client Services Emulator server sockets 17.

When the SNAPT catches the connection exception it waits for a "SWITCH_UNEXPECTED" packet coming from that CNAPT ID. The SNAPT associates to that CNAPT ID a max reconnection waiting time (switch timeout). When this reconnection waiting time has elapsed, the related CNAPT will be considered definitely disconnected and the SNAPT should execute these steps: (1) release the internal resources of the disconnected CNAPT ID and remove it from the list of connected CNAPT; (2) destroy the Client service emulator server sockets related to the CNAPT ID and unbind them from the allocated Virtual IP address. When, in any way, the SNAPT receives a "SWITCH_UNEXPECTED" packet it has to perform the following steps:

(SNAPT-1*) Retrieve from this packet the ID of the sender CNAPT (from now on referred as "SWITCHING-CNAPT"). Through this packet the SNAPT can also deduce the new "SWITCHING-CNAPT" IP address.

(SNAPT-2*) Stop forwarding the connection-oriented Server service reply packets to the "SWITCHING-CNAPT".

(SNAPT-3*) Stop forwarding the connection-oriented Client service request packets to the "SWITCHING-CNAPT".

(SNAPT-4*) Stop forwarding the connectionless Client service packets to the "SWITCHING-CNAPT".

(SNAPT-5*) Buffer the pending Server service replies and the pending Client service requests. They will be forwarded at the end of the IP transition phase.

(SNAPT-6*) For each outgoing connection, store the eventual unsent packets (i.e. the packets that the outgoing connection was sending when the interruption exception was caught).

(SNAPT-7*) While preserving the Client services connections between the Client and the Server applications, destroy the connection-oriented Client Services Server Request Emulation sockets 61 linked to the old "SWITCHING-CNAPT" IP address.

(SNAPT-8*) While preserving the Server services connections between the Client and the Server applications, destroy the Server services connection-oriented emulation sockets linked to the old "SWITCHING-CNAPT" IP address and generated by the connection-oriented Server Services Emulator server sockets 26. Each of these sockets has to be renewed by the "SWITCHING-CNAPT" in order to preserve the Server services connections between the Client and the Server applications.

(SNAPT-9*) Update the "SWITCHING-CNAPT" IP address with its new IP address as retrieved by the source address field of the "SWITCH_UNEXPECTED" control packet.

(SNAPT-10*) Redirect the Client services connectionless sockets transmitting to the "SWITCHING-CNAPT" from its old IP address to the new one (No redirection is needed for the connectionless Server services sockets receiving data from the "SWITCHING-CNAPT". They are unaffected by the CNAPT IP address switch.).

(SNAPT-11*) Recreate the connection-oriented Client Services Server Request Emulation sockets 61 destroyed in [SNAPT-7*] and connect them, in order to preserve the Client/Server interaction, to the Client Services Emulator server sockets 17 provided on the new "SWITCHING-CNAPT" IP address.

(SNAPT-12*) Wait for the renewal of the connection-oriented Server services emulation sockets destroyed in [SNAPT-8*]. This renewal will be done with a connection request [CNAPT-21*] of the "SWITCHING_C-NAPT" for each connection-oriented socket generated by the Server Services Emulator server sockets 26.

When the CNAPT has received the renewal of the connection-oriented Client services emulation sockets destroyed in [CNAPT-9*] it has to perform the following steps:

(CNAPT-19*) Redirect the correspondent Client services emulation connections to the new IP address through the renewed emulation sockets in order to preserve the Client/Server interaction.

(CNAPT-20*) Recreate the connection-oriented Server services Client Request Emulation sockets 121 destroyed in [CNAPT-11*], bind them to the new "SWITCHING-CNAPT" IP address and connect them, in order to preserve the Client/Server interaction, to the Server Services Emulator server sockets 26 provided on the SNAPT IP address.

(CNAPT-21*) Wait for the "ALL_REDIRECTED" packet coming from the SNAPT "Control server socket".

When the SNAPT receives the renewal of the connection-oriented Server services emulation sockets destroyed in [SNAPT-8*] it has to perform the following steps:

(SNAPT-13*) Redirect the correspondent Server services emulation connections to the new "SWITCHING-CNAPT" IP address through the renewed emulation sockets in order to preserve the Client/Server interaction.

(SNAPT-14*) Send an "ALL_REDIRECTED" packet to the new "SWITCHING-CNAPT" control socket.

(SNAPT-15*) Resend the unsent packets eventually stored in [SNAPT-6*].

(SNAPT-16*) Wake up all the connectionless/connection-oriented Client and Server services and send the packets buffered in [SNAPT-5*].

When the CNAPT receives the "ALL_REDIRECTED" packet it has to perform the following steps:

(CNAPT-22*) Resend the unsent packets eventually stored in [CNAPT-6*].

(CNAPT-23*) Wake up all the connectionless/connection-oriented Client and Server services and the "decision task" activities (Search and Check activities) and send the packets buffered in [CNAPT-5*].

In the steps [CNAPT-18*] and [CNAPT-21*] the CNAPT waits for at most Z seconds (switch timeout). When this time has elapsed the CNAPT and the related Client application should be stopped. When the SNAPT is waiting for the "SWITCH_UNEXPECTED" packet coming from a switching CNAPT and in the step [SNAPT-12*], the SNAPT waits for at most Z seconds (switch timeout). When this time has elapsed the SNAPT could consider the involved CNAPT as disconnected and it should execute these steps: (1) Release the internal resources of the disconnected CNAPT ID and remove it from the list of connected CNAPT. (2) Destroy the Client service emulator server sockets related to the CNAPT ID and unbind them from the allocated Virtual IP address.

In case of "Multi-Site configuration", some groups of steps are executed separately for each connected SNAPT and there are some synchronization steps. The steps CNAPT-16*/17* are executed separately for each connected SNAPT. The step CNAPT-18* is a synchronization step for all the connected SNAPTs. The steps CNAPT-20*/21* are executed separately for each connected SNAPT.

It is obvious that the minimal duration of the IP transition phase, therefore the connection timeout of the client and the server application, must be higher than the time requested for the SNAPT module and CNAPT module activities described above. At the end of the IP transition phase, the CNAPT module and the SNAPT module, if suitably configured, could additionally send to the client/server applications special information, e.g. all the information they need to update their QoS (Quality of Service) etc. Furthermore it is clear that the above description is based on a set of assumptions for this specific example. However, the scope of the invention encompasses many different embodiments or examples for implementing different features of the invention. Therefore the described example is not intended to limit the invention in any way. While the invention has been particularly shown and described with reference to the preferred embodiment, it will be understood by those skilled in the art that various changes in form and in detail may be made therein without departing from the scope of the invention.

A system according to the invention, e.g. based on wireless technologies, can help organizations to improve and diversify their range of services. For instance that system can help the companies' mobile field forces to convey to their customers a sense of efficiency, competence and customer-centric "philosophy". Such system provides the User with the best Internet connection in term of bandwidth, reliability and cost effectiveness among all the wired/wireless network access technologies and/or access providers available at a certain time and location. Let's consider a User connected via GPRS to a competence centre using videoconference and shared whiteboard, i.e. a collaboration application. If the User is moving from an only GPRS covered area to a Wi-Fi covered area, for instance he is going to an airport, the system according to the invention can ask him if he wants to switch to the available Wi-Fi connection. If he accepts it can switch, automatically or with a limited user interaction, from the old GPRS connection to the new Wi-Fi connection. The switch is totally transparent for the collaboration application (no restart is needed). The used services remain up and running, and the User experiences a better QoS (as a matter of fact in this case the videoconference and shared whiteboard performance improves). Let's now consider the case where the same User leaves the Wi-Fi covered area. In this case the system can detect the Wi-Fi signal strength degradation, and before the Wi-Fi signal disappears it automatically makes a switch to a GPRS connection if the GPRS signal is present. Also in this case the switch is totally transparent for the collaboration application (no restart is needed). The User only experiences a worse QoS, but the services remain up and running. A system according to the invention requires only limited CPU and/or memory resources so it can be used with PDAs and smart-phones, not only with laptops. Operating at application level (L7 of the OSI-7 Layers Protocols Stack), that system can be easily and quickly adapted to the wireless world innovation and, moreover, it can use all the widespread commercial products at transport (L4) or network (L3) or below level (L1, L2) to provide all the security features. It doesn't require the implementation of any custom security feature. Finally, the porting to the various operating systems (Windows NT-2000-CE-Mobile, Linux, Symbian, PalmOS, etc. . . . ) can be easily achieved by using Java technologies wherever it is possible.

The invention claimed is:

1. A method for seamless handover of mobile devices in heterogeneous networks in which method a mobile device or the mobile network to which it belongs is moved between different topological locations and transmits and/or receives data by means of one or more network access technologies without the data transfer between at least one OSI Layer 7 Client IP application, running on the mobile device, and at least one OSI Layer 7 Server IP application, running on an Internet server, being interrupted, the method comprising the steps of:

requesting, by the at least one Client IP application, the sending of one or more first data units to an OSI Layer 7 client-service module, the one or more first data units containing a client payload and a first set of headers and/or footers for each OSI Layer traversed to reach the client-service module;

creating, by the client-service module, one or more second data units and sending it or them to at least one OSI Layer 7 server-service module, the one or more second data units containing the client payload of the first data units and a second set of headers and/or footers for each OSI Layer traversed to reach the at least one server-service module; and creating, by the at least one server-service module, one or more third data units and sending it or them to the at least one Server IP application, the one or more third data units containing only the client payload and a third set of headers and/or footers for each OSI Layer traversed to reach the at least one Server IP application.

2. The method according to claim 1, wherein the at least one Server IP application makes a reply sending one or more fourth data units to the server-service module, the one or more fourth data units containing a server payload and a fourth set of headers and/or footers for each OSI Layer traversed to reach the server-service module, the server-service module creates one or more fifth data units and sends it or them to the client-service module, the one or more fifth data units containing the server payload and a fifth set of headers and/or footers for each OSI Layer traversed to reach the client-service module, and the client-service module creates one or more sixth data units and sends it or them to the at least one Client IP application, the sixth data units containing the server payload and a sixth set of headers and/or footers for each OSI Layer traversed to reach the at least one Client IP application.

3. The method according to claim 1, wherein with a sudden or planned change or update of a physical network interface currently used by the client-service module that causes a modification of the IP address currently used to exchange data with the at least one server-service module, the data transfer between the at least one Client IP application and the at least one Server IP application is suspended but kept up, in order to provide the seamless handover, the client-service module and the at least one server-service module realize the suspension of the data transfer between the at least one Client IP application and the at least one Server IP application by stopping to forward the data units received by them, and the data transfer between the at least one Client IP application and the at least one Server IP application is resumed when the client-service module has obtained a new IP address and has completed with the at least one server-service module the handshaking for the switching procedure from the old IP address to the new one.

4. The method according to claim 3, wherein source codes of the at least one Client IP application and of the at least one Server IP application remains unmodified.

5. The method according to claim 1, wherein the client-service module is installed on any additional mobile device on the same local or personal area network as the mobile device running the at least one Client IP application.

6. The method according to claim 1, wherein the at least one server-service module is installed on an additional Internet server different from the Internet server running the at least one Server IP application.

7. The method according to claim 1, wherein the client-service module periodically checks the mobile device, in which it is installed, for available and configurable physical network interfaces that can be used to access the at least one server-service module and creates a lookup table with the available and configurable ones, and the client-service module automatically or manually changes and updates the physical network interface currently used to access the at least one server-service module on the basis of information retrieved from the lookup table.

8. The method according to claim 1, wherein the at least one Client IP application exchanges data with the client-service module by means of a connection-oriented or connectionless first socket, the client-service module exchanges data with the at least one server-service module by means of a connection-oriented or connectionless second socket, and the at least one server-service module exchanges data with the at least one Server IP application by means of a connection-oriented or connectionless third socket.

9. The method according to claim 1, wherein a plurality of Client IP applications resident on one or more mobile devices is connected simultaneously to the same client-service module.

10. The method according to claim 1, wherein a plurality of Server IP applications resident on one or more Internet servers is connected simultaneously to the same server-service module.

11. The method according to claim 1, wherein the client-service module is connected simultaneously to a plurality of server-service modules.

12. A system for seamless handover of mobile devices in heterogeneous networks, in which a mobile device or the mobile network to which it belongs is moved between different topological locations and transmits and/or receives data by means of different network access technologies without the data transfer between at least one OSI Layer 7 Client IP application, running on the mobile device, and at least OSI Layer 7 Server IP application, running on an Internet server, being interrupted, wherein an OSI Layer 7 client-service module comprise means for communicating with the at least one Client IP application and with at least one OSI Layer 7 server-service module, the at least one server-service module comprise means for communicating with the at least one Server IP application and with the client-service module, the client-service module comprises means to create one or more second data units and to send it or them to the at least one server-service module, the one or more second data units containing a client payload, received with one or more first data units from the at least one Client IP application, and a second set of headers and/or footers for each OSI Layer traversed to reach the at least one server-service module, and the at least one server-service module comprises means to create one or more third data units and to send it or them to the at least one Server IP application, the one or more third data units containing only the client payload, received in one or more second data units from the client-service module, and a third set of headers and/or footers for each OSI Layer traversed to reach the at least one Server IP application.

13. The system according to claim 12, wherein the at least one server-service module comprises means to create one or more fifth data units and to send it or them to the client-service module, the one or more fifth data units containing a server payload, received with one or more fourth data units from the at least one Server IP application, and a fifth set of headers and/or footers for each OSI Layer traversed to reach the client-service module, and the client-service module comprises means to create one or more sixth data units and to send it or them to the at least one Client IP application, the one or more sixth data units containing the server payload, received in one or more fifth data units from the at least one server-service module, and a sixth set of headers and/or footers for each OSI Layer traversed to reach the at least one Client IP application.

14. The system according to claim 12, wherein the client-service module comprises means to detect or to plan a change or an update of a physical network interface currently used by it that causes a modification of the IP address currently used to exchange data with the at least one server-service module, the client-service module comprises means to suspend but keep up the data transfer from/to the at least one Client IP application, in order to provide the seamless handover, by stopping to forward the data units received by it, the at least one server-service module comprises means to suspend but keep up the data transfer from/to the at least one Server IP application, in order to provide the seamless handover in case the client-service module changes its current IP address, by stopping to forward the data units received by it, and the client-service module and the at least one server-service module comprise means to resume the data transfer between the at least one Client IP application and the at least one Server IP application when the client-service module has obtained a new IP address and has completed with the at least one server-service module the handshaking for the switching procedure from the old IP address to the new one.

15. The system according to claim 12, wherein the client-service module comprises means to periodically checks the mobile device, in which it is installed, for available and configurable physical network interfaces that can be used to access the at least one server-service module and to creates a lookup table with the available and configurable ones, and the client-service module comprises means to automatically or manually changes and updates the physical network interface currently used to access the at least one server-service module on the basis of information retrieved from the lookup table.

16. The system according to claim 12, wherein the client-service module is installed on any additional mobile device on the same local or personal area network as the mobile device running the at least one Client IP application.

17. The system according to claim 12, wherein the at least one server-service module is installed on an additional Internet server different from the Internet server running the at least one Server IP application.

18. A computer program product comprising a computer-readable medium with computer program code means contained therein for control of one or more processors of a computer-based system for seamless handover of mobile devices in heterogeneous networks, wherein the computer program code implements a client-service module and/or a server-service module according to claim 1.

* * * * *